US011999168B2

(12) United States Patent
Murai et al.

(10) Patent No.: US 11,999,168 B2
(45) Date of Patent: Jun. 4, 2024

(54) LIQUID DISCHARGE DEVICE AND LIQUID DISCHARGE APPARATUS

(71) Applicants: Shuusei Murai, Tokyo (JP); Kiyoshi Suzuki, Tokyo (JP); Tomomi Katoh, Kanagawa (JP)

(72) Inventors: Shuusei Murai, Tokyo (JP); Kiyoshi Suzuki, Tokyo (JP); Tomomi Katoh, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 125 days.

(21) Appl. No.: 17/598,308

(22) PCT Filed: Apr. 1, 2020

(86) PCT No.: PCT/JP2020/015093
§ 371 (c)(1),
(2) Date: Sep. 27, 2021

(87) PCT Pub. No.: WO2020/204101
PCT Pub. Date: Oct. 8, 2020

(65) Prior Publication Data

US 2022/0161562 A1 May 26, 2022

(30) Foreign Application Priority Data

Apr. 3, 2019 (JP) ................................ 2019-071041
Mar. 23, 2020 (JP) ................................ 2020-051424

(51) Int. Cl.
*B41J 2/165* (2006.01)

(52) U.S. Cl.
CPC ....... *B41J 2/16544* (2013.01); *B41J 2/16552* (2013.01)

(58) Field of Classification Search
CPC .......................... B41J 2/16544; B41J 2/16552
See application file for complete search history.

(56) References Cited

U.S. PATENT DOCUMENTS 5,883,648 A 3/1999 Hetzer
6,241,337 B1 6/2001 Sharma et al.
(Continued)

FOREIGN PATENT DOCUMENTS

CN 104908430 A 9/2015
DE 102014225405 A1 6/2016
(Continued)

OTHER PUBLICATIONS

International Search Report issued on Jun. 25, 2020 in PCT/JP2020/015093 filed on Apr. 1, 2020, 13 pages.
(Continued)

*Primary Examiner* — Sharon Polk
(74) *Attorney, Agent, or Firm* — XSENSUS LLP

(57) ABSTRACT

A liquid discharge device includes a liquid discharge head including nozzles configured to discharge a liquid, a carriage mounting the liquid discharge head and movable, a wiper configured to wipe a nozzle surface of the liquid discharge head, and a wiper mover configured to hold and move the wiper between a facing position at which the wiper faces the nozzle surface and a standby position at which the wiper does not face the nozzle surface. The carriage movably holds the liquid discharge head and the wiper mover as a single unit.

13 Claims, 40 Drawing Sheets

(56) References Cited

U.S. PATENT DOCUMENTS

| | | | |
|---|---|---|---|
| 2003/0043226 A1 | 3/2003 | Balcan et al. | |
| 2008/0204503 A1 | 8/2008 | Studer et al. | |
| 2009/0122107 A1 | 5/2009 | Ray et al. | |
| 2015/0009254 A1 | 1/2015 | Kaiba et al. | |
| 2015/0251432 A1 | 9/2015 | Miyazawa | |
| 2017/0157933 A1 | 6/2017 | Vernon et al. | |
| 2017/0165970 A1 | 6/2017 | Yokoyama et al. | |
| 2018/0147850 A1* | 5/2018 | Ogawa | B41J 2/16538 |

FOREIGN PATENT DOCUMENTS

| | | | |
|---|---|---|---|
| EP | 3 248 787 A1 | | 11/2017 |
| EP | 3330090 A1 | | 6/2018 |
| JP | 7-047681 | | 2/1995 |
| JP | 9-052372 | | 2/1997 |
| JP | 2004-082730 A | | 3/2004 |
| JP | 2004-291444 | | 10/2004 |
| JP | 2005-219368 A | | 8/2005 |
| JP | 2009190285 A | * | 8/2009 |
| JP | 2010-58338 A | | 3/2010 |
| JP | 2011-051209 A | | 3/2011 |
| JP | 2012-158084 A | | 8/2012 |
| JP | 2015-027636 | | 2/2015 |
| JP | 2015-051339 A | | 3/2015 |
| JP | 2016-041505 A | | 3/2016 |
| JP | 2017-105055 | | 6/2017 |
| JP | 2017-193159 A | | 10/2017 |
| JP | 2018-089831 | | 6/2018 |
| JP | 2018-535860 A | | 12/2018 |
| JP | 2019-198988 A | | 11/2019 |

OTHER PUBLICATIONS

Chinese Office Action issued May 9, 2022, in corresponding Chinese Patent Application 202080025636.5.

Office Action issued Dec. 21, 2022 in Japanese Patent Application No. 2019-071041, 5 pages.

Office Action issued on Jun. 21, 2023, in corresponding Korean patent Application No. 10-2021-7032498, 9 pages.

Office Action issued Oct. 3, 2023 in Japanese Patent Application No. 2020-051424, 11 pages.

Office Action issued Sep. 28, 2023 in European Patent Application No. 20 720 950.3, 7 pages.

Office Action issued Oct. 4, 2022 in Japanese Patent Application No. 2019-071041, 8 pages.

* cited by examiner

LIQUID DISCHARGE DEVICE AND LIQUID DISCHARGE APPARATUS

CROSS-REFERENCE TO RELATED APPLICATIONS

The present application is based on PCT filing PCT/JP2020/015093, filed Apr. 1, 2020, which claims priority to Japanese Patent Application 2019-071041, filed Apr. 3, 2019, and Japanese Patent Application 2020-051424, filed Mar. 23, 2020, the entire contents of which are incorporated herein by reference.

TECHNICAL FIELD

Aspects of the present disclosure relate to a liquid discharge device and a liquid discharge apparatus.

BACKGROUND ART

A liquid discharge apparatus includes an apparatus that discharges a liquid onto a surface of a bomb (cylinder), an aircraft, a vehicle, or the like to print on the surface.

A liquid discharge apparatus includes a head array, a linear rail to reciprocally and linearly move the head array, a multi-articulated robot including a robot arm that properly moves the linear rail to a predetermined position and holds the linear rail at the predetermined position, a robot-arm controller that controls to drive the robot arm based on a position information, and a controller that provides position information to the robot-arm controller and drives and controls a predetermined inkjet nozzle in the head array in conjunction with the position information (PTL 1).

CITATION LIST

Patent Literature

PTL 1: JP-2015-027636-A

SUMMARY OF INVENTION

Technical Problem

An apparatus that uses a head to discharge a liquid includes a cleaner (maintenance device) to maintain and recover a state of a nozzle surface (discharge surface) on an apparatus body. The apparatus moves the liquid discharge head to a position of the cleaner at a predetermined timing.

Thus, an apparatus that has a long distance to scan the head has a problem such as longer downtime associated with the cleaning operation that decreases a printing speed.

A liquid discharge apparatus according to an embodiment of the present disclosure solve the problem as described above and to clean the nozzle surface when necessary.

Solution to Problem

In one aspect of the present disclosure, a liquid discharge device includes a liquid discharge head including nozzles configured to discharge a liquid, a carriage mounting the liquid discharge head and movable, a wiper configured to wipe a nozzle surface of the liquid discharge head, and a wiper mover configured to hold and move the wiper between a facing position at which the wiper faces the nozzle surface and a standby position at which the wiper does not face the nozzle surface. The carriage movably holds the liquid discharge head and the wiper mover as a single unit.

In another aspect of the present disclosure, a liquid discharge device includes a liquid discharge head including a nozzle surface in which nozzles are formed, the liquid discharge head configured to discharge a liquid from the nozzles, the wiper configured to contact the nozzle surface of the liquid discharge head, a cleaning liquid applier configured to apply a cleaning liquid to the wiper, a cleaning liquid collector below the wiper, the cleaning liquid collector configured to receive and hold the cleaning liquid applied to the wiper, a wiper mover configured to move the wiper, the cleaning liquid applier, and the cleaning liquid collector between a facing position at which the wiper faces the nozzle surface and a standby position at which the wiper does not face the nozzle surface, and a guide configured to keep an inclination between the horizontal plane and the cleaning liquid collector to be constant during a movement of the wiper between the facing position and the standby position.

Advantageous Effects of Invention

According to embodiments of the present disclosure, the nozzle surface can be cleaned when necessary.

DESCRIPTION OF EMBODIMENTS

Figure 1:
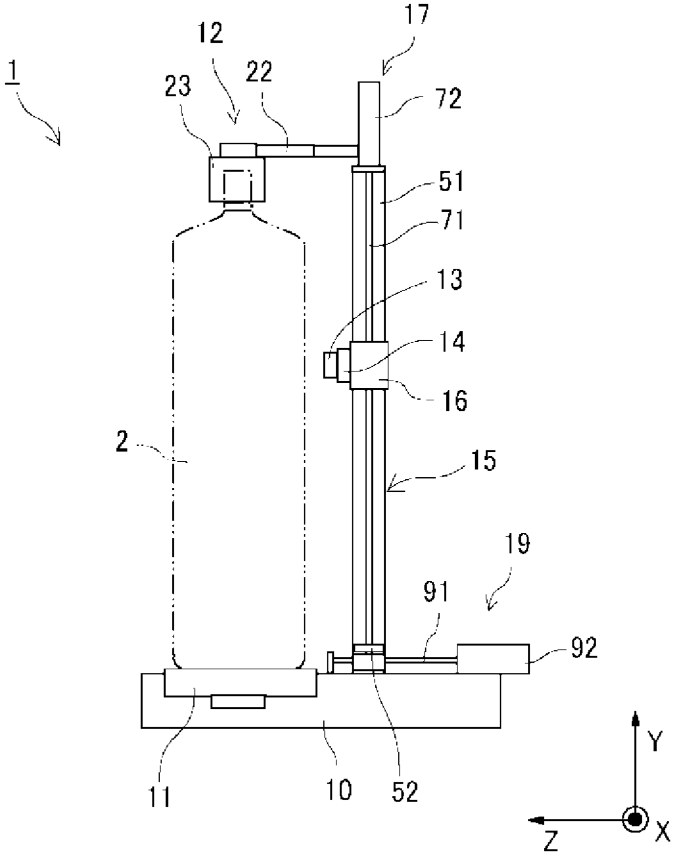
FIG. 1 is a schematic side view of a liquid discharge apparatus according to a first embodiment of the present disclosure.
Figure 2:
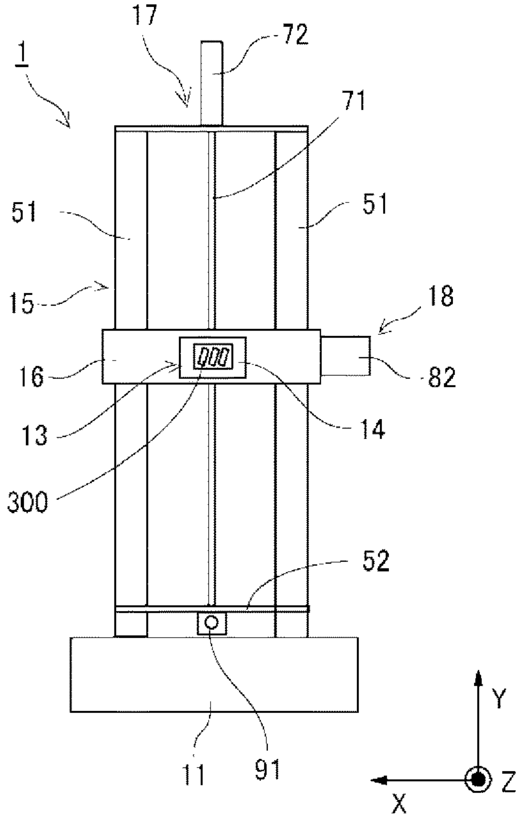
FIG. 2 is a schematic front view of the liquid discharge apparatus of FIG. 1.
Figure 3:
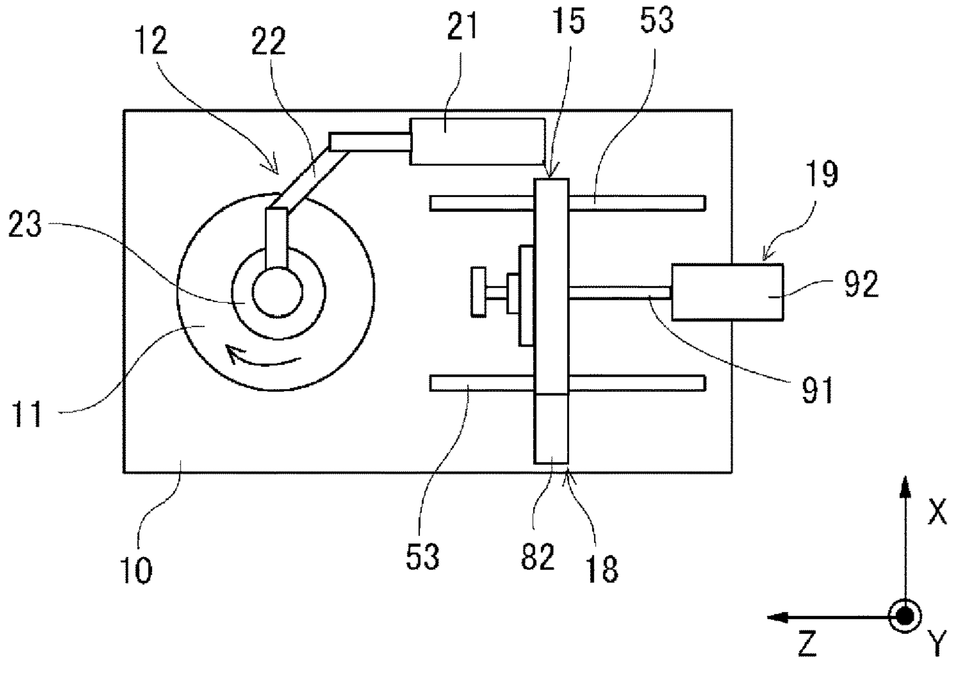
FIG. 3 is a schematic plan view of the liquid discharge apparatus of FIG. 1.

Referring now to the drawings, wherein like reference numerals designate identical or corresponding parts throughout the several views, embodiments of the present disclosure are described below. A first embodiment of the present disclosure is described with reference to FIGS. 1 to 3. FIG. 1 is a schematic side view of a liquid discharge apparatus according to the first embodiment of the present disclosure. FIG. 2 is a front view of the liquid discharge apparatus of the first embodiment. FIG. 3 is a plan view of the liquid discharge apparatus of the first embodiment.

The liquid discharge apparatus 1 includes a mounting table 11 to mount a cylinder 2 (bomb) on a base 10 and a fixing part 12 to fix and hold the cylinder 2 mounted on the mounting table 11. The cylinder 2 is a columnar member that is an object to be printed. The liquid discharge apparatus 1 further includes a liquid discharge device 13 including a head 300 to discharge a liquid onto a circumferential surface of the cylinder 2 and a carriage 14 mounting liquid discharge device 13 on the base 10.

The mounting table 11 includes a turntable that is rotatably installed on the base 10. Thus, the liquid discharge apparatus 1 can print on a half of the circumferential surface of the cylinder 2 mounted on the mounting table 11, and then print on another half of the circumferential surface of the cylinder 2 after rotating the cylinder 2 by the half of the circumferential surface (rotate 180 degrees) of the cylinder 2. The mounting table 11 may be fixed, and the cylinder 2 may be manually rotated. Further, even if the mounting table 11 is rotatable, any configuration may be adopted such as the mounting table 11 is manually rotated or is driven to be rotated by a driver such as a motor.

The fixing part 12 is vertically movably held by supports 51 erected on a side of the mounting table 11 of the base 10. The fixing part 12 includes a pivotable arm 22, a holder 23 held by the arm 22, and a motor to move the pivotable arm 22. The holder 23 fits on a top of the cylinder 2 mounted on the mounting table 11. The holder 23 is replaceable by an attachment according to a shape and a size of an upper part of the cylinder 2.

The carriage 14 is reciprocally movable in a first direction (Y direction) along a height direction of the cylinder 2 mounted on the mounting table 11 and in a second direction (X direction) orthogonal to an axis of the cylinder 2. In the present embodiment, the columnar member is a cylinder 2 having an arcuate shape on a side surface of the cylinder 2. The second direction (X direction) is a direction parallel to a tangent line of the arc-shaped circumferential surface of the cylinder 2 in a plane orthogonal to the first direction (Y direction).

The liquid discharge apparatus 1 in the present embodiment further includes a slider 16 held between the supports 51 (see FIG. 2) of a frame 15 erected on a side of the mounting table 11 of the base 10. The slider 16 is movable in the Y direction along the longitudinal direction (height direction) of the supports 51. Further, the slider 16 holds the carriage 14 so that the carriage 14 is movable in the X direction.

The liquid discharge apparatus 1 further includes a vertical moving mechanism 17 (Y-direction scanning mechanism) to vertically move the slider 16 in the Y direction and a carriage moving mechanism 18 (X-direction scanning mechanism) to move the carriage 14 in the X direction. The carriage moving mechanism 18 is also referred to as a "carriage mover."

The vertical moving mechanism 17 includes, for example, a screw-rotary moving mechanism 71 and a Y-direction motor 72 (vertical moving motor). The screw-rotary moving mechanism 71 is connected to the slider 16. With rotationally driving the Y-direction motor 72 of the vertical moving mechanism 17, the slider 16 moves vertically in the Y direction via the screw-rotary moving mechanism 71.

Similarly, the carriage moving mechanism 18 further includes a screw-rotary moving mechanism and an X-direction motor 82 (horizontal moving motor), and the X-direction motor 82 drives the carriage 14 to reciprocally move in the X direction.

The supports 51 of the frame 15 are connected by a connector 52. The supports 51 are movable in a third direction (Z direction) toward or away from the cylinder 2 (mounting table 11) along guide grooves 53 on the base 10 (see FIG. 3).

The liquid discharge apparatus 1 further includes a Z-direction moving mechanism 19 to reciprocally move the frame 15 in the Z direction. The Z-direction moving mechanism 19 is a retractable part that moves the liquid discharge device 13 in a direction toward or away from the mounting table 11. Thus, the Z-direction moving mechanism 19 serves as a "retractor" to move the liquid discharge device 13 toward or away from the mounting table 11.

The Z-direction moving mechanism 19 further includes, for example, a screw-rotary moving mechanism 91 and a Z-direction motor 92 (retractive motor), and the screw-rotary moving mechanism 91 is connected to the connector 52 of the frame 15. With rotationally driving the Z-direction motor 92 of the Z-direction moving mechanism 19, the frame 15 moves horizontally (laterally) in the Z direction via the screw-rotary moving mechanism 91. Thus, the carriage 14 moves toward and away from the mounting table 11 in the Z direction.

Figure 4:
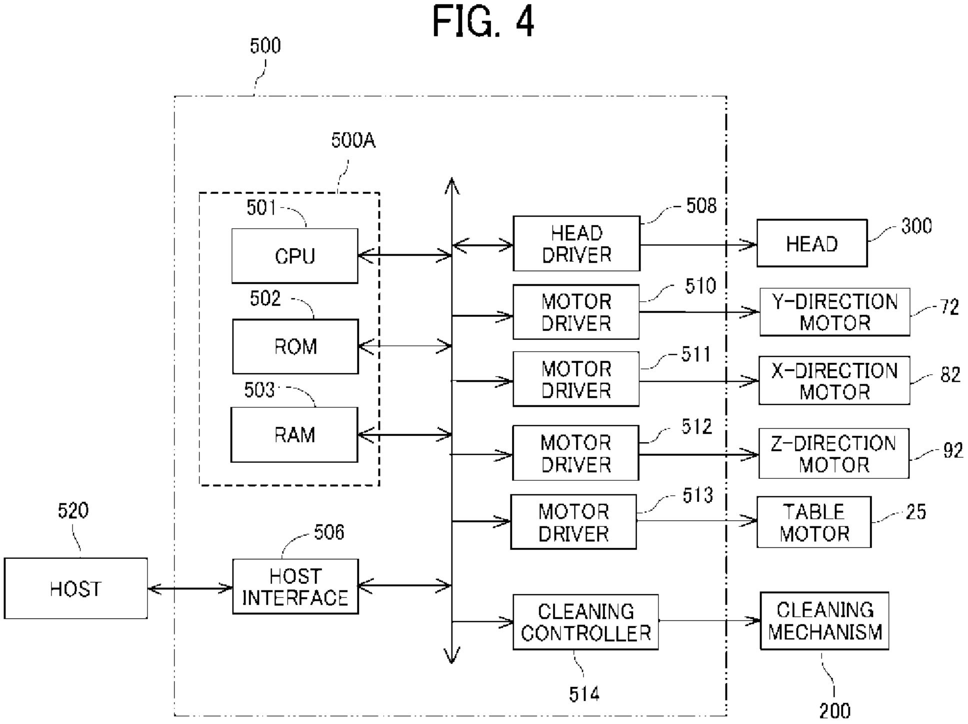
FIG. 4 is a circuit diagram of a controller in the liquid discharge apparatus of FIG. 1.

FIG. 4 is a circuit diagram of a controller 500 in the liquid discharge apparatus 1.

The controller 500 includes a main controller 500A including a central processing unit 501 (CPU 501), a read-only memory 502 (ROM 502), and a random-access memory 503 (RAM 503). The CPU 501 controls the entire of the liquid discharge apparatus 1. The ROM 502 stores programs, which include a program to cause the CPU 501 to perform the control, and other fixed data. The RAM 503 temporarily stores print data and the like.

The controller 500 further includes a host interface 506 (I/F 506) to send and receive data and signals used in receiving print data from a host 520 (an external device). The host 520 includes an information processing apparatus such as a personal computer.

The controller 500 includes a motor driver 508 to drive the head 300 that configures the liquid discharge device 13.

The controller 500 includes a motor driver 510 that drives the Y-direction motor 72 to move the carriage 14 mounting the head 300 in the Y direction, and a motor driver 511 that drives an X-direction motor 82 to move the carriage 14 in the X direction.

The controller includes a motor driver 512 to drive the Z-direction motor 92 to move the carriage 14 in Z direction via the frame 15. The controller 500 includes a motor driver 513 to drive a mounting table motor 25 that rotates the mounting table 11.

The controller 500 includes a cleaning controller 514 to drive and control a cleaning mechanism 200 to clean the head 300 as described below.

Next, a printing operation (drawing operation) to the cylinder 2 by the liquid discharge apparatus 1 is described below.

Figure 5:
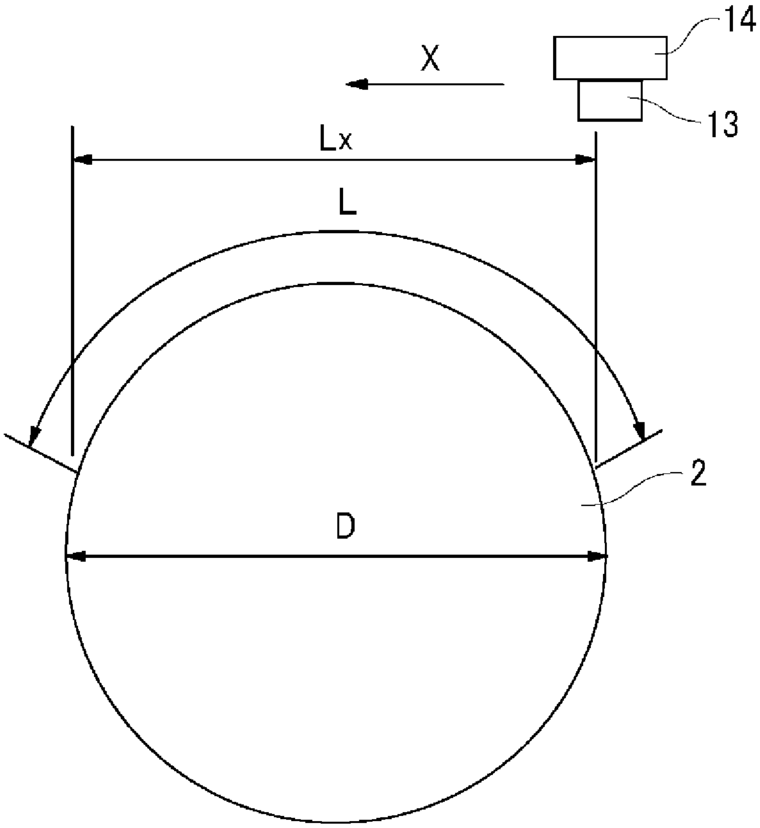
FIG. 5 is a schematic plan view of the liquid discharge apparatus illustrating a relation between a print area and print data.
Figure 6:
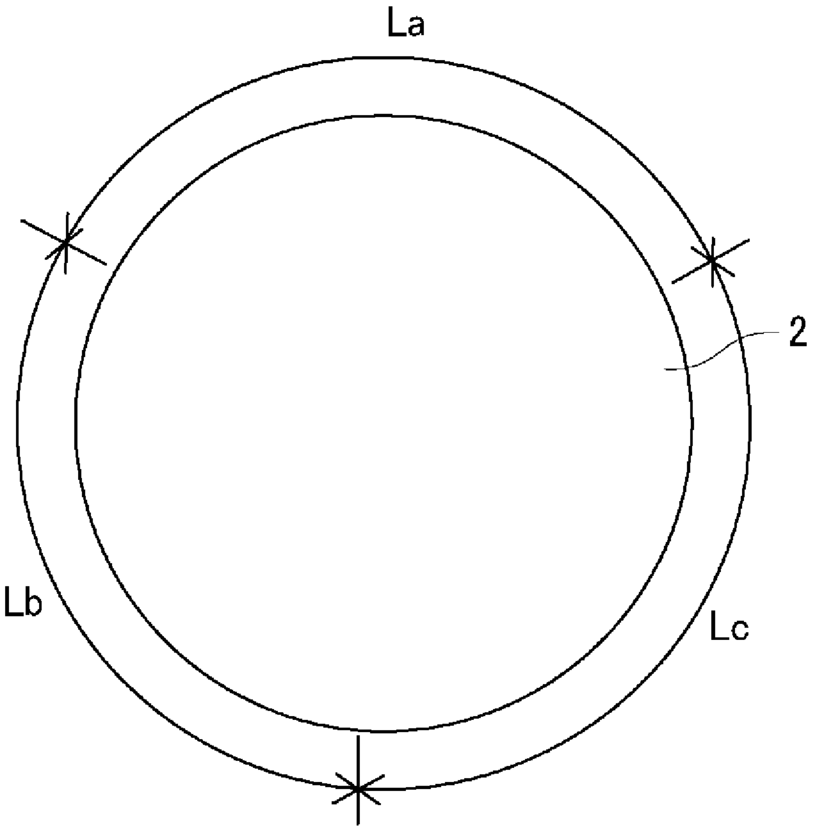
FIG. 6 is a schematic plan view of a cylinder illustrating an example of a divisional print area when an entire circumference of the cylinder is printed.

First, a print area and print data are described below with reference to FIGS. 5 and 6. FIG. 5 is a schematic plan view of the liquid discharge apparatus 1 illustrating a relation between the print area and the print data. FIG. 6 is a plan view of the cylinder 2 illustrating an example of a divisional print area when an entire circumference of the cylinder 2 is printed.

In the present embodiment, the cylinder 2 is in a stopped state (here, a fixed state). Further, the head 300 discharges a liquid to the cylinder 2 to print (draw) an image on the cylinder 2 when the head 300 moves in the first direction (Y direction), and the head 300 does not discharge the liquid to the cylinder 2 when the head 300 moves in the second direction (X direction).

When the liquid discharge apparatus 1 prints on the stopped cylinder 2, the liquid discharge apparatus 1 moves the carriage 14 in the X direction as illustrated in FIG. 5 and changes a drawing position of the head 300. A range L is a printable range of the liquid discharge apparatus 1 when the liquid discharge apparatus 1 prints on the stopped cylinder 2 as described above. The range L is less than half of a length of a circumferential surface of the cylinder 2 in a circumferential direction of the cylinder 2. At the time of printing, a moving distance Lx of the carriage 14 is shorter than a diameter D of the cylinder 2.

Further, the diameter D of the cylinder 2 varies according to the cylinder 2. A distance from the head 300 to the circumferential surface of the cylinder 2 differs according to the cylinder 2. A landing accuracy of a flying liquid is affected by a distance from the head 300 to the circumferential surface of the cylinder 2.

Thus, when the liquid discharge apparatus 1 prints image on a circumferential surface of the cylinder 2, the liquid discharge apparatus 1 sets a plurality of divisional print areas in the circumferential direction, for example, three divisional print areas La to Lc as illustrated in FIG. 6. When the liquid discharge apparatus 1 finish printing of one divisional print area, the liquid discharge apparatus 1 rotates the mounting table 11 so that a next divisional print area of the cylinder 2 faces the head 300 and start printing.

The divisional print areas do not need to have the same circumferential length. It is preferable to divide a print area by a blank part between each drawing, for example, a region having no drawing image or the like at any position in the Y direction.

Figure 7:
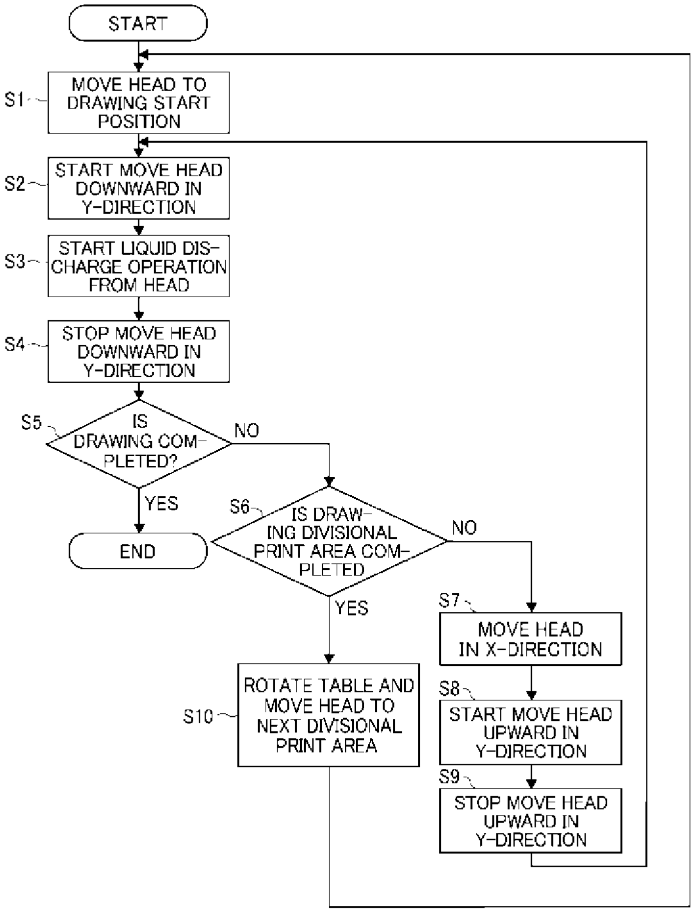
FIG. 7 is a flowchart of a control of a print operation of the controller performed by the controller.

Next, control of a print operation (drawing operation) of the controller 500 is described below with reference to FIGS. 7 and 8. FIG. 7 is a flowchart of the control of the drawing operation of the controller 500. FIGS. 8A and 8B are side views of the cylinder 2 illustrating trajectory of the head 300 during different drawing (printing) operation of the liquid discharge apparatus 1.

First, the cylinder 2 is placed on the mounting table 11, and the top of the cylinder 2 is fixed by the fixing part 12.

Then, referring to FIG. 7, the X-direction motor 82, the Y-direction motor 72, and the Z-direction motor 92 are rotationally driven to move the carriage 14 in the X, Y, and Z directions, and move the head 300 to a predetermined drawing start position (print start position: writing start position) (step S1). Hereinafter, the step S1 is simply referred to as "S1".

Here, it is assumed that printing (drawing) is performed from an upper side toward a lower side of the cylinder 2, and a home position of the head 300 is set at the upper position of the cylinder 2 in the Y direction. The controller 500 of the liquid discharge apparatus 1 moves the head 300 to the drawing start position of the cylinder 2 from the home position.

Then, the controller 500 starts moving the head 300 downward in the Y direction (S2), starts discharging liquid from the head 300 (S3), performs predetermined drawing, and stops moving the head 300 downward in the Y direction (S4).

Here, the controller determines whether the drawing operation (printing operation) is completed (S5).

If the drawing is not completed, the controller 500 determines whether the drawing of one divisional print area is completed (S6).

At the step S6, if the drawing of one divisional print area has not been completed, the controller 500 moves the head 300 in the X direction by a predetermined distance (for example, 3.2 mm) (S7). Further, the controller 500 starts moving the head 300 upward in the Y direction (S8), and the controller 500 stops upward movement of the head 300 in the Y direction when the head 300 moves by a predetermined amount (S9). Then, the drawing operation (printing operation) returns to the step S2, and the controller 500 performs drawing of next row (line).

Conversely, when the drawing operation (printing operation) of one divisional print area is completed, the controller 500 rotates the mounting table 11 to a position at which next divisional print area is printable (S10). Then, the drawing operation returns to the step S1, and the controller 500 continue to perform printing at the drawing start position.

When the drawing ends in step S5, the liquid discharge apparatus 1 ends the drawing operation.

Figure 8A:
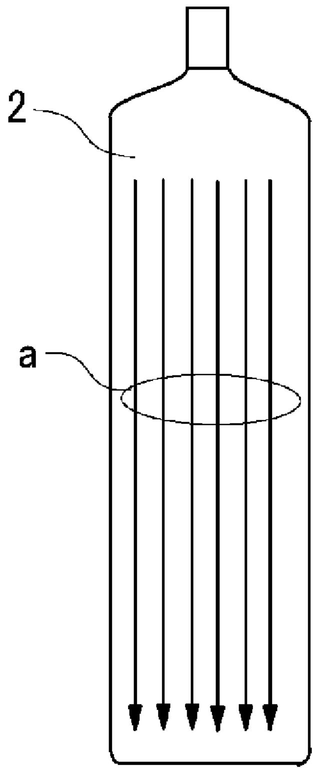
FIGS. 8A and 8B (FIG. 8) are schematic side views of the cylinder illustrating trajectory of a head during printing operation of the liquid discharge apparatus.

As described above, in the present embodiment, as illustrated by the trajectory "a" in FIG. 8A, the liquid is discharged from the head 300 when the head 300 is moved in one predetermined direction (one direction) in the Y direction to perform one-way printing. In this one-way printing, the liquid is not discharged from the head 300 when the head 300 moves in a direction opposite to the one predetermined direction (one direction).

The liquid discharge apparatus 1 performs such one-way printing to enable to prevent an effect of a force on the image quality, and the force is applied to the liquid discharged from the head 300 in a direction of gravity (downward in the Y direction).

Figure 8B:
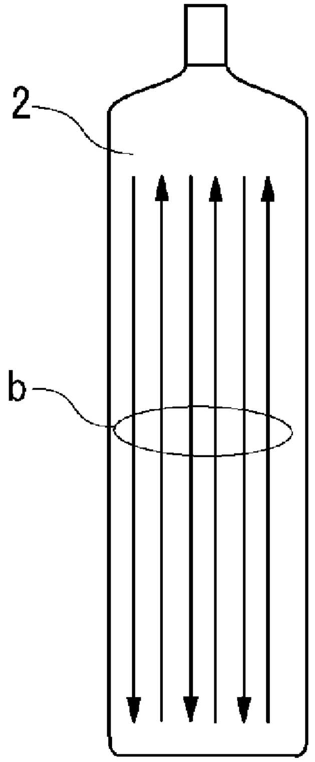

Conversely, if the liquid discharge apparatus 1 performs a bidirectional printing as illustrated by traces "b" in FIG. 8B, the liquid is discharged from the head 300 while the head 300 moves downward from a top to a bottom of the cylinder 2 in the Y direction to perform necessary printing on the circumferential surface of the cylinder 2. When the scanning of the head 300 from the top to the bottom of the cylinder 2 in the Y direction is completed, the controller 500 moves the head 300 in the X direction by a predetermined distance, and performs printing on the cylinder 2 while moving the head 300 from the bottom to the top of the cylinder 2 in the Y direction.

Therefore, the bidirectional printing can improve productivity of the drawing operation (printing operation).

As described above, the head 300 is reciprocally movable in each of the first direction (Y direction) and the second direction (X direction). The first direction (Y direction) is along a height direction (vertical direction) of the cylinder 2 placed on the mounting table 11. The second direction (X direction) is along a direction of a tangent line of circumferential surface of the cylinder 2 in a plane orthogonal to the first direction (Y direction).

Accordingly, the liquid discharge apparatus 1 can discharge a liquid onto the circumferential surface of the cylinder 2 (columnar member) to print (draw) an image on the cylinder 2. Thus, the liquid discharge apparatus 1 can print an image on the cylinder 2 with higher image quality without significantly changing a distance between the circumferential surface of the cylinder 2 (columnar member) and the head 300 (liquid discharge device) when the printing is performed while rotating the cylinder 2 (columnar member), for example.

Further, the liquid discharge apparatus 1 in the present embodiment uses the fixing part 12 to fix the top of the cylinder 2 as a columnar member. Thus, the liquid discharge apparatus 1 can print image on the cylinder 2 while fixing a posture of the cylinder 2 placed on the mounting table 11. Thus, the liquid discharge apparatus 1 can stably print higher quality images on the cylinder 2.

The liquid discharge apparatus 1 does not have a configuration of discharging a liquid while rotating the cylinder 2 in the embodiment in FIG. 1. Thus, it is not particularly necessary to fix the top of the cylinder 2 if the posture of the cylinder 2 is stable. A device to maintain the posture of the cylinder 2 is not limited to the fixing part 12 to fix the top of the cylinder 2. For example, if the cylinder 2 is made of a material that can be attracted by magnetic force, the liquid discharge apparatus 1 may include an electromagnet on the mounting table 11. Alternatively, the liquid discharge apparatus 1 may include a suction device on the mounting table 11 to suction and attract the cylinder 2 on the mounting table 11 if the cylinder 2 can be suctioned and attracted.

Here, the cylinder 2 is described as an example of the columnar member to be printed by the liquid discharge apparatus 1. However, the liquid discharge apparatus 1 can also print on a columnar member other than a cylinder (bomb) or a columnar member other than a cylindrical member, for example, a prismatic member.

Figure 9:
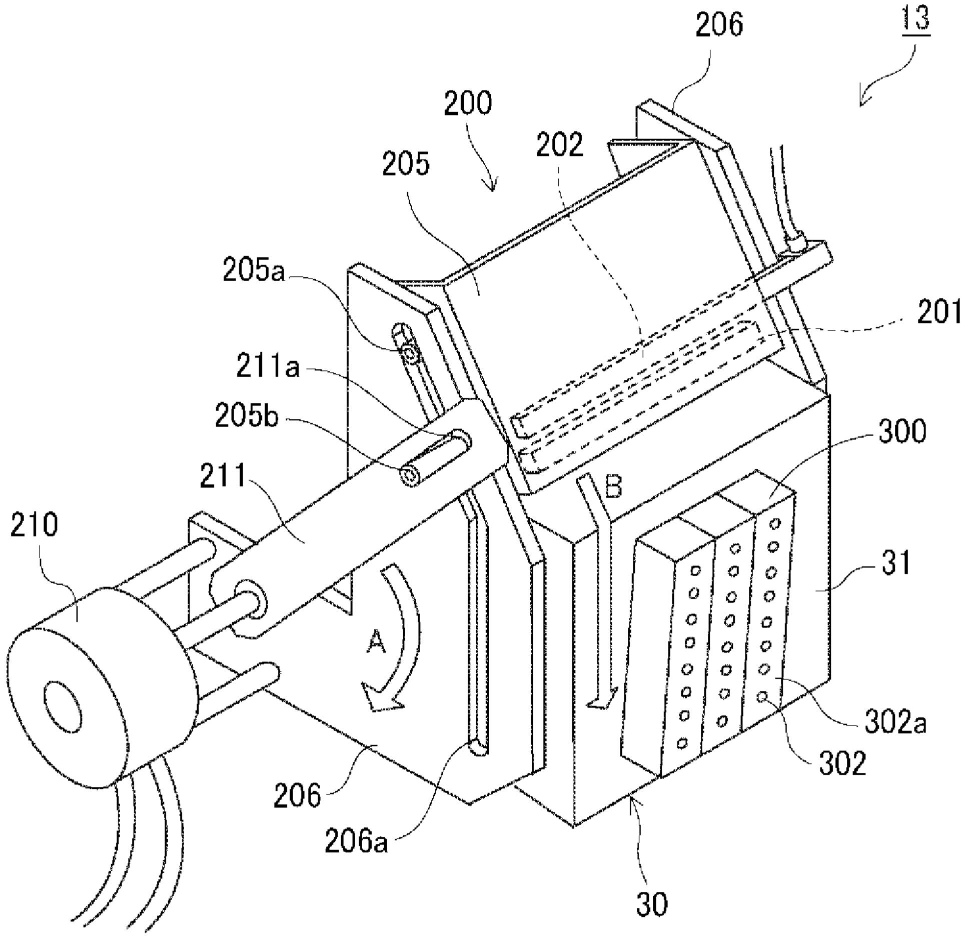
FIG. 9 is a schematic perspective view of a liquid discharge device according to the first embodiment of the present disclosure.
Figure 10:
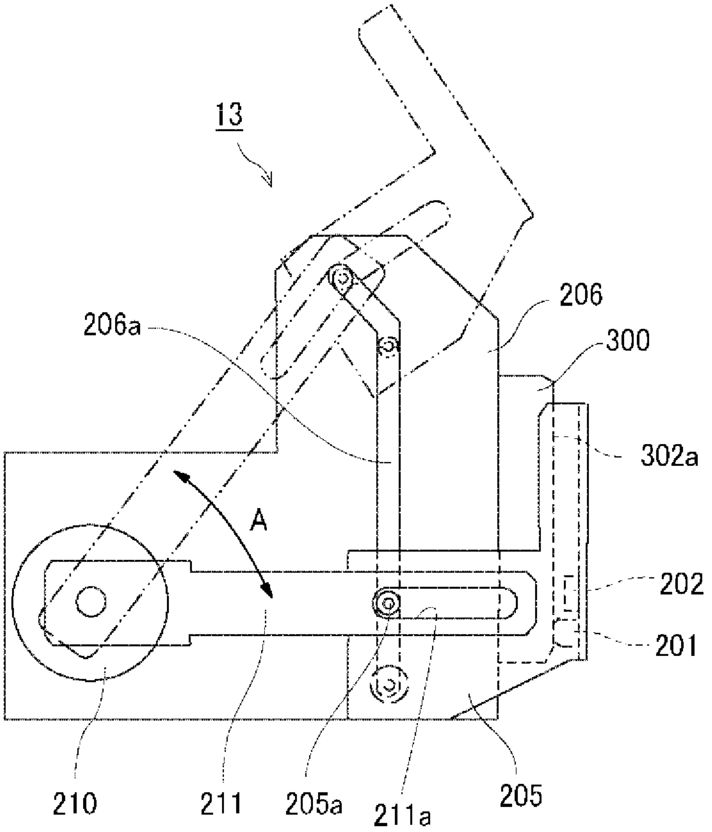
FIG. 10 is a schematic side view of the liquid discharge device of FIG. 9.
Figure 11:
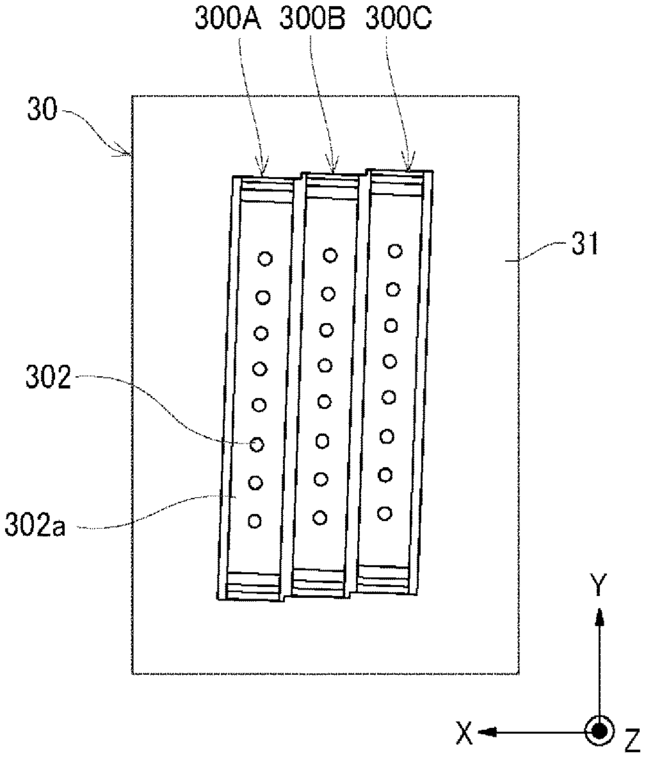
FIG. 11 is a front view of the head of FIGS. 9 and 10.

Next, a first embodiment of the present disclosure is described with reference to FIGS. 9 to 11. FIG. 9 is a perspective view of the liquid discharge device. FIG. 10 is a side view of the liquid discharge device of FIG. 9. FIG. 11 is a front view of the head 300 of FIGS. 9 and 10.

The liquid discharge device 13 includes a head part 30 (liquid discharge part) to discharge a liquid. The head part 30 includes a cleaning mechanism 200 as a single unit. The cleaning mechanism 200 includes a wiper 201 to wipe a nozzle surface 302*a* serving as a discharge surface.

The head part 30 includes a holder 31 that holds a plurality of (here, three) heads 300 (300A to 300C) to discharge liquids of different colors. In the head 300, a plurality of nozzles 302 to discharge a liquid is arranged. The holder 31 as a housing holds the heads 300 while a direction of arrangement of the nozzles 302 is inclined with respect to the Y direction.

The cleaning mechanism 200 includes a wiper 201 to wipe the nozzle surface 302*a* of the head 300, and a cleaning liquid discharger 202 as cleaning liquid applier to discharge or drip a cleaning liquid 220 (described later) onto the nozzle surface 302*a* of the head 300.

The liquid discharge apparatus 1 includes a wiper mover 205 to which the wiper 201 and the cleaning liquid discharger 202 are attached and held.

Further, the liquid discharge device 13 includes guides 206 respectively including guide grooves 206*a* on both sides of the holder 31 of the head part 30. A support shaft 205*a* of the wiper mover 205 is movably fitted in the guide grooves 206*a* of the guides 206. Thus, the holder 31 is a housing that holds the head 300 and movably supports the wiper mover 205.

Thus, the wiper mover 205 can move the wiper 201 along the guide grooves 206*a* between a facing position at which the wiper 201 faces the nozzle surface 302*a* of the head 300 and a standby (evacuation) position at which the wiper 201 evacuates (retracts) from the nozzle surface 302*a*.

Further, the liquid discharge device includes a rotary air cylinder 210 as a driver to move the wiper mover 205. The liquid discharge device 13 includes an arm 211 having one end connected to the rotary air cylinder 210 and another end in which an elongated hole 211*a* is formed. The wiper mover 205 includes a pin 205*b* on a side surface of the wiper mover 205. The pin 205*b* is movably fitted to the elongated hole 211*a* in the arm 211. The driver may be mounted on the carriage 14, and the driver transmits a driving force to the liquid discharge device 13 from the carriage 14.

Thus, the rotary air cylinder 210 is driven to rotate the arm 211 in a direction indicated by arrow "A" in FIG. 9, and the wiper mover 205 is guided by the guide grooves 206*a* of the guides 206. Thus, the wiper mover 205 moves in a vertical direction as indicated by arrow B in FIG. 9 from the standby (evacuation) position indicated by an imaginary line to a wiping end position that is also the facing position as indicated by a solid line as illustrated in FIG. 10. Thus, the wiper mover 205 moves the wiper 201 from the standby (evacuation) position to the wiping end position. Thus, the wiper mover 205 moves the wiper 201 to enable the wiper 201 to wipe the nozzle surface 302*a* of the head 300.

As described above, the liquid discharge device 13 includes the head part 30 as a liquid discharge part to discharge a liquid and the cleaning mechanism 200 that wipes and cleans the nozzle surface 302*a* of the head 300 of the head part 30 as a single unit. Further, the carriage 14 reciprocally moves while mounting the liquid discharge device 13 on the carriage 14. Thus, the carriage 14 that is reciprocally movable supports the cleaning mechanism 200 including the head 300 and the wiper mover 205 as a single unit.

Accordingly, the liquid discharge device 13 can wipe and clean the nozzle surface 302*a* of the head 300 at no matter where the liquid discharge device 13 is located when the liquid discharge device 13 does not discharge a liquid. Thus, the liquid discharge device 13 can clean the nozzle surface 302*a* of the head 300 at any time when needed.

Figure 12:
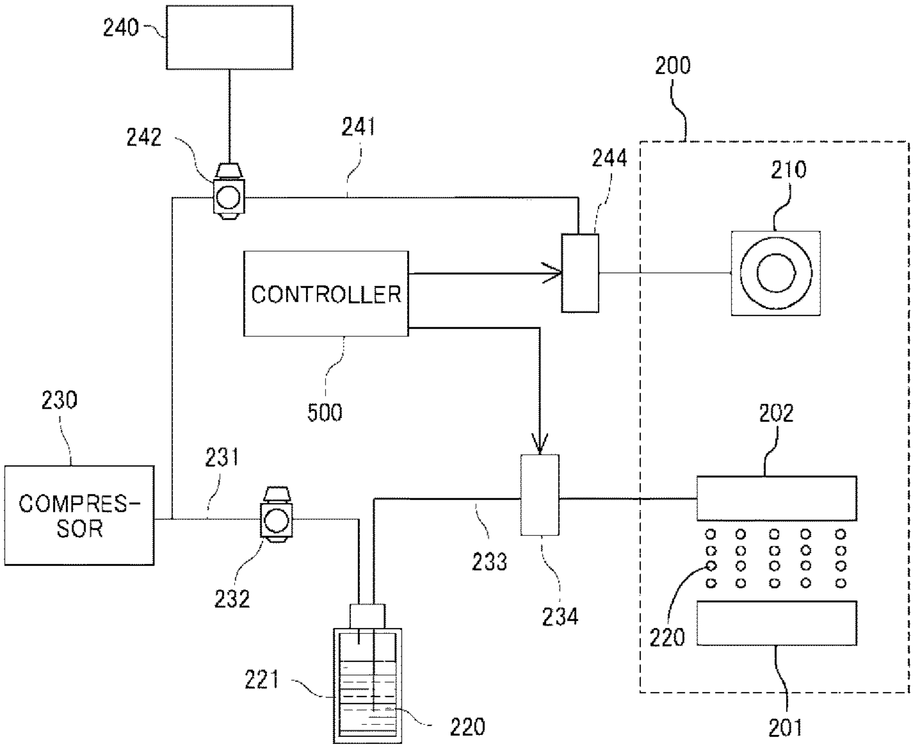
FIG. 12 is a circuit diagram of a cleaning-liquid supply system of the cleaning mechanism and a cleaning operation.

Next, a cleaning liquid supply system and a cleaning operation of the cleaning mechanism 200 is described with reference to FIG. 12. FIG. 12 is a circuit diagram of the cleaning liquid supply system of the cleaning mechanism 200.

The liquid discharge apparatus 1 includes a cleaning liquid tank 221 as a cleaning liquid storage to store the cleaning liquid 220. The cleaning liquid tank 221 is connected to a compressor 230 via a channel 231 including an air regulator 232 and is supplied with pressurized air from the compressor 230.

Further, the cleaning liquid tank 221 is connected to the cleaning liquid discharger 202 via a channel 233, and the channel 233 includes an openably closable valve 234.

Further, the rotary air cylinder 210 is connected to the compressor 230 via a channel 241 including the air regulator 242, and the rotary air cylinder 210 is supplied with the compressed air from the compressor 230. The channel 241 includes an openably closable valve 244.

When the wiper 201 of the cleaning mechanism 200 wipes the nozzle surface 302*a* of the head 300, the cleaning controller 514 of the controller 500 controls opening and closing of the openably closable valve 244 to drive the rotary air cylinder 210. As described above, the wiper mover 205 moves the wiper 201 from the standby (evacuation) position to the wiping end position.

When the wiper mover 205 moves the wiper 201 to the wiping end position, the openably closable valve 234 is controlled to open and close the channel 233. The cleaning liquid 220 is discharged from the cleaning liquid discharger 202 as necessary or constantly to apply the cleaning liquid 220 to the nozzle surface 302*a* of the head 300, and the wiper 201 wipes the nozzle surface 302*a* while being wet with the cleaning liquid.

The controller 500 controls timing of the wiping operation at any timing when the head 300 does not discharge a liquid such as when the liquid discharge device 13 (head 300) returns to the home position, and when the liquid discharge device 13 moves in the X direction to perform one-way printing, for example.

When the liquid discharge apparatus 1 performs the wiping operation, the liquid discharge device 13 moves in the Z direction to secure a space between the head 300 and the cylinder 2 for the wiper mover 205 to enter.

Figure 13:
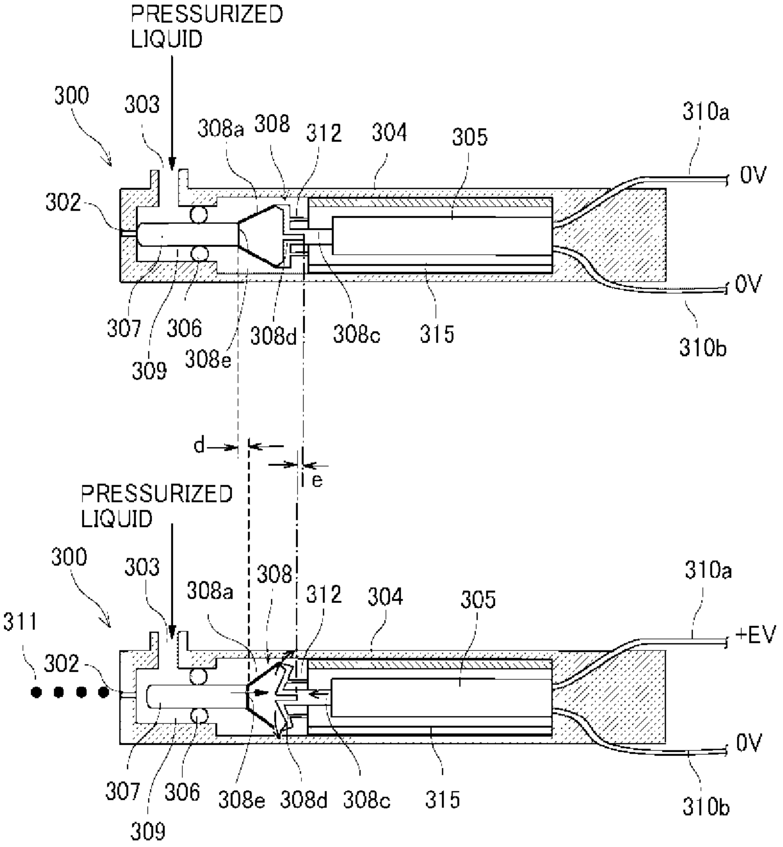
FIG. 13 is a schematic cross-sectional view of one nozzle part of the head according to the first embodiment.

Next, an example of the head 300 according to the first embodiment of the present disclosure is described with reference to FIG. 13. FIG. 13 is a schematic cross-sectional view of one nozzle part of the head 300. An upper part of FIG. 13 illustrates a state in which the nozzle 302 is closed, and a lower part of FIG. 13 illustrates a state in which the nozzle 302 is open.

The head 300 includes a hollow housing 304 including a nozzle 302 at a leading end of the head 300 to discharge a liquid. The housing 304 includes an injection port 303 near the nozzle 302, and the liquid is injected inside the housing 304 from the injection port 303.

The head 300 includes a piezoelectric element 305, a valve 307, and a valve mover 308 in the housing 304. The piezoelectric element expands and contracts in response to an externally applied voltage. The valve 307 opens and closes the nozzle 302. The valve mover 308 is disposed between the valve 307 and the piezoelectric element 305. The valve mover 308 moves the valve 307 toward or away from the nozzle 302.

The piezoelectric element 305 is housed in a case 315, and a pair of wirings 310*a* and 310*b* to apply a voltage to the piezoelectric element 305 are connected to the piezoelectric element 305 and are drawn outside the housing 304.

A sealing 306 is arranged between the valve 307 and the housing 304 to prevent the pressurized liquid injected from the injection port 303 from entering the piezoelectric element 305. Thus, a chamber 309 into which the pressurized liquid is injected from the injection port 303 is formed.

The housing 304 has a cylindrical body such as a cylinder and a square tube and has an enclosed space that is closed except the nozzle 302 and the injection port 303. The nozzle 302 is an opening formed at the tip of the housing 304, and the liquid 311 is discharged from the nozzle 302. The injection port 303 is formed on a side surface of the housing 304 near the nozzle 302. The pressurized liquid is continuously supplied into the injection port 303.

The piezoelectric element 305 is formed using zirconia ceramics or the like. A drive waveform (drive voltage) is applied to the piezoelectric element 305 via wirings 310*a* and 310*b*.

The sealing 306 is, for example, a packing, an O-ring, or the like. The sealing 306 externally fitted into the valve 307 can prevent the liquid from flowing into the piezoelectric element 305 side from the injection port 303 side.

The valve mover 308 includes a deformable part 308*a* having a substantially trapezoidal cross section formed of a resiliently deformable elastic member formed of rubber, soft resin, a thin metal plate, or the like. A connection part 308*e* corresponding to an upper side of the substantially trapezoidal cross section of the deformable part 308*a* is fixed to a base end surface of the valve 307. A long side corresponding to a bottom of the substantially trapezoidal cross section of the deformable part 308*a* is connected to a bent side 308*d*. The bent side 308*d* has a radial center part connected to the guide 308*c*, and a part between the radial center part and an end part of the bent side 308*d* is connected to a fixed part 312 having one end connected to the case 315.

When a predetermined voltage is applied to the piezoelectric element 305, the piezoelectric element 305 expands to move the valve mover 308 so that the guide 308*c* moves toward the nozzle 302 by a distance "e", for example, as illustrated in the lower part of FIG. 13. Thus, a vicinity of the center of the bent side 308*d* is pushed into the valve mover 308.

Then, the bent side 308*d* is displaced in a direction indicated by arrow in the lower part of FIG. 13 from a connection between the guide 308*c* and the fixed part 312 as a starting point of displacement since an outer peripheral side of the guide 308*c* is connected to the fixed part 312. When the bent side 308*d* is displaced in the direction indicated by the arrow in the lower part of FIG. 13, the deformable part 308*a* expands so that the connection part 308*e* connected with the valve 307 is pulled in a direction (right-hand direction) indicated by arrow in the lower part of FIG. 13.

The nozzle 302 is opened due to the deformation of the deformable part 308*a* of the valve mover 308, the valve 307 fixed to the connection part 308*e* of the deformable part 308*a* is retracted by a distance "d."

Thus, the guide 308*c* moves toward the nozzle 302 by the distance "e" due to an expansion of the piezoelectric element 305, so that the valve 307 moves in a direction (right-hand direction) opposite to a moving direction (left-hand direction) of the guide 308*c* (direction of expansion of the piezoelectric element 305).

Here, a distance between the connection part 308*e* and the bent side 308*d* or a length of the bent side 308*d* is adjusted to increase a moving amount of the valve 307 to be longer than a displacement amount of the piezoelectric element 305. The connection part 308*e* is a connection between the deformable part 308*a* of the valve mover 308 and the valve 307.

Thus, the valve mover 308 can amplify the displacement of the piezoelectric element 305 and reduce the displacement of the piezoelectric element 305, so that the size of the piezoelectric element 305 can be reduced.

Next, an operation of the head 300 is described with reference to FIG. 14. FIG. 14 is a waveform graph of an example of a drive voltage illustrating the operation of the head 300.

When no voltage is applied to the piezoelectric element 305, the piezoelectric element 305 is in a contracted state, so that no force is applied to the valve mover 308 by the piezoelectric element 305. At this time, the deformable part 308*a* of the valve mover 308 is in an expanded state (normal state) as illustrated in the upper part of FIG. 13, and the valve 307 is pushed toward the nozzle 302 by an elastic force of the deformable part 308*a*. Therefore, the nozzle 302 is closed by the end surface of the valve 307, and the liquid 311 is not discharged from the nozzle 302.

Figure 14A:
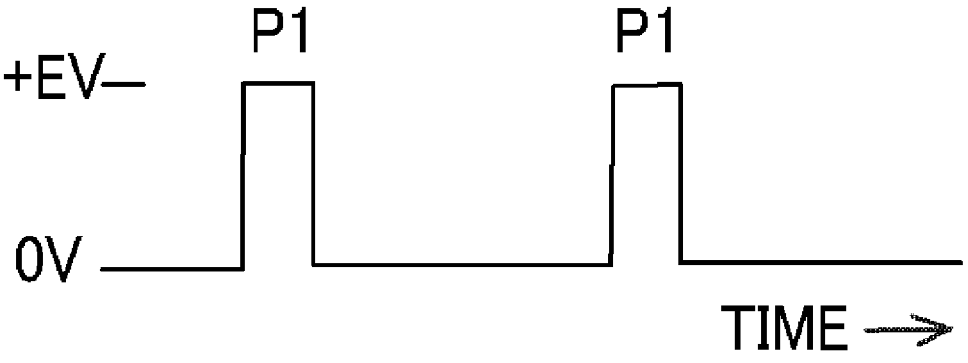
FIGS. 14A to 14C (FIG. 14) are waveform graphs of an example of a drive voltage illustrating the operation of the head.

Here, as illustrated in FIG. 14A, when a voltage (+EV) having a waveform P1 is applied to the piezoelectric element 305, the piezoelectric element 305 expands. Thus, the deformable part 308*a* of the valve mover 308 deforms to pull the valve 307 in the direction indicated by the arrow as illustrated in the lower part of FIG. 13 as described above. Thus, the valve 307 opens the nozzle 302, and the pressurized liquid injected from the injection port 303 is discharged from the nozzle 302.

Figure 14B:
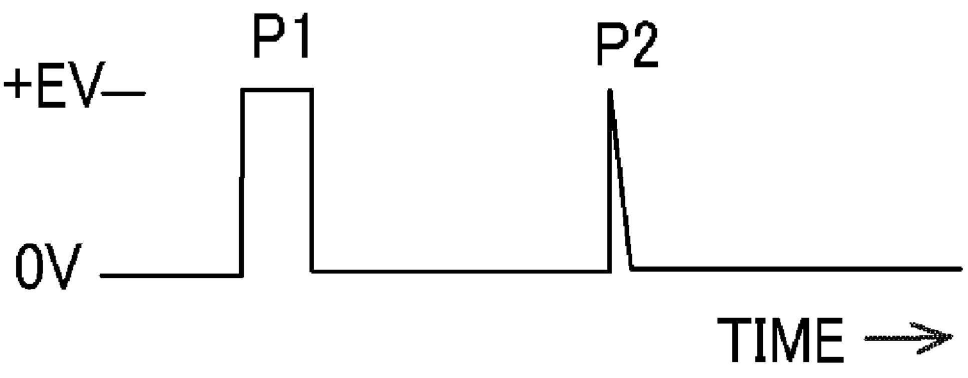
Figure 14C:
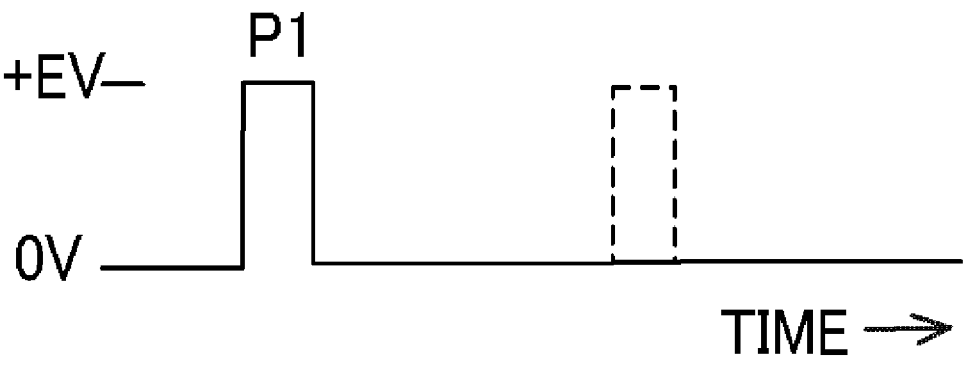

Conversely, a voltage (+EV) having waveforms P1 and P2 may be applied to the piezoelectric element 305 as illustrated in FIG. 14B. A latter part of the waveform P2 disappears on the way as illustrated in FIG. 14B. Further, a voltage having a waveform to be applied to the piezoelectric element 305 may not be applied to the piezoelectric element 305 due to a power failure or the like as illustrated in FIG. 14C.

At this time, the piezoelectric element 305 maintains the contracted state. Thus, the deformable part 308*a* of the valve mover 308 returns to a normal state as illustrated in the upper part of FIG. 13. Therefore, the liquid 311 is not discharged from the nozzle 302 since the valve 307 keeps the nozzle 302 closed.

Thus, even in a case of a power failure or the like, it is possible to prevent the liquid 311 from accidentally leaking from the nozzle 302 or causing nozzle clogging.

Figure 15:
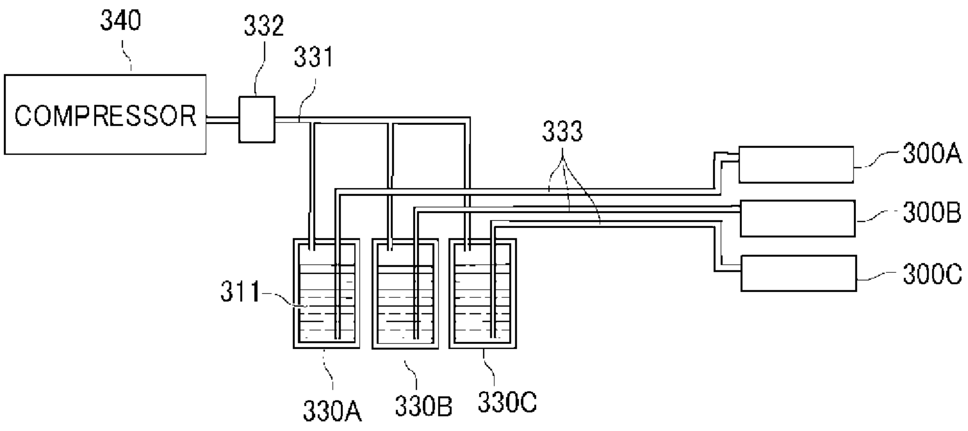
FIG. 15 is a circuit diagram of the liquid supply system to supply a liquid to the head.

Next, a liquid supply system to supply a liquid to the head 300 is described with reference to FIG. 15. FIG. 15 is a circuit diagram of the liquid supply system.

The liquid discharge apparatus 1 includes liquid tanks 330A to 330C as sealed containers in which liquids 311 of respective colors to be discharged from the heads 300A to 300C are stored. Hereinafter, the liquid tanks 330A to 330C are collectively referred to as the "liquid tanks 330." The heads 300A to 300C are collectively referred to as the "heads 300." The liquid tanks 330 and the injection ports 303 (see FIGS. 13A and 13B) of the heads 300 are respectively connected via tubes 333, respectively.

The liquid tanks 330 are connected to a compressor 340 via a pipe 331 including an air regulator 332 and is supplied with pressurized air from the compressor 340.

Accordingly, the pressurized liquids 311 of respective colors are respectively supplied to the injection ports 303 of the heads 300. Thus, as described above, the liquids 311 of respective colors are respectively discharged from the nozzles 302 of the heads 300 in accordance with an opening and closing of the valves 307.

Figure 16:
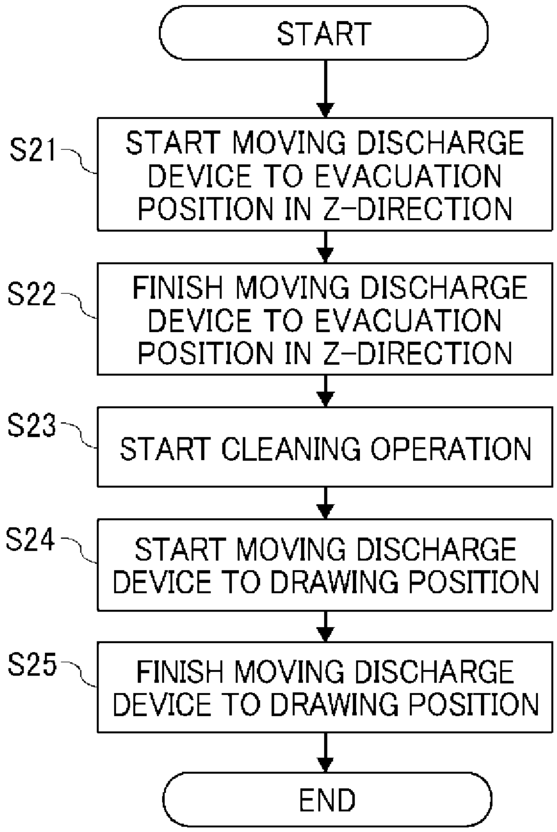
FIG. 16 is a flowchart of an example of a cleaning operation by the controller.

Next, an example of a cleaning process by the controller 500 is described with reference to a flowchart of FIG. 16.

When the cleaning operation is started, the controller 500 starts moving the liquid discharge device 13 to the evacuative position in the Z direction (S21) and ends the movement of the liquid discharge device 13 to the standby (evacuation) position in the Z direction (S22). Thus, the controller 500 drives the Z-direction moving mechanism 19 (retractable part) to move the liquid discharge device 13 in a direction away from the cylinder 2 (columnar member) before performing the wiping operation to wipe the nozzle surface 302*a* with the wiper 201.

Then, the cleaning controller 514 starts the cleaning operation (S23).

Then, the controller 500 starts moving the liquid discharge device 13 to the drawing start position (S24) after completion of the cleaning operation (S24). Then, the controller 500 ends the cleaning operation after completion of a movement of the liquid discharge device 13 to the drawing start position (S25).

The controller 500 may move the liquid discharge device 13 in the X, Y, and Z directions in parallel with the movement of the wiper mover 205 during movement of the liquid discharge device 13 to the standby (evacuation) position, during the cleaning operation, and during a returning operation of the liquid discharge device 13 to the drawing position, as long as the movement of the wiper mover 205 in the cleaning operation does not interfere with the cylinder 2.

Figure 17:
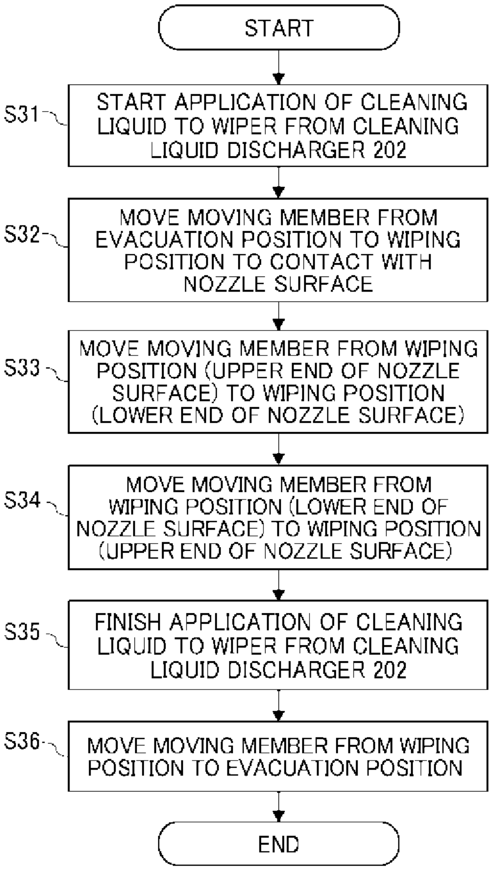
FIG. 17 is a flowchart of a control of the cleaning operation performed by the cleaning controller.

Next, an example of control of the cleaning operation by the cleaning controller 514 is described with reference to FIG. 17.

When the cleaning operation is started, the cleaning controller 514 starts application of the cleaning liquid 220 from the cleaning liquid discharger 202 to the nozzle surface 302*a* of the head 300 (S31). Then, the wiper mover 205 moves the wiper 201 from the standby (evacuation) position indicated by an imaginary line in FIG. 10 to the wiping position to bring the wiper 201 into contact with the nozzle surface 302*a* of the head 300 (S32).

Thus, the cleaning liquid discharger 202 (cleaning liquid applier) applies (discharges or drips) the cleaning liquid 220 to the nozzle surface 302*a* of the head 300 before the wiper 201 contacts the nozzle surface 302*a* of the head 300.

Then, the wiper mover 205 moves the wiper 201 from the wiping position (upper end of the nozzle surface 302*a*) to the wiping position (lower end of the nozzle surface 302*a*), and the wiper 201 wipes the nozzle surface 302*a* of the head 300 (S33).

Next, the wiper mover 205 moves the wiper 201 from the wiping position (the lower end of the nozzle surface 302*a*) to the wiping position (the upper end of the nozzle surface 302*a*), and the wiper 201 wipes the nozzle surface 302*a* of the head 300 (S34).

Then, the cleaning liquid discharger 202 ends an application of the cleaning liquid 220 to the nozzle surface 302*a* of the head 300 (S35). Then, the wiper mover 205 moves from the wiping position to the standby (evacuation) position (S26) and ends the cleaning operation.

Thus, the cleaning liquid discharger 202 (cleaning liquid applier) ends the application (discharge or dripping) of the cleaning liquid 220 to the nozzle surface 302*a* before the wiper 201 returns to the standby (evacuation) position.

The cleaning liquid discharger 202 (cleaning liquid applier) may continuously or intermittently apply the cleaning liquid 220 to the nozzle surface 302*a* from the start (S31) of application of the cleaning liquid 220 to the end (S35) of application of the cleaning liquid 220.

Figure 18:
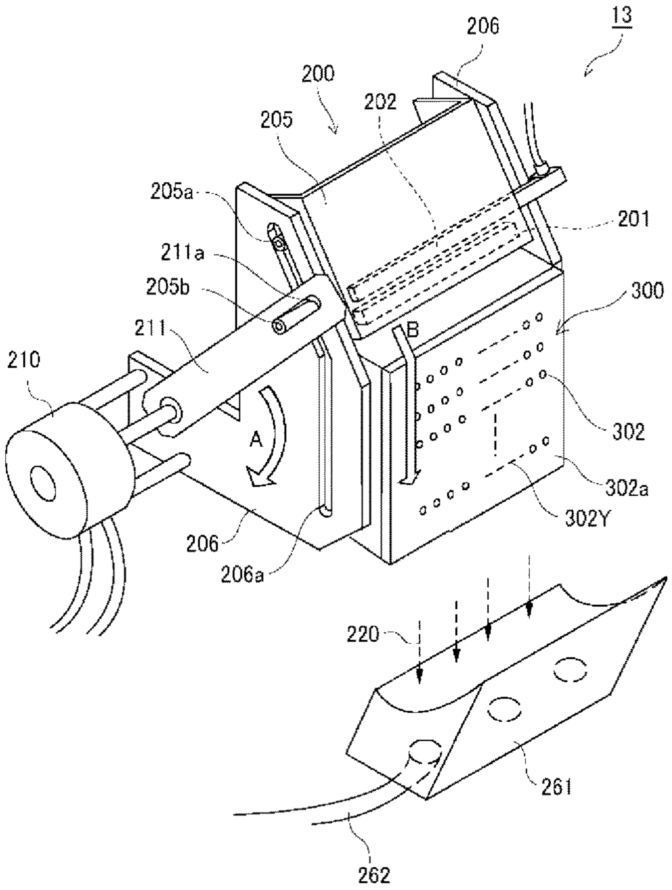
FIG. 18 is a perspective view of the liquid discharge device according to a second embodiment of the present disclosure.

A second embodiment of the present disclosure is described with reference to FIG. 18. FIG. 18 is a perspective view of the liquid discharge device 13 according to the second embodiment of the present disclosure.

The liquid discharge device 13 in the present embodiment uses a head 300 that includes a plurality of (here, six) nozzle arrays 302Y in which a plurality of nozzles 302 are arrayed.

The cleaning mechanism 200 includes a cleaning liquid receiver 261 that receives an excessive cleaning liquid 220 that falls from the nozzle surface 302*a* when the wiping operation is performed. A waste liquid tube 262 is connected to the cleaning liquid receiver 261, and the cleaning liquid 220 collected by the cleaning liquid receiver 261 is discharged to a waste liquid tank 240 or the like.

In each of the above-described embodiments, the wiper mover 205 movably holds the wiper 201 of the liquid discharge device 13 and the cleaning liquid discharger 202 (cleaning liquid applier) so that the wiper 201 and the cleaning liquid discharger 202 move together as a single unit. However, the present disclosure is not limited to the embodiments as described above.

For example, the liquid discharge device may include a cleaning liquid applier at the home position to apply the cleaning liquid 220 on the nozzle surface 302*a* of the head 300. When the cleaning liquid 220 is applied on the nozzle surface 302*a* to perform the wiping, the liquid discharge device 13 may be returned to the home position, and the other units may perform only the wiping operation without application of the cleaning liquid.

In the above-described second embodiment, the cleaning liquid receiver 261 is provided on the liquid discharge device 13 side. Conversely, a cleaning liquid receiver 261 such as a groove part may be arranged on an apparatus body side of the liquid discharge apparatus 1, and the cleaning liquid discharger 202 moves to a position at which the cleaning liquid receiver 261 (groove) is arranged only when the cleaning liquid discharger 202 is applied to the nozzle surface 302*a* to apply the cleaning liquid 220 onto the nozzle surface 302*a*. Thus, the carriage 14 do not have to move together with the cleaning liquid receiver 261. Thus, the liquid discharge apparatus 1 according to the second embodiment can prevent an increase in a weight of the entire carriage 14.

Figure 19:
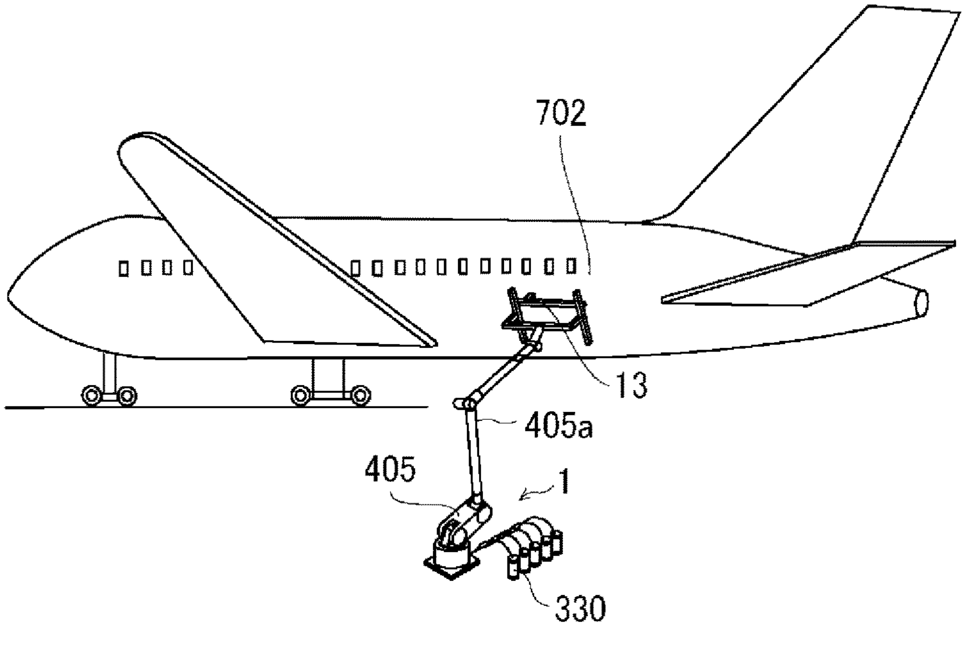
FIG. 19 is a schematic perspective view of the liquid discharge apparatus according to a third embodiment of the present disclosure in which the liquid discharge apparatus prints an image on an aircraft as an object to be printed.
Figure 20:
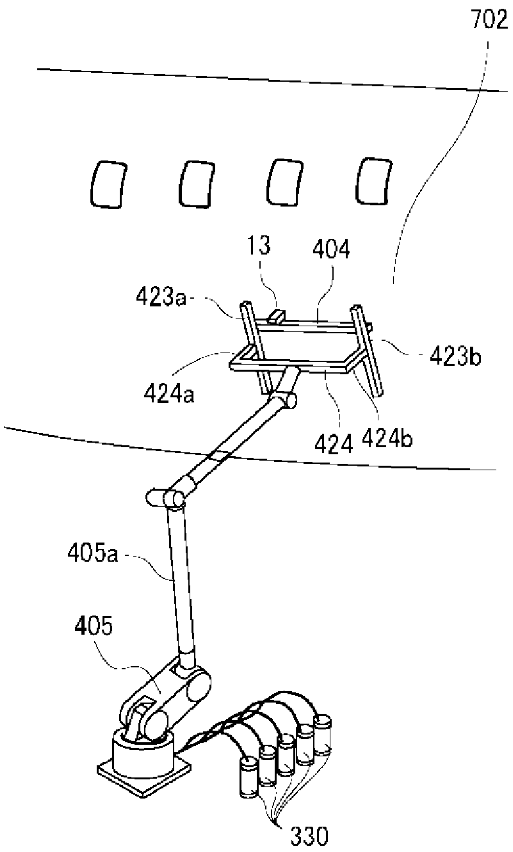
FIG. 20 is an enlarged perspective view of the liquid discharge apparatus of FIG. 19 according to the third embodiment.

A third embodiment of the present disclosure is described with reference to FIGS. 19 and 20. FIG. 19 is a schematic perspective view of the liquid discharge apparatus 1 according to the third embodiment. The liquid discharge apparatus 1 prints an image on an aircraft as an object to be printed. FIG. 20 is an enlarged perspective view of the liquid discharge apparatus 1 of FIG. 19 according to the third embodiment.

The liquid discharge apparatus 1 includes a linear rail 404 and a multi-articulated robot 405. The linear rail 404 guides a carriage 14 mounting the liquid discharge device 13 that reciprocally and linearly moves along the linear rail 404. The multi-articulated robot 405 appropriately moves the linear rail 404 to a predetermined position and holds the linear rail 404 at the predetermined position.

The multi-articulated robot 405 includes a robot arm 405*a* that is freely movable like a human arm by a plurality of joints. The multi-articulated robot 405 can freely move a leading end of the robot arm 405*a* and arrange the leading end of the robot arm 405*a* at an accurate position.

An industrial robot of a six-axis control-type having six axes (six joints) can be used as the multi-articulated robot 405, for example. According to the multi-articulated robot 405 of the six-axis control-type, it is possible to previously teach information related to a movement of the multi-articulated robot 405 to accurately and quickly position the linear rail 404 to face a predetermined position of the object to be printed 702 (aircraft). The number of axes of the multi-articulated robot 405 is not limited to six, and a multi-articulated robot having an appropriate number of axes such as five axes or seven axes can be used.

The liquid discharge apparatus 1 includes a fork-shaped support 424 that is bifurcated into two and is provided on a robot arm 405*a* of the multi-articulated robot 405. The liquid discharge apparatus 1 further includes a vertical linear rail 423*a* attached to a leading end of a left branch 424*a* of the support 424 and a vertical linear rail 423*b* attached to a leading end of a right branch 424*b* of the support 424. The vertical linear rail 423*a* and the vertical linear rail 423*b* are parallel with each other.

Further, both ends of the linear rail 404 that movably holds the liquid discharge device 13 are supported by the vertical linear rails 423*a* and 423*b* to span two of the vertical linear rails 423*a* and 423*b*.

The liquid discharge device 13 includes, for example, a plurality of heads 300 to discharge liquids of respective colors of black, cyan, magenta, yellow, and white, or a head 300 having a plurality of nozzle arrays to discharge the liquids of respective colors. The liquids of respective colors are respectively supplied under pressure from the liquid tanks 330 to the heads 300 of the liquid discharge device 13 or nozzle arrays of the heads 300 in the same manner as in the above-described liquid supply system illustrated in FIG. 28.

In the liquid discharge apparatus 1, the multi-articulated robot 405 moves the linear rail 404 to a facing position at which the linear rail 404 faces a desired print area of the object to be printed 702, and moves the liquid discharge device 13 along the linear rail 404 according to print data while driving the head 300 to print an image on the object to be printed 702.

When the liquid discharge apparatus 1 ends printing of one line, the liquid discharge apparatus 1 drives the vertical linear rails 423*a* and 423*b* of the multi-articulated robot 405 to move the head 300 of the liquid discharge device 13 from one line to a next line.

The liquid discharge apparatus 1 repeats the above-described operation to print an image on a desired print area of the object to be printed 702.

During the printing operation, the liquid discharge device 13 including the wiper 201 can clean the nozzle surfaces 302*a* of the heads 300 with the wiper 201 at any time although a moving distance of the liquid discharge device 13 (heads 300) increases.

Thus, the liquid discharge apparatus 1 can continuously print high quality images with small downtime.

Figure 21:
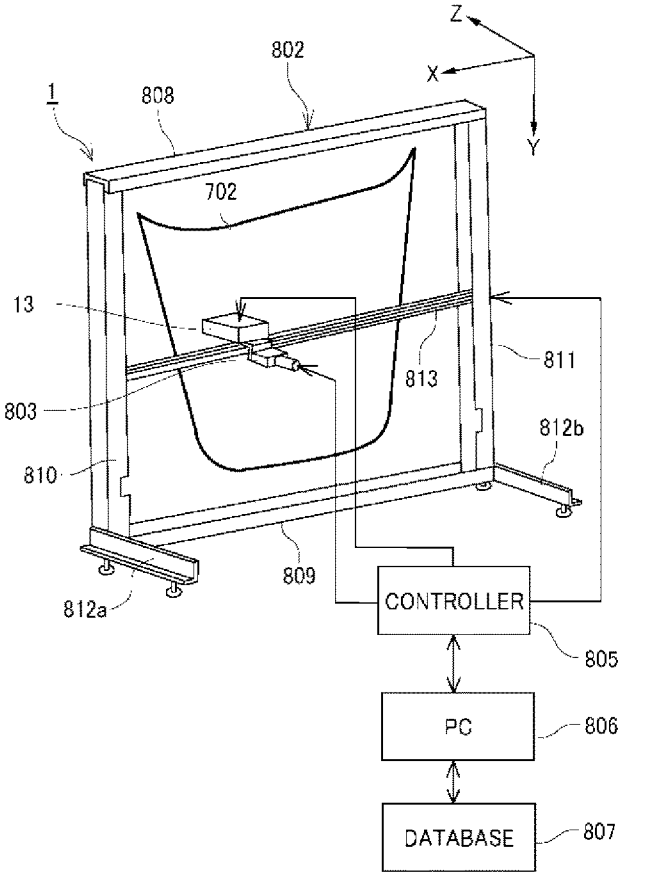
FIG. 21 is a schematic perspective view of the liquid discharge apparatus according to a fourth embodiment of the present disclosure.
Figure 22:
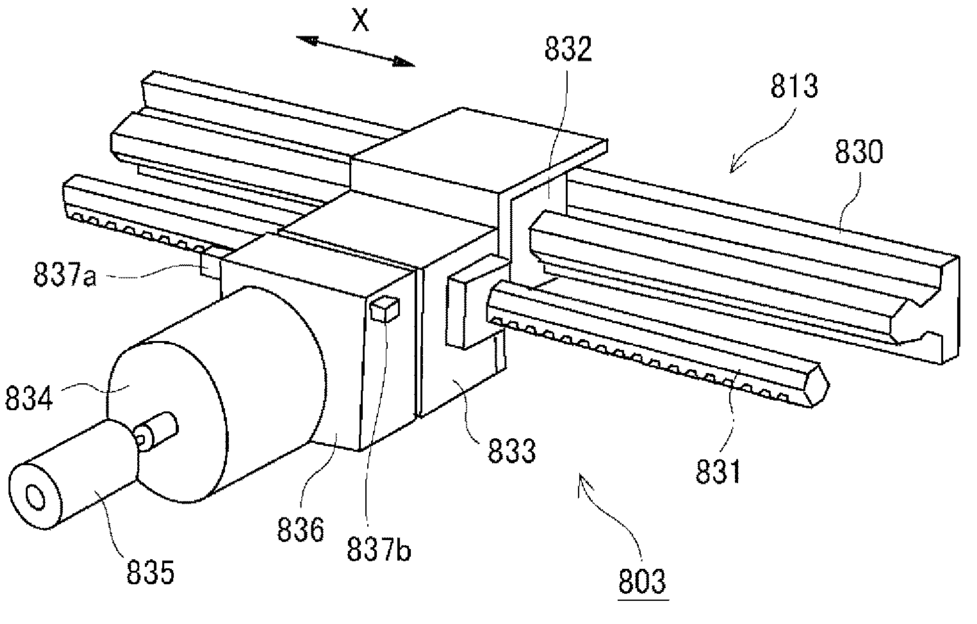
FIG. 22 is a perspective view of a driver of the liquid discharge apparatus of FIG. 21.

A fourth embodiment of the present disclosure is described with reference to FIGS. 21 and 22. FIG. 21 is a perspective view of a liquid discharge apparatus 1 according to the fourth embodiment. FIG. 22 is a perspective view of a driver of the liquid discharge apparatus 1 of FIG. 21.

The liquid discharge apparatus 1 includes a movable frame 802 that is installed to face the object to be printed 702 having a curved surface such as a hood of a vehicle. The frame 802 includes a left frame 810, a right frame 811, and a movable part 813. The movable part 813 is attached to the left frame 810 and the right frame 811 so that the movable part 813 is bridged between the left frame 810 and the right frame 811. The movable part 813 is vertically movable in the Y direction.

The movable part 813 includes a driver 803 having a built-in motor and a liquid discharge device 13 attached to the driver 803. The driver 803 is reciprocally movable in the horizontal direction (X direction or lateral direction) on the movable part 813. The liquid discharge device 13 discharges a liquid toward the object to be printed 702.

Further, the liquid discharge apparatus 1 includes a controller 805 and an information processing apparatus 806. The controller 805 controls a liquid discharge from the liquid discharge device 13, a reciprocal movement of the driver 803, and a vertical movement of the movable part 813. The information processing apparatus 806 such as a personal computer (PC) sends instructions to the controller 805. The information processing apparatus 806 is connected to a database 807 (DB) that records and stores information about the object to be printed 702 such as a shape and a size of the object to be printed 702.

The frame 802 further includes an upper frame 808 and a lower frame 803 in addition to the left frame 810 and the right frame 811 that form a vertical and horizontal outline of the frame 802. The upper frame 808, the lower frame 803, the left frame 810, and the right frame 811 are formed of metal pipes or the like. The frame 802 further includes a left leg 812*a* and a right leg 812*b* attached to both ends of the lower frame 809 to make the frame 802 to be free-standing. The left leg 812*a* and the right leg 812*b* are perpendicularly and horizontally attached to the both ends of the lower frame 809.

The movable part 813 bridged between the left frame 810 and the right frame 811 is vertically movable while supporting the driver 803.

A surface of the object to be printed 702 is perpendicular to a direction of liquid discharge (Z direction). Thus, the surface of the object to be printed 702 faces a plane formed by the upper frame 808, the lower frame 809, the left frame 810, and the right frame 811 of the frame 802.

In the above-case, in order to arrange the object to be printed 702 at a predetermined print position at which the printing is to be performed, for example, a back side of a printing area of the object to be printed 702 is suction-held by a chuck attached to the leading end of an arm of a multi-articulated arm robot. The multi-articulated arm robot is used to accurately arrange the object to be printed 702 at the print position and to appropriately change the posture of the object to be printed 702.

As illustrated in FIG. 22, the driver 803 is reciprocally movable in the horizontal direction (X direction or laterally) along the movable part 813 as a guide rail. The movable part 813 includes a rail 830, a rack gear 831, a linear guide 832, a pinion gear 833, a motor 834, and a rotary encoder 835. The rail 830 is horizontally disposed to bridge between the left frame 810 and the right frame 811 of the frame 802. The rack gear 831 is parallel to the rail 830. The linear guide 832 is fitted on a part of the rail 830 and slidably moves along the rail 830. The pinion gear 833 is connected to the linear guide 832 and engages with the rack gear 831. The motor 834 includes a decelerator 836 and drives to rotate the pinion gear 833. The rotary encoder 835 detects a position of a printing point.

The motor 834 is forwardly or reversely driven to move the liquid discharge device 13 rightward or leftward along the movable part 813. Further, the driver 803 functions as a drive mechanism of the liquid discharge device 13 in the X direction. The decelerator 836 includes limit switches 837*a* and 837*b* attached to both sides of a housing of the decelerator 836.

The liquid discharge device 13 includes, for example, a plurality of heads 300 to discharge liquids of respective colors of black, cyan, magenta, yellow, and white, or a head 300 having a plurality of nozzle arrays to discharge the liquids of respective colors. The Liquids of respective colors are respectively supplied under pressure from the liquid tanks 330 to heads 300 of the liquid discharge device 13 or nozzle arrays of the heads 300 in the same manner as in the above-described liquid supply system illustrated in FIG. 28.

The liquid discharge apparatus 1 moves the movable part 813 in the Y direction and moves the liquid discharge device 13 in the X direction so that a desired image is printed on the object to be printed 702.

During the printing operation, the liquid discharge device 13 including the wiper 201 can clean the nozzle surfaces 302*a* of the heads 300 with the wiper 201 at any time although a moving distance of the liquid discharge device 13 (heads 300) increases.

Thus, the liquid discharge apparatus 1 can continuously print high quality images with small downtime.

Figure 23A:
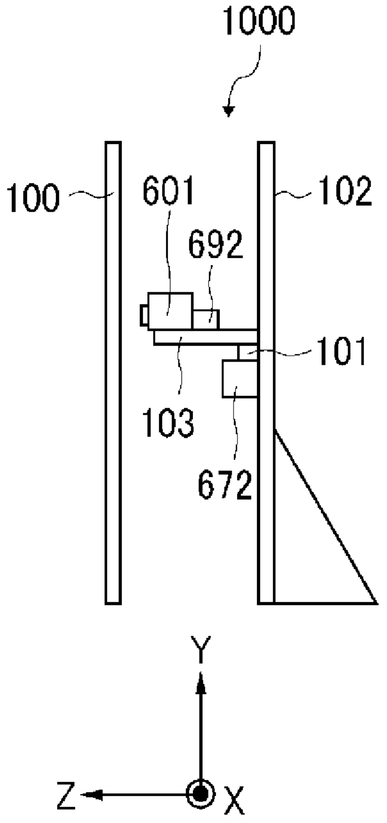
FIGS. 23A and 23B (FIG. 23) illustrate the liquid discharge apparatus according to a fifth embodiment of the present disclosure.
Figure 23B:
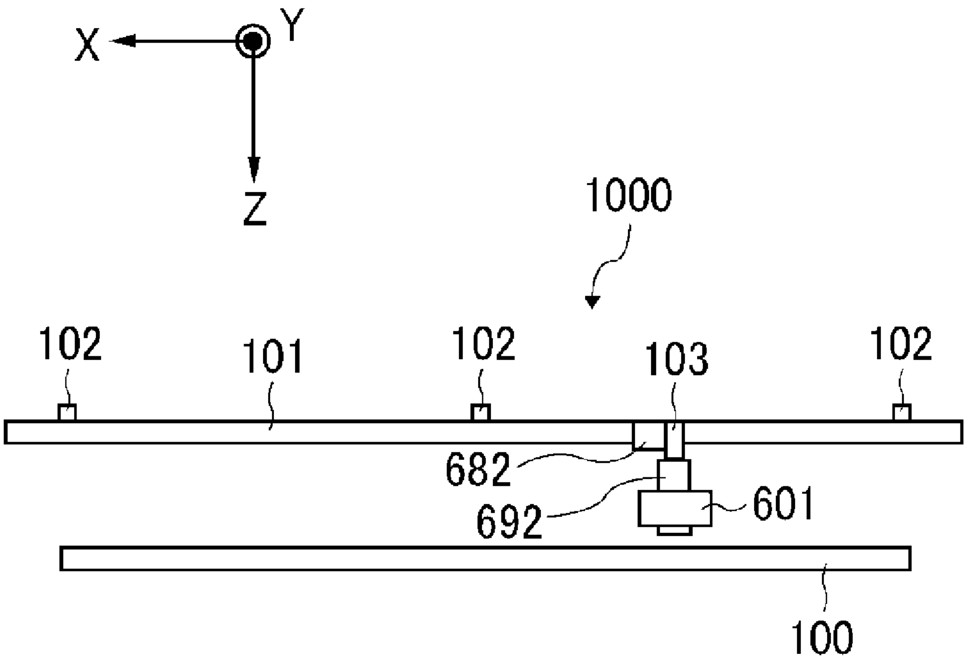

FIGS. 23A and 23B illustrate a liquid discharge apparatus 1000 according to a fifth embodiment of the present disclosure.

FIG. 23A is a right-side view of the liquid discharge apparatus 1000 according to the fifth embodiment of the present disclosure. FIG. 23B is a plan view of the liquid discharge apparatus 1000.

The liquid discharge apparatus 1000 includes a carriage 14 that faces a drawing object 100 as an example of an object to be printed. The carriage 601 mounts a head 300 (see FIG. 24) that discharges an ink as an example of a liquid toward the drawing object 100. The carriage 601 is an example of a liquid discharge device that discharges a liquid toward the drawing object 100.

The liquid discharge apparatus 1000 includes a Z-axis rail 103, an X-axis rail 101, and a Y-axis rail 102. The Z-axis rail 103 movably holds the carriage 601 in a Z-axis direction. The X-axis rail 101 movably holds the Z-axis rail 103 in an X-axis direction. The Y-axis rail 102 movably holds the X-axis rail 101 in a Y-axis direction. The X-axis rail 101, the Y-axis rail 102, and the Z-axis rail 103 are examples of a guide that movably holds the carriage 601.

Further, the liquid discharge apparatus 1000 includes a Z-direction diver 692, an X-direction driver 672, and a Y-direction driver 682. The Z-direction driver 692 moves the carriage 601 in the Z-axis direction along the Z-axis rail 103. The X-direction driver 672 moves the Z-axis rail 103 in the X-axis direction along the X-axis rail 101. The Y-direction driver 682 moves the X-axis rail 101 in the Y-axis direction along the Y-axis rail 102.

Thus, the liquid discharge apparatus 1000 can discharge an ink on the drawing object 100 while moving the carriage 601 in the X-axis direction, the Y-axis direction, and the Z-axis direction. Although the drawing object 100 has a form of a flat plate in FIGS. 23A and 23B, the drawing object 100 may have a curved surface as long as the surface is nearly vertical, such as a body of a vehicle such as a car, a truck, or an aircraft.

Figure 24:
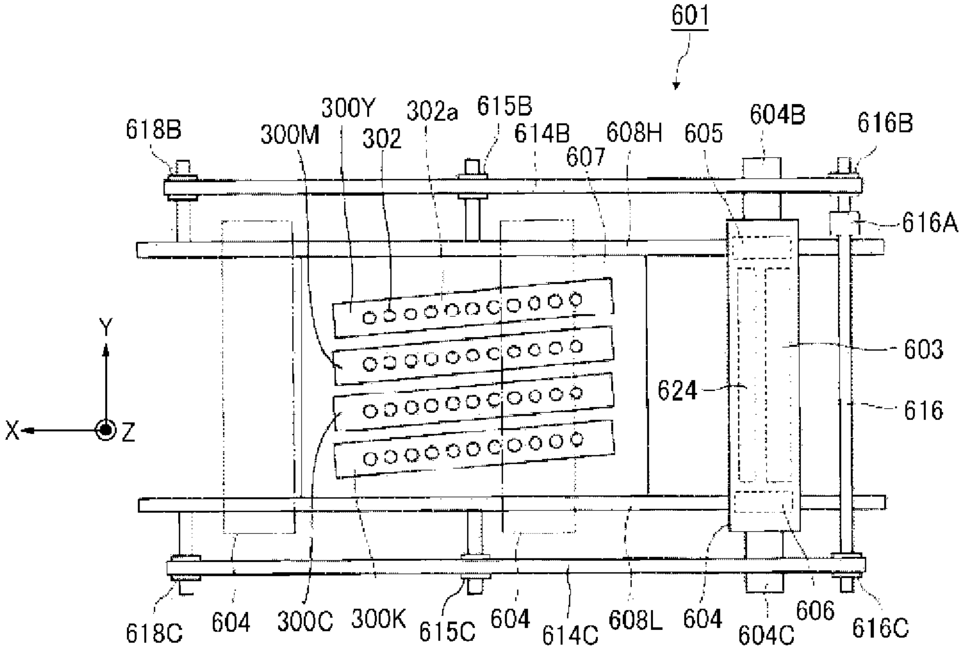
FIG. 24 is a front view of a carriage according to the fifth embodiment.

FIG. 24 is a front view of the carriage 601 according to the present embodiment.

Figure 25:
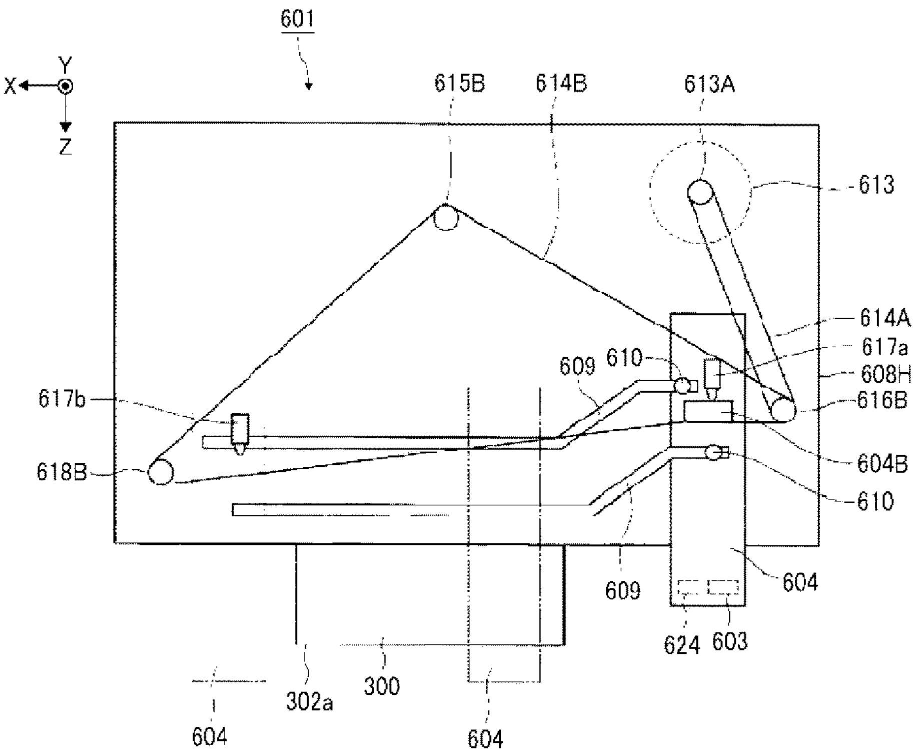
FIG. 25 is a schematic plan view of the carriage of FIG. 24 according to the fifth embodiment.
Figure 26:
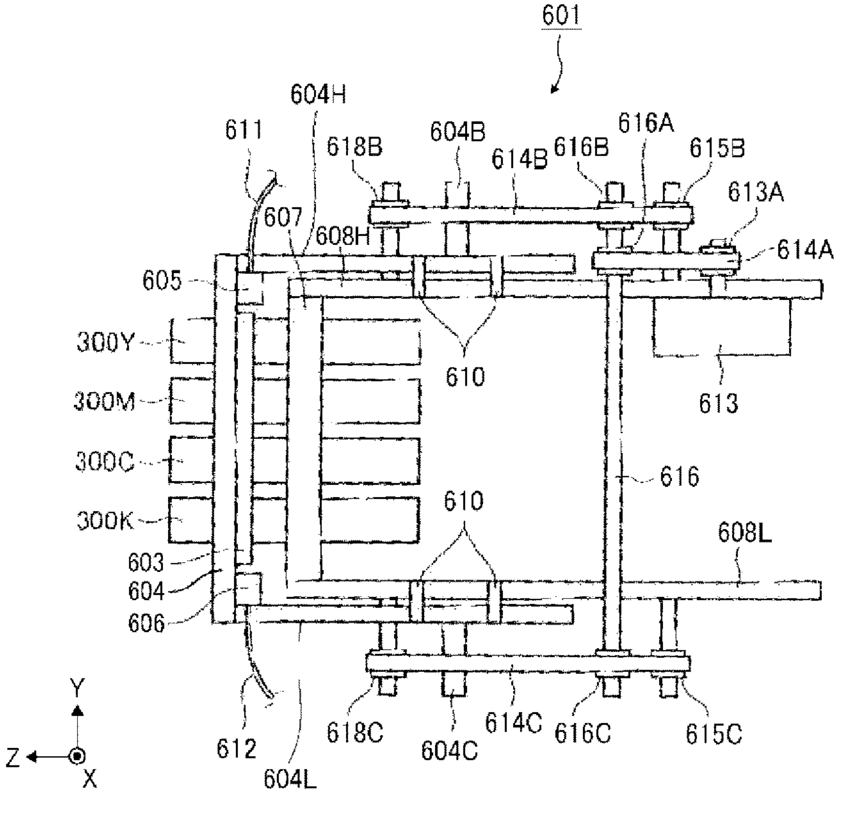
FIG. 26 is schematic side view of the carriage of FIGS. 24 and 25 according to the fifth embodiment.

FIG. 25 is a schematic plan view of the carriage 601 of FIG. 24 according to the present embodiment. FIG. 26 is a schematic side view of the carriage 601 of FIGS. 24 and 25 according to the present embodiment.

The carriage 601 includes heads 300Y, 300M, 300C, and 300K that discharge inks of respective colors of Y, M, C, and K. Hereinafter, the heads 300Y, 300M, 300C, and 300K are collectively referred to as the "heads 300." Each of the heads 300 includes a nozzle surface 302*a* having a plurality of nozzles 302.

The carriage 601 includes a head fixing plate 607 to fix the heads 300Y, 300M, 300C, and 300K such that the nozzle surface 302*a* intersects with a horizontal plane, and the plurality of nozzles 302 are arrayed in a direction inclined with respect to the X-axis direction (see FIG. 24). Thus, the nozzle 302 discharges ink in a direction intersecting with a direction of gravity.

Specifically, the heads 300Y, 300M, 300C, and 300K are arranged so that the nozzle surface 302*a* is orthogonal to the horizontal plane. Thus, the heads 300Y, 300M, 300C, and 300K discharge ink form the nozzles 302 in the horizontal direction.

The carriage 601 further includes a wiper unit 604 including an ink receiving surface 624, a wiper 603, a cleaning liquid supplier 605, and a cleaning liquid collector 606.

The ink receiving surface 624 is an example of a liquid receiving surface that receives ink discharged from the nozzles 302.

The wiper 603 is an example of a contact part that contacts the nozzles 302 and the nozzle surface 302*a* when the wiper unit 604 moves while the ink receiving surface 624 facing the nozzle 302 (nozzle surface 302*a*). The wiper 603 extends in a direction parallel to the nozzle surface 302*a*. The wiper 603 is also an example of a protrusion that protrudes toward the nozzles 302 from the ink receiving surface 624 and extends in a direction parallel to the ink receiving surface 624 in a state in which the ink receiving surface 624 faces the nozzle 302 (nozzle surface 302*a*).

Figure 31A:
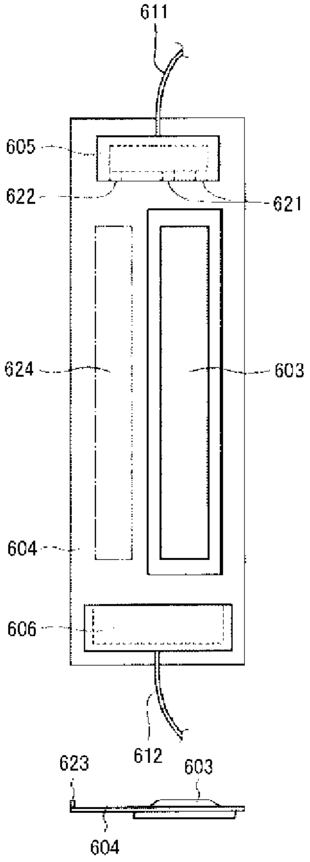
FIGS. 31A and 31B (FIG. 31) illustrate the wiper unit in the fifth embodiment.

The cleaning liquid 220 is supplied to the cleaning liquid supplier 605 via a cleaning liquid supply tube 611 as a flexible tube (see FIG. 31A). The cleaning liquid supplier 605 supplies the cleaning liquid 220 to the wiper 603 and the ink receiving surface 624 from above (see FIG. 31A). The cleaning liquid collector 606 is an example of a liquid holder to hold the ink received by the ink receiving surface 624. The cleaning liquid collector 606 is disposed below the ink receiving surface 624. The cleaning liquid collector 606 is also an example of a cleaning liquid holder that holds the cleaning liquid supplied to the wiper 603 and the ink receiving surface 624. Then, the cleaning liquid collector 606 discharges the ink and the cleaning liquid 220 via a cleaning-liquid collection tube 612 as a flexible tube.

The carriage 601 includes an upper guide plate 608H, a lower guide plate 608L, an upper plate 604H, and a lower plate 604L. The upper guide plate 608H is fixed to an upper part of the head fixing plate 607. The lower guide plate 608L is fixed to a lower part of the head fixing plate 607. The upper plate 604H is fixed to an upper part of the wiper unit 604. The lower plate 604L is fixed to a lower part of the wiper unit 604. The head fixing plate 607, the upper guide plate 608H, and the lower guide plate 608L are examples of a housing that holds the nozzles 302 of the heads 300 and movably supports the wiper unit 604.

A guide groove 609 is formed in the upper guide plate 608H, and the guide groove 609 is also formed in the lower guide plate 608L. The upper plate 604H and the lower plate 604L include pins 610 protruding toward the upper guide plate 608H and the lower guide plate 608L, respectively.

Further, the carriage 601 includes a motor 613, a roller 613A, a belt 614A, a roller 616A, a rotation shaft 616, a roller 616B, a belt 614B, rollers 615B and 618B, and an upper mounting part 604B. The roller 613A rotates coaxially with the motor 613. The belt 614A is wound around the roller 613A. The belt 614A is wound around the roller 616A. The rotation shaft 616 coaxially supports the roller 616A. The roller 616B is coaxially supported by the rotation shaft 616. The belt 614B is wound around the roller 616B. The belt 614B is wound around the roller 615B and the roller 618B. The upper mounting part 604B connects the upper plate 604H of the wiper unit 604 and the belt 614B.

The carriage 601 includes a roller 616C, a belt 614C, rollers 615C and 618C, and a lower mounting part 604C. The roller 616C is coaxially supported by the rotating shaft 616. The belt 614C is wound around the roller 616C. The belt 614C is wound around the rollers 615C and 618C. The lower mounting part 604C connects the lower plate 604L of the wiper unit 604 and the belt 614C.

The carriage 601 includes a sensors 617*a* and 617*b*. The sensor 617*a* detects that the upper mounting part 604B positions at a right end side (negative side in the X-axis direction). The sensor 617*b* detects that the lower mounting part 604C positions at a left end side (positive side in the X-axis direction). In the present embodiment, the sensor 617*a* detects that the wiper unit 604 positions at a standby position (home position), and the sensor 617*b* detects that the wiper unit 604 positions at a moving end position (return position).

The carriage 601 with the above-described configuration drives the motor 613 and transmits a rotational driving force of the motor 613 to the belts 614B and 614C via the belt 614A to move the wiper unit 604 connected to the belts 614B and 614C. At this time, the pin 610 slides inside the guide grooves 609 to move along the guide grooves 609. Thus, the wiper unit 604 moves along a trajectory along a shape of the guide grooves 609.

As illustrated in FIG. 24, when the wiper unit 604 moves in the left and right directions (X-axis direction), the wiper unit 604 moves in the horizontal (lateral) direction (so as not to change a position in the Y-axis direction) so that a posture of the wiper unit 604 does not change. Thus, the wiper unit 604 moves in the left and right direction (X-axis direction) so that an inclination of the wiper unit 604 with respect to the horizontal plane does not change, and a height of the wiper unit 604 also does not change. Here, a position of the cleaning liquid collector 606 with respect to the wiper unit 604 is fixed. In other words, the cleaning liquid collector 606 is fixed to the wiper unit 604. Thus, an inclination of the cleaning liquid collector 606 with respect to the horizontal plane does not change during a movement of the wiper unit 604 in the left and right direction (X-axis direction). Further, a height of the cleaning liquid collector 606 does not change during the movement of the wiper unit 604 in the left and right direction (X-axis direction).

Then, as illustrated in FIG. 25, the guide grooves 609 are formed so that the wiper unit 604 moves from a back side to a front side (positive side in the Z-axis direction) as the wiper unit 604 moves from the right side to the left side (positive side in the X-axis direction).

At the standby position (right side in FIGS. 24 and 25), the wiper unit 604 is located closer to the back side (negative side in the Z-axis direction) than the nozzles 302 and does not face the nozzles 302.

Then, as the wiper unit 604 moves to the left side (positive side in the X-axis direction), the wiper unit 604 moves to the front side (positive side in the Z-axis direction) of the nozzles 302 (nozzle surface 302*a*) and further moves to the left side (positive side in the X-axis direction) to face the nozzles 302 (facing position). In the state in which the wiper unit 604 faces the nozzles 302 (nozzle surface 302*a*), the wiper 603 can contact the nozzle surface 302*a*, and the ink receiving surface 624 can receive the ink discharged from the nozzles 302. The wiper unit 604 moves to the left side (positive side in the X-axis direction) while the wiper unit 604 facing the nozzles 302, so that the wiper 603 wipes and cleans the nozzle surface 302*a* and the nozzle 302 of the heads 300.

Further, when the wiper unit 604 moves to the left (the positive side in the X-axis direction), the wiper unit 604 does not face the nozzles 302.

Then, when the wiper unit 604 moves to the moving end position, the wiper unit 604 moves rightward (negative side in the X-axis direction) and returns to the standby position.

Thus, the wiper unit 604 is an example of a wiper mover that can move the wiper 603 and the ink receiving surface 624 between the facing position at which the wiper 603 and the ink receiving surface 624 face the nozzles 302 and the standby position (home position) at which the wiper 603 and the ink receiving surface 624 do not face the nozzles 302. Further, the wiper unit 604 is movable so that the wiper 603 is horizontally (laterally) movable in the facing position at which the wiper 603 faces the nozzle surface 302*a*.

As described above, the carriage 601 includes the heads 300 that discharges ink toward the drawing object 100 from the nozzles 302, the ink receiving surface 624 that receives the ink discharged from the nozzles 302, the cleaning liquid collector 606 that holds the ink received by the ink receiving surface 624, and the wiper unit 604 that is movable between the facing position at which the ink receiving surface 624 faces the nozzles 302 and the standby position (home position) at which the ink receiving surface 624 does not face the nozzles 302 while keeping (maintain) the inclination of the cleaning liquid collector 606 with respect to the horizontal surface to be constant. In other words, the wiper unit 604 does not change the inclination of the cleaning liquid collector 606 with respect to the horizontal surface while the wiper unit 604 moves between the facing position at which the ink receiving surface 624 faces the nozzles 302 and the standby position at which the ink receiving surface 624 does not face the nozzles 302.

Thus, the carriage 601 moves the ink receiving surface 624 to the facing position at which the ink receiving surface 624 faces the nozzles 302 so that the heads 300 on the carriage 601 can discharge the ink to the ink receiving surface 624 from the nozzles 302 without moving the nozzles 302 of the heads 300 to the ink receiving surface 624. Further, it is possible to reduce a possibility in which the ink received by the ink receiving surface 624 is shaken and overflown from the cleaning liquid collector 606 when the ink receiving surface 624 moves to the standby position at which the ink receiving surface 624 does not face the nozzles 302.

Further, the liquid discharge apparatus 1000 includes the carriage 601, the X-axis rail 101, the Y-axis rail 102, and the Z-axis rail 103 that movably hold the carriage 601 as illustrated in FIG. 23.

Thus, the carriage 601 can discharge ink toward the drawing object 100 while moving in the X-axis, Y-axis, and Z-axis directions. Irrespective of the position of the carriage 601 with the drawing object 100, the carriage 601 moves the ink receiving surface 624 to the facing position to face the nozzles 302 when necessary to enable the head 300 to discharge the ink to the ink receiving surface 624 from the nozzles 302 without moving the nozzles 302 of the heads 300 to the ink receiving surface 624. In other words, irrespective of the position of the carriage 601 in the liquid discharge apparatus 1000, the head 300 can discharge the ink to the ink receiving surface 624 from the nozzles 302 without moving the carriage 601 to the ink receiving surface 624.

Thus, the liquid discharge apparatus 1000 can continuously draw high quality images with smaller downtime since the liquid discharge apparatus 1000 can reduce a time needed for the carriage 601 to move to the ink receiving surface 624 compared with the configuration in which the carriage 601 moves toward the ink receiving surface 624, a position of which is fixed.

The wiper unit 604 is movable without changing the height of the cleaning liquid collector 606. Thus, when the wiper unit 604 moves, the cleaning liquid 220 held by the cleaning liquid collector 606 does not receive a force in the height direction (gravity direction). Thus, the cleaning liquid 220 held by the cleaning liquid collector 606 is less likely to be shaken and overflown from the cleaning liquid collector 606.

The heads 300 discharges ink from the nozzles 302 in a direction intersecting with the gravity direction, and the cleaning liquid collector 606 is below the ink receiving surface 624. Thus, the cleaning liquid collector 606 can hold the ink that is discharged toward the ink receiving surface 624 from the nozzles 302 of the heads 300 and is dropped to the cleaning liquid collector 606 by gravity.

The cleaning liquid collector 606 holds the cleaning liquid 220 supplied to the ink receiving surface 624. Thus, the wiper unit 604 can clean the ink receiving surface 624 and also prevent the cleaning liquid 220 received by the ink receiving surface 624 to be overflown from the cleaning liquid collector 606 when the ink receiving surface 624 moves to the standby position not facing the nozzles 302.

The wiper unit 604 includes a cleaning liquid supplier 605 that supplies a cleaning liquid 220 to the ink receiving surface 624. Thus, the wiper unit 604 can reliably supply the cleaning liquid 220 to the ink receiving surface 624 to reliably clean the ink receiving surface 624.

Thus, the carriage 601 includes a nozzle surface 302*a* including nozzles 302 to discharge ink toward the drawing object 100, the wiper 603 to contact with the nozzle surface 302*a*, the cleaning liquid collector 606 to hold the cleaning liquid 220 supplied to the wiper 603, and the wiper unit 604 that holds the wiper 603 and the cleaning liquid collector 606. The wiper unit 604 is movable between the facing position at which the wiper 603 faces the nozzle surface 302*a* and the standby position at which the wiper 603 does not face the nozzle surface 302*a* without changing the inclination of the cleaning liquid collector 606 with respect to the horizontal plane. In other words, the wiper unit 604 keeps a constant inclination of the cleaning liquid collector 606 with the horizontal plane during the movement between the facing position and the standby position. Further, the wiper unit 604 keeps a constant inclination of the cleaning liquid collector 606 with the horizontal plane during the movement in a region in which the wiper unit 604 faces the nozzle surface 302*a* of the head 300. The wiper 603 preferably extends in a direction parallel to the nozzle surface 302*a*.

The wiper 603 moves to the facing position at which the wiper 603 faces the nozzle surface 302*a* so that the wiper 603 supplied with the cleaning liquid 220 can contact the nozzle surface 302*a* to wipe and clean the nozzle surface 302*a* without moving the nozzle surface 302*a* of the head 300 to the wiper 603.

In other words, irrespective of the position of the carriage 601 in the liquid discharge apparatus 1000, the wiper 603 can contact the nozzle surface 302*a* to wipe and clean the nozzle surface 302*a* without moving the carriage 601 to the wiper 603.

Further, the carriage 601 can reduce a possibility in which the cleaning liquid 220 in the cleaning liquid collector 606 is shaken and overflown from the cleaning liquid collector 606 when the wiper 603 moves to the standby position at which the wiper 603 does not face the nozzle surface 302*a*.

Further, the liquid discharge apparatus 1000 includes the carriage 601, the X-axis rail 101, the Y-axis rail 102, and the Z-axis rail 103 that movably hold the carriage 601 as illustrated in FIG. 23.

Thus, the carriage 601 can discharge ink toward the drawing object 100 while moving in the X-axis, Y-axis, and Z-axis directions. Irrespective of the position of the carriage 601 in the liquid discharge apparatus 1000, the carriage 601 moves the wiper 603 to the facing position at which the wiper 603 faces the nozzle surface 302*a* when necessary. Thus, the wiper 603 supplied with the cleaning liquid 220 can contact the nozzle surface 302*a* of the head 300 and wipe and clean the nozzle surface 302*a* without moving the nozzle surface 302*a* (carriage 601) to the wiper 603.

Thus, the liquid discharge apparatus 1000 can continuously draw high quality images with smaller downtime since the liquid discharge apparatus 1000 can reduce a time needed for the carriage 601 to move to the wiper 603 compared with the configuration in which the carriage 601 moves toward the wiper 603, a position of which is fixed.

The wiper unit 604 is movable without changing the height of the cleaning liquid collector 606. Thus, when the wiper unit 604 moves, the cleaning liquid 220 held by the cleaning liquid collector 606 does not receive a force in the height direction (gravity direction). Thus, the cleaning liquid 220 held by the cleaning liquid collector 606 is less likely to be shaken and overflown from the cleaning liquid collector 606.

The wiper unit 604 is movable without changing the height of the cleaning liquid collector 606. Thus, when the wiper unit 604 moves, the cleaning liquid 220 held by the cleaning liquid collector 606 does not receive a force in the height direction (gravity direction). Thus, the cleaning liquid 220 held by the cleaning liquid collector 606 is less likely to be shaken and overflown from the cleaning liquid collector 606.

The wiper unit 604 is movable without changing the height of the cleaning liquid collector 606 in a facing region in which the wiper 603 faces the nozzle surface 302*a* of the head 300. Further the wiper unit 604 is horizontally (laterally) movable in the facing region. Further the wiper unit 604 is horizontally (laterally) movable in the facing region. The facing region is a horizontal portion of the guide groove 609 in FIG. 25, for example. More specifically, the facing region is a region in which the wiper 603 faces the nozzle surface 302*a* as illustrated in FIGS. 24 and 25. Thus, when the wiper unit 604 moves, the cleaning liquid 220 held by the cleaning liquid collector 606 does not receive a force in the height direction (gravity direction). Thus, the cleaning liquid 220 held by the cleaning liquid collector 606 is less likely to be shaken and overflown from the cleaning liquid collector 606.

Further, the wiper unit 604 keeps a constant inclination of the cleaning liquid collector 606 with the horizontal plane during the movement between the facing position at which the wiper 603 faces the nozzle surface 302*a* and the standby position at which the wiper 603 does not face the nozzle surface 302*a*.

The wiper unit 604 may keep the cleaning liquid collector 606 horizontal during the movement between the facing position at which the wiper 603 faces the nozzle surface 302*a* and the standby position at which the wiper 603 does not face the nozzle surface 302*a*.

Thus, when the wiper 603 moves to the facing position, the wiper 603 to which the cleaning liquid is supplied can contact, wipe, and clean the nozzle surface 302*a* without moving the nozzle surface 302*a* (carriage 301) to the wiper 603. Thus, the cleaning liquid 220 held by the cleaning liquid collector 606 is less likely to be shaken and overflown from the cleaning liquid collector 606 during movement of the wiper 603 to the nozzle surface 302*a*.

The carriage 601 includes a head fixing plate 607 that holds the nozzle surface 302*a* and movably supports the wiper unit 604, and guide plates 608H and 608L (an example of a housing).

The wiper unit 604 includes a cleaning liquid supplier 605 that supplies a cleaning liquid 220 to the wiper 603. Thus, the cleaning liquid supplier 605 reliably supplies the cleaning liquid 220 to the wiper 603 so that the wiper 603 can reliably wipe and clean the nozzle surface 302*a*.

The nozzle surface 302*a* is arranged in a direction intersecting with the horizontal plane, the wiper 603 extends downward, and the cleaning liquid supplier 605 supplies the cleaning liquid 220 from above the wiper 603. Thus, the cleaning liquid supplier 605 reliably supplies the cleaning liquid 220 to a lower part of the wiper 603 so that the wiper 603 can reliably wipe and clean a lower part of the nozzle surface 302*a*.

Figure 27:
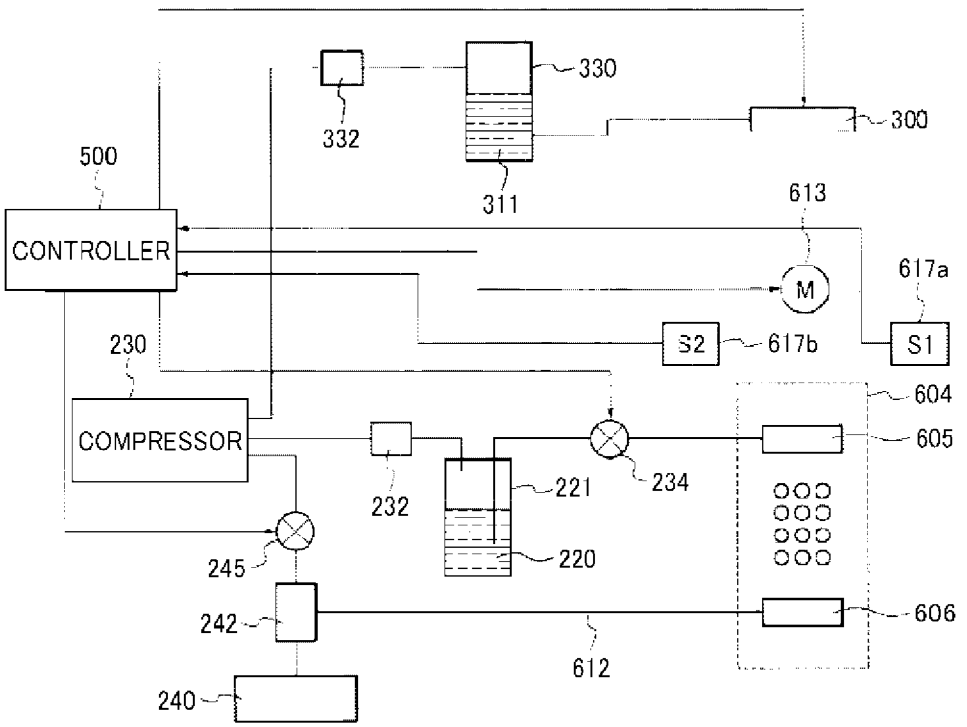
FIG. 27 is a circuit diagram illustrating a control system in the fifth embodiment of the present disclosure.

FIG. 27 is a circuit diagram illustrating a control system in the embodiment of the present disclosure. The liquid discharge apparatus 1000 includes a compressor 230 and air regulator 332 to supply pressurized air and a liquid tank 330 to store ink (liquid 311). Thus, the liquid discharge apparatus 1000 can supply the pressurized air from the compressor 230 and the air regulator 332 to the liquid tank 330. Here, the compressor 230 is an example of a pressurized air supplier, and the liquid tank 330 is an example of a liquid holder.

Further, the liquid discharge apparatus 1000 includes an air regulator 232 connected to the compressor 230, a cleaning liquid tank 221 to store the cleaning liquid 220, and an openably closable valve 234 between the cleaning liquid tank 221 and the cleaning liquid supplier 605. Thus, the liquid discharge apparatus 1000 can supply the pressurized air from the compressor 230 and the air regulator 232 to the cleaning liquid tank 221.

Further, the liquid discharge apparatus 1000 includes a vacuum generator 242, a solenoid valve 245, and a waste liquid tank 240. The solenoid valve 245 is connected to the compressor 230 and a pressure port of the vacuum generator 242. The waste liquid tank 240 is connected to a drain port of the vacuum generator 242. A cleaning-liquid collection tube 612 is connected to a suction port of the vacuum generator 242. The vacuum generator 242 is an example of a negative pressure generator, and the waste liquid tank 240 is an example of a cleaning liquid collector.

The liquid discharge apparatus 1000 includes a controller 500 that controls a motor 613 based on detection signals from the sensors 617*a* and 617*b* as illustrated in FIGS. 24 to 26. Further, the controller 500 controls a X-direction driver 672, the Y-direction driver 682, and the Z-direction driver 692 as illustrated in FIGS. 23A and 23B. The controller 500 also controls the head 300, the openably closable valve 234, and the solenoid valve 245.

The controller 500 includes circuitry such as a central processing unit (CPU) to control entire liquid discharge apparatus 1000, for example, a read-only memory (ROM), a random-access memory (RAM), and an interface (I/F). The CPU 501 controls the entire liquid discharge apparatus 1000. The ROM stores programs, which include a program to cause the CPU to perform the control of such as a drawing operation, for example, and other fixed data. The RAM temporarily stores drawing data and the like. The I/F transmits and receives data and signals that are used when the controller 500 receives drawing data and the like from a host such as a personal computer (PC).

In the above-described configuration, the controller 500 controls the heads 300, so that the pressurized ink is supplied from the liquid tank 330 to the heads 300.

When the controller 500 opens the openably closable valve 234, the pressurized cleaning liquid 220 is supplied from the cleaning liquid tank 221 to the cleaning liquid supplier 605.

When the controller 500 opens the solenoid valve 245 and the compressor 230 sends the pressurized air to the vacuum generator 242, a negative pressure is generated in the suction port of the vacuum generator 242. The liquid in the cleaning liquid collector 606 is sucked through the cleaning-liquid collection tube 612 and discharged to the waste liquid tank 240.

As described above, the liquid discharge apparatus 1000 includes the waste liquid tank 240 connected to the cleaning liquid collector 606 via the cleaning-liquid collection tube 612. Thus, the cleaning liquid 220 held by the cleaning liquid collector 606 can be collected by the waste liquid tank 240 irrespective of a position of the carriage 601 with respect to the drawing object 100.

The liquid discharge apparatus 1000 includes a vacuum generator 242 that generates a negative pressure between the cleaning-liquid collection tube 612 and the waste liquid tank 240. Thus, the cleaning liquid 220 held by the cleaning liquid collector 606 can be reliably collected by the waste liquid tank 240.

Figure 28:
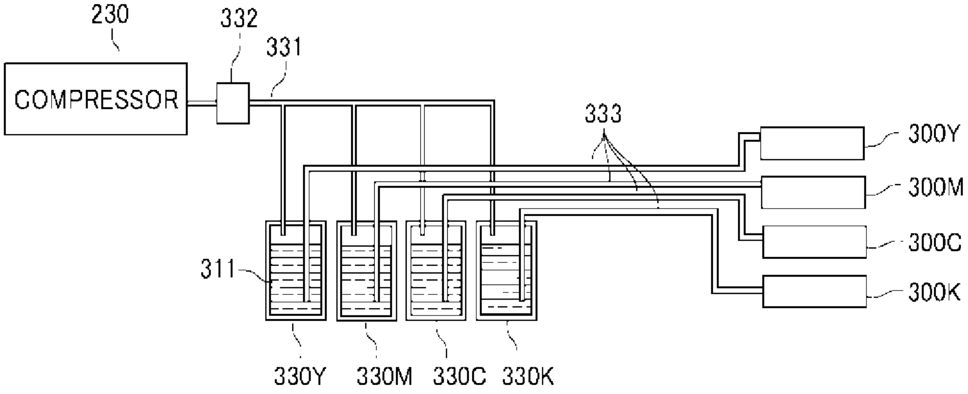
FIG. 28 is a circuit diagram illustrating a liquid supply system in the fifth embodiment of the present disclosure.

The liquid discharge apparatus 1000 includes the compressor 230 that supplies the pressurized air, and a liquid tank 330 that receives the pressurized air supplied from the compressor 230 and supplies pressurized ink to the nozzles 302. The vacuum generator 242 generates a negative pressure using the pressurized air received from the compressor 230. Thus, the cleaning liquid 220 held by the cleaning liquid collector 606 can be reliably collected by the waste liquid tank 240 using the compressor 230 that supplies ink to the heads 300. FIG. 28 is a circuit diagram illustrating a liquid supply system in the embodiment of the present disclosure.

Next, a liquid supply system to supply a liquid to the heads 300 is described with reference to FIG. 28. FIG. 28 is a circuit diagram of the liquid supply system in the liquid discharge apparatus 1000.

The liquid discharge apparatus 1000 includes liquid tanks 330 (330Y, 330M, 330C, and 330K) as sealed containers that respectively stores inks 311 of respective colors to be discharged from the respective heads 300 (300Y, 300M, 300C, and 300K). Hereinafter, the liquid tanks 330Y, 330M, 330C, and 330K are collectively referred to as the liquid tanks 330. The liquid tanks 330 and the injection ports 303 of the heads 300 are connected via tubes 333, respectively.

Further, the liquid tanks 330 are connected to the compressor 230 via a pipe 331 including an air regulator 332 so that the pressurized air is supplied to the liquid tanks 330 from the compressor 230.

Accordingly, the pressurized inks 311 of respective colors are supplied to the injection ports 303 of heads 300, respectively. Thus, as described above, the inks 311 of respective colors are respectively discharged from the nozzles 302 of the heads 300 in accordance with an opening and closing of the valves 307.

Figure 29:
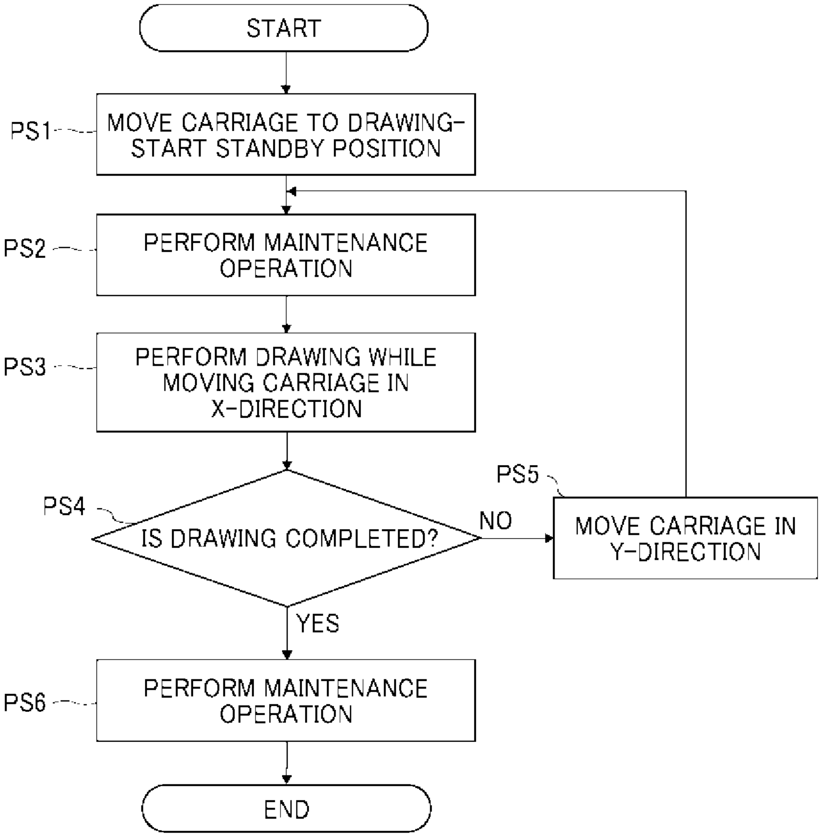
FIG. 29 is a flowchart illustrating a control of a drawing operation in the fifth embodiment.
Figure 30A:
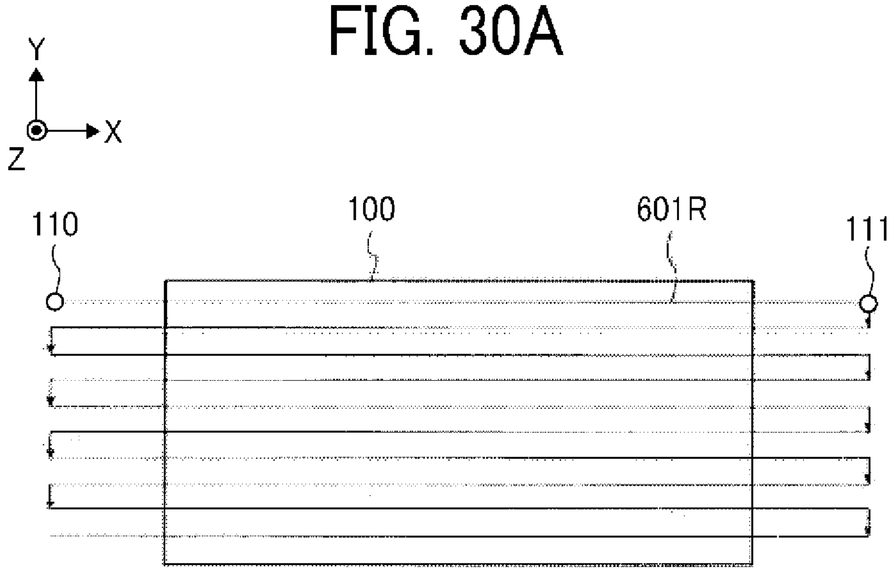
FIGS. 30A and 30B (FIG. 30) illustrate a movement trajectory of the carriage in the fifth embodiment.
Figure 30B:
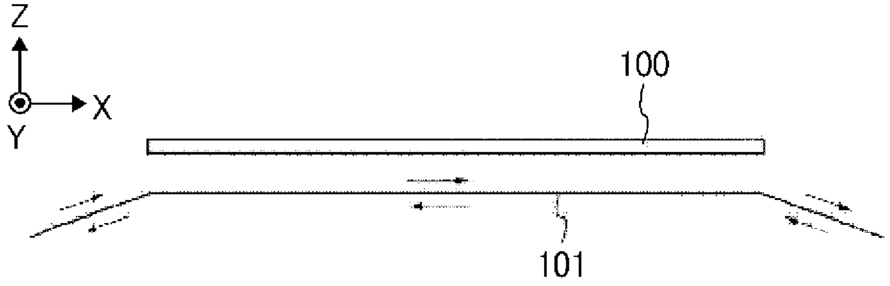

FIG. 29 is a flowchart illustrating a control of a drawing operation in the present embodiment. FIGS. 30A and 30B illustrate a movement trajectory of the carriage 601 in the present embodiment. FIG. 30A is a front view of drawing object 100 and the movement trajectory of the carriage 601. FIG. 30B is a side view of the drawing object 100 and the X-axis rail 101. The movement trajectory of the carriage 601 is indicated by 601R in FIG. 30B.

When the controller 500 receives the drawing command, the controller 500 controls the X-direction driver 672, the Y-direction driver 682, and the Z-direction driver 692 as illustrated in FIGS. 23A and 23B to move the carriage 601 to a drawing-start standby position 110 (PS1).

The drawing-start standby position 110 (left end in FIG. 30A) is a position away from a drawing area (central area in FIG. 30A) of the drawing object 100 by a certain distance in the −X-axis direction and is a position away from a drawing surface of the drawing object 100 in the +Z-axis direction (see FIG. 30B). As illustrated in FIG. 30B, A distance of the drawing-start standby position 110 from the drawing surface of the drawing object 100 is larger than a distance of a region of the X-axis rail 101 facing the drawing object 100 during drawing operation (central area in FIG. 30B) from the drawing surface of the drawing object 100 in the +Z-axis direction.

The controller 500 performs a maintenance operation at the drawing-start standby position 110 (PS2). Details of the maintenance operation is described below.

Then, the controller 500 controls the X-direction driver 672 and the Z-direction driver 692 to move the carriage 601 in the +X-axis direction while moving the carriage 601 close to the drawing surface of the drawing object as illustrated in FIG. 30B to perform the drawing operation based on the image information (PS3). Thus, the controller 500 performs drawing while scanning carriage in X-direction (PS3).

When the carriage 601 moves out of the drawing area, the controller 500 controls the X-direction driver 672 and the Z-direction driver 692 to move the carriage 601 away from the drawing surface of the drawing object 100 in −Z-axis direction while moving the carriage 601 in the +X-axis direction and stops the carriage 601 at the. It is moved and stopped at a reversal position 111 (see FIG. 30B).

The controller 500 determines whether the drawing operation is completed (PS4). If there is remaining drawing data, the controller 500 controls the Y direction driver 682 to move the carriage 601 in the −Y-axis direction (PS5). Then, the controller 500 perform again the operations from PS2 to PS4. Thus, the controller 500 scans the carriage 601 in Y-axis direction until the drawing operation is completed.

The controller 500 continues the operations from PS2 to PS5 until the drawing ends (completes). After the controller 500 determines that the drawing operation is completed (PS4, YES), the controller 500 performs the maintenance operation (PS6) as similarly to the step PS2 and ends the drawing operation. Thus, the controller 500 can ends the drawing operation in a state in which foreign matter, a residual ink, and the like are removed from the nozzles surface 302*a*.

Figure 31B:
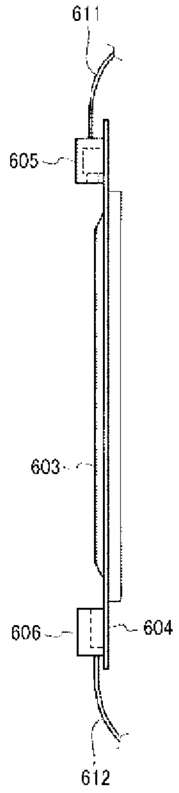
Figure 32A:
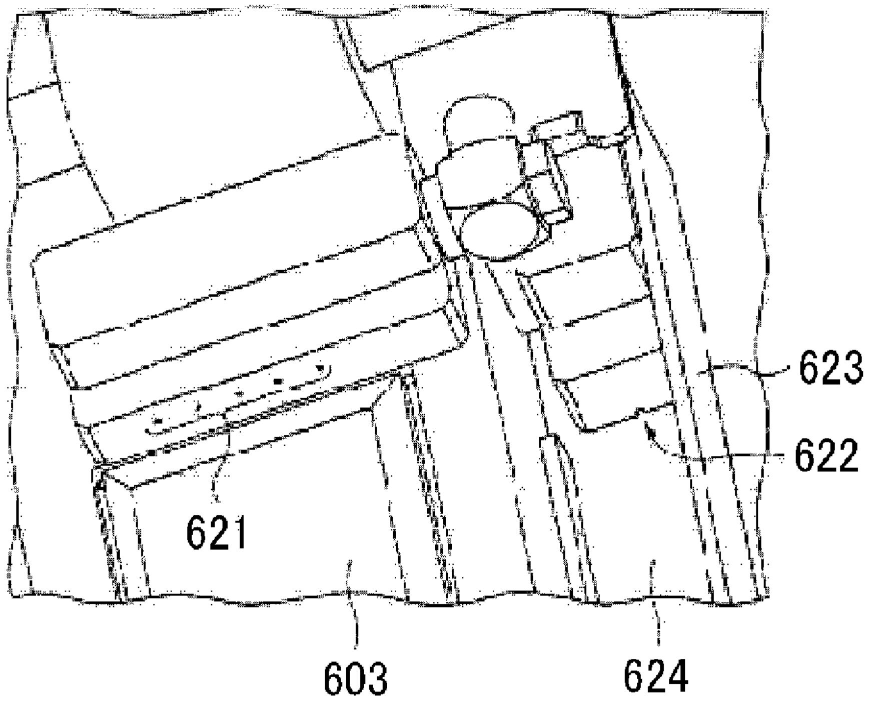
FIGS. 32A, 32B and 32C (FIG. 32) are partial enlarged views of the wiper unit of FIGS. 31A and 31B in the fifth embodiment.
Figure 32B:
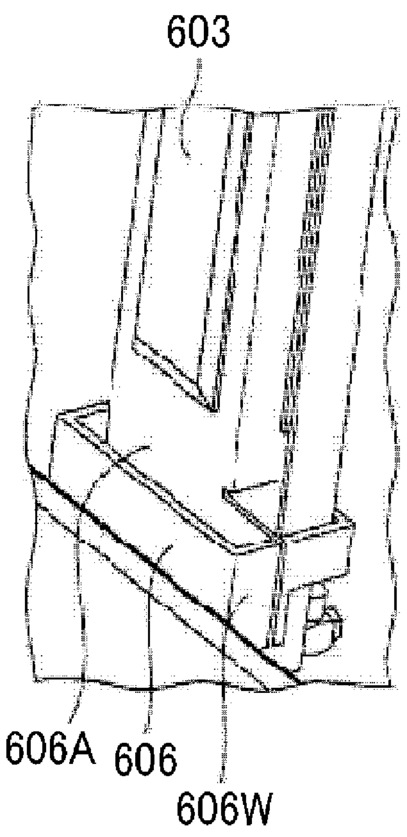

FIGS. 31A and 31B illustrate the wiper unit 604 in the present embodiment. FIGS. 32A and 32B are partial enlarged views of the wiper unit 604 of FIGS. 31A and 31B in the present embodiment.

Figure 32C:
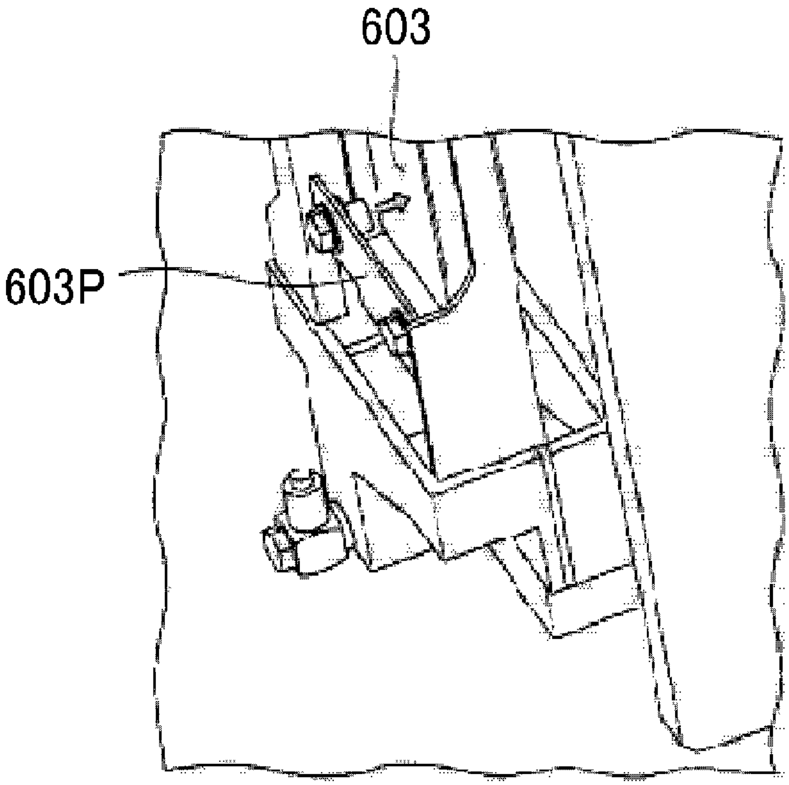

FIG. 31A is a rear view of the wiper unit 604. FIG. 31B is a side view of the wiper unit 604. FIG. 32A is an enlarged upper front perspective view of a portion of the wiper unit 604. FIG. 32B is an enlarged lower front perspective view of a portion of the wiper unit 604. FIG. 32C is an enlarged lower rear perspective view of a portion of the wiper unit 604.

The wiper unit 604 includes a convex part 623 and a pressure mechanism 603P. The convex part 623 protrudes from the ink receiving surface 624 toward the nozzle surface 302*a* side (in a normal line direction of the ink receiving surface 624) and extends in a direction parallel to the ink receiving surface 624 and downward in a vertical direction. The pressure mechanism 603P presses the wiper 603 from a rear side of the wiper 603 as indicated by arrow in FIG. 32C. The wiper 603 and the convex part 623 are examples of a protrusion that protrudes toward the nozzles 302 from the ink receiving surface 624 in a state in which the ink receiving surface 624 faces the nozzles 302.

Further, the ink receiving surface 624 is between the wiper 603 and the convex part 623 in the horizontal (lateral) direction. Both wiper 603 and the convex part 623 extends downward in the vertical direction. That is, a longitudinal direction of both wiper 603 and the convex part are in the vertical direction. As illustrated in FIGS. 24 to 26, the wiper unit 604 moves in the horizontal direction (X-axis direction or lateral direction). The ink receiving surface 624 is arranged between the wiper 603 and the convex part 623 in a moving direction of the wiper unit 604 (in the horizontal (lateral) direction). The above-described embodiments are an example of a first protrusion and a second protrusion extending in a direction perpendicular to the moving direction of the wiper unit 604.

The wiper 603 has a slope in each of four sides of the wiper 603 from a wiping surface of the wiper 603 facing the nozzle surface 302*a* of the heads 300 as the highest point of the wiper 603.

The cleaning liquid supplier 605 is above the wiper 603 and the ink receiving surface 624. The cleaning liquid supplier 605 includes a wiper-side supply port 621 and a receiving-side supply port 622. The wiper-side supply port 621 supplies the cleaning liquid 220 from above the wiper 603. The receiving-side supply port 622 supplies the cleaning liquid 220 from above the ink receiving surface 624. The cleaning liquid collector 606 is below the wiper 603 and the ink receiving surface 624. The cleaning liquid collector 606 has a wall surface 606W surrounding a space above a bottom surface of the wiper unit 604. An opening 606A surrounded by the wall surface 606W is formed at an upper part of the cleaning liquid collector 606.

As described above, the wiper unit 604 includes the convex part 623 and the wiper 603 that protrudes toward the nozzles 302 from the ink receiving surface 624 and extends in the direction parallel to the ink receiving surface 624 in a state in which the ink receiving surface 624 faces the nozzles 302. Thus, the wiper unit 604 can reduce a scattering of the ink received by the ink receiving surface 624 around the ink receiving surface 624.

Further, the wiper unit 604 includes a convex part 623 (first protrusion), the wiper 603 (second protrusion), and the ink receiving surface 624 arranged between the convex part 623 (first protrusion) and the wiper 603 (second protrusion) in the moving direction of the wiper unit 604 (in the horizontal direction). The first protrusion (wiper 603) and the second protrusion (convex part 623) extend in a direction orthogonal to the moving direction of the wiper unit 604. Thus, wiper unit 604 can reliably reduce the scattering of the ink received by the ink receiving surface 624 around the ink receiving surface 624.

Figure 33:
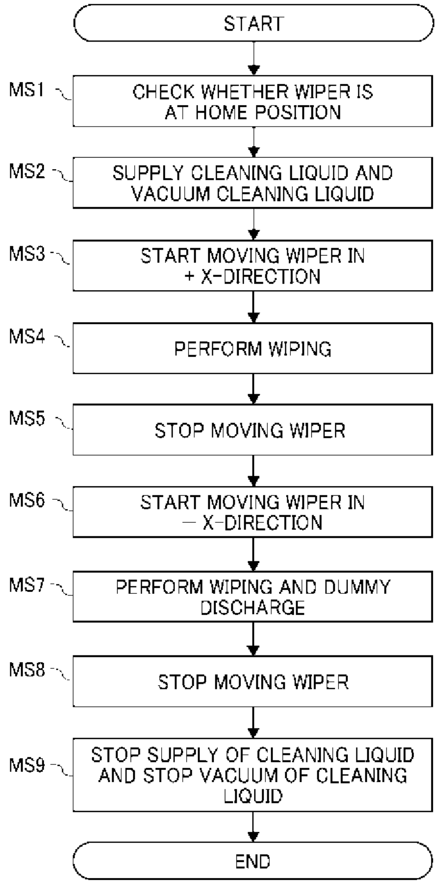
FIG. 33 is a flowchart illustrating a control of a maintenance operation in the fifth embodiment.
Figure 34:
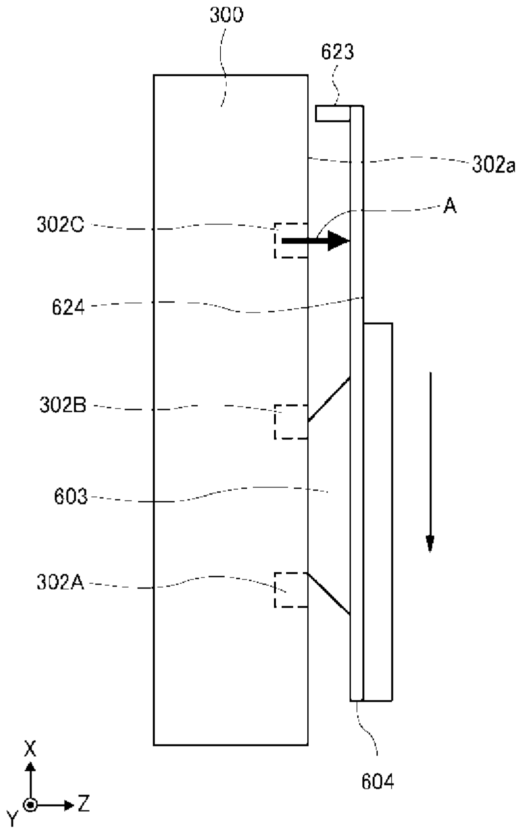
FIG. 34 is a top view of the wiper unit illustrating the maintenance operation in the fifth embodiment.

FIG. 33 is a flowchart illustrating a control of a maintenance operation in the present embodiment. FIG. 34 is a top view of the wiper unit 604 illustrating the maintenance operation in the present embodiment.

The controller 500 checks whether the wiper unit 604 is at the home position based on the detection signal of the sensor 617*a* (MS1).

The controller 500 opens the openably closable valve 234 to supply the cleaning liquid 220 from the cleaning liquid supplier 605. At the same time, the controller 500 opens the solenoid valve 245 to activate the vacuum generator 242 so that the cleaning liquid collector 606 becomes a vacuum state (MS2).

The controller 500 drives the motor 613 to move the wiper unit 604 in the +X-axis direction as illustrated in FIGS. 24 and 25 and moves the wiper unit 604 to the facing position at which the wiper 603 faces the nozzle surface 302*a* of the heads 300 (MS3).

The controller 500 further moves the wiper unit 604 in the +X-axis direction while wiping the nozzle surface 302*a* with the wiper 603 when the wiper 603 faces the nozzle surface 302*a* (MS4).

When the controller 500 determines that the wiper unit 604 has reached the moving end position based on the detection signal from the sensor 617*b*, the controller 500 stops the motor 613 and stops the movement of the wiper unit 604 (MS5).

Next, the controller 500 drives the motor 613 in a reverse direction to move the wiper unit 604 in the reverse direction (−X-axis direction) so that the wiper unit 604 moves to the facing position at which the wiper 603 faces the nozzle surface 302*a* and the ink receiving surface 624 faces the nozzle surface 302*a* (MS6).

The controller 500 moves the wiper unit 604 further in the −X-axis direction while the wiper 603 facing the nozzle surface 302*a*, wipes the nozzle surface 302*a* with the wiper 603, and controls the heads 300 to discharge the ink toward the ink receiving surface 624 from the nozzles 302 (dummy discharge) after the wiper 603 passes (wipes) the nozzle surface 302*a* (MS7).

Specifically, as illustrated in FIG. 34, the controller 500 controls the heads 300 to discharge the ink toward the ink receiving surface 624 from the nozzles 302C as indicated by arrow "A" after the wiper 603 passes the nozzle 302C and before the convex part 623 passes the nozzle 302C. Thus, in FIG. 34, the wiper 603 is disposed below the nozzle 302C, and the convex part 623 is disposed above the nozzle 302C. Conversely, in a state as illustrated in FIG. 34, the nozzle 302B is wiped by the wiper 603, the nozzle 302A is before wiping by the wiper 603, and neither the nozzle 302A nor the nozzle 302B faces the ink receiving surface 624. Thus, the controller 500 does not discharge the ink from the nozzles 302A and 302B.

When the controller 500 determines that the wiper unit 604 has reached the standby position (home position) based on the detection signal from the sensor 617*a*, the controller 500 stops the motor 613 and stops the movement of the wiper unit 604 (MS8).

The controller 500 closes the openably closable valve 234 to stop supply of the cleaning liquid 220 to the wiper 603 and the ink receiving surface from the cleaning liquid supplier 605 and closes the solenoid valve 245 to stop the vacuum state of the cleaning liquid collector 606 (MS9).

As described above, the wiper 603 contacts the nozzles 302 and the nozzle surface 302*a* in which the nozzles 302 are formed when the wiper unit 604 moves with the ink receiving surface 624 facing the nozzles 302. Thus, the wiper 603 contacts the nozzles 302 and the nozzle surface 302*a* when the wiper unit 604 moves, and the wiper 603 thus can wipe and clean the nozzles 302 and the nozzle surface 302*a*.

Further, the liquid discharge apparatus 1000 includes a controller 500 that discharges the ink from the nozzles 302 toward the ink receiving surface 624 after the wiper 603 passes the nozzle 302 during the movement of the wiper unit 604. Thus, the liquid discharge apparatus 1000 can remove foreign matter and the like from the nozzles 302 and reliably discharge the ink from the nozzles 302 toward the ink receiving surface 624.

Figure 35A:
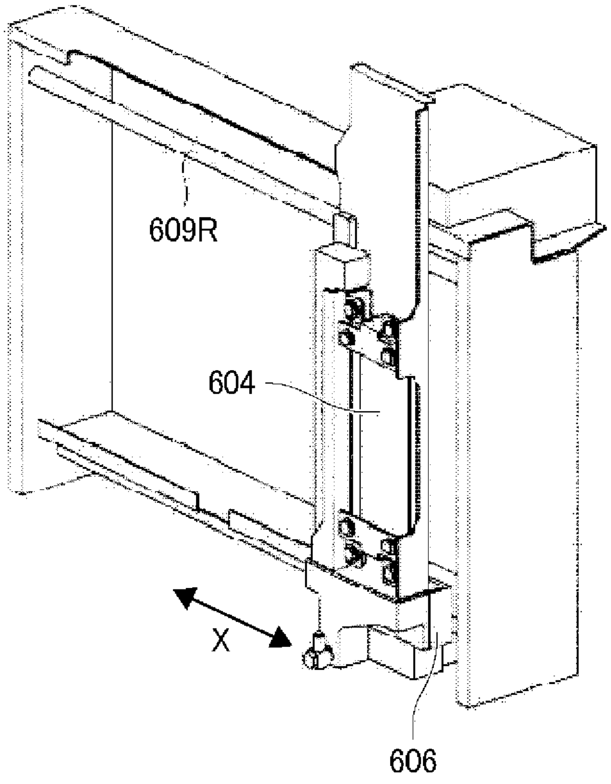
FIGS. 35A and 35B (FIG. 35) are perspective views of the wiper unit according to a sixth embodiment (first variation) of the present disclosure.
Figure 35B:
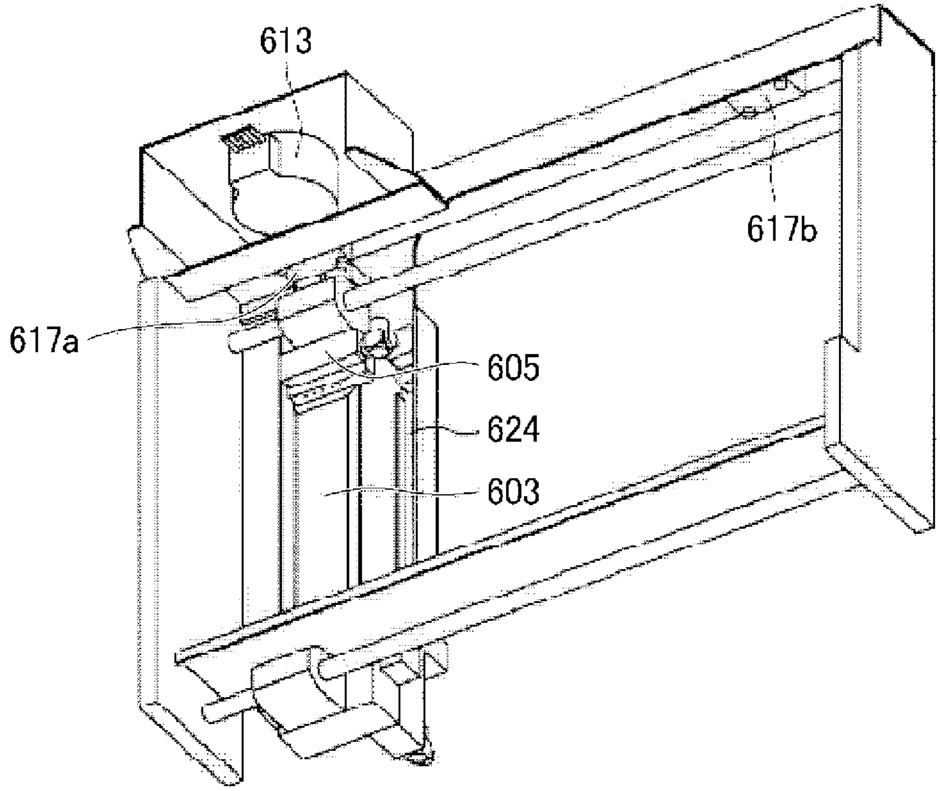

FIGS. 35A and 35B are perspective views of a wiper unit according to a sixth embodiment (first variation)) of the present disclosure.

In the embodiment illustrated in FIG. 25, the wiper unit 604 moves along a trajectory along the shape of the guide groove 609. In the first variation illustrated in FIGS. 35A and 35B, the wiper unit 604 moves in a direction parallel to the X-axis direction along the guide rail 609R.

In the first variation, the controller 500 drives the motor 613 and transmits a rotational driving force of the motor 613 to the belts 614B and 614C via the belt 614A to move the wiper unit 604 connected to the belts 614B and 614C as illustrated in FIG. 25. Thus, the wiper unit 604 moves along a trajectory along the guide rail 609R.

Figure 36A:
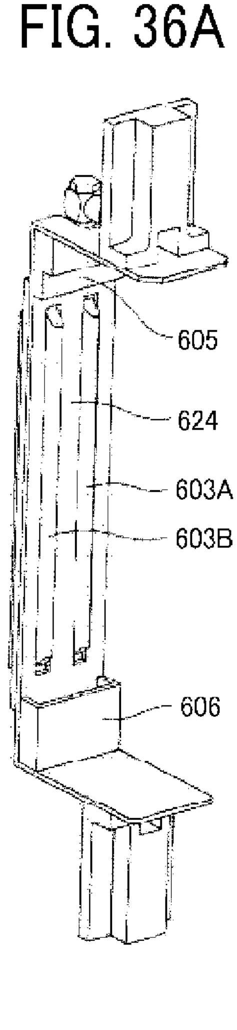
FIGS. 36A and 36B (FIG. 36) are perspective views of the wiper unit according to a seventh embodiment (second variation) of the present disclosure.
Figure 36B:
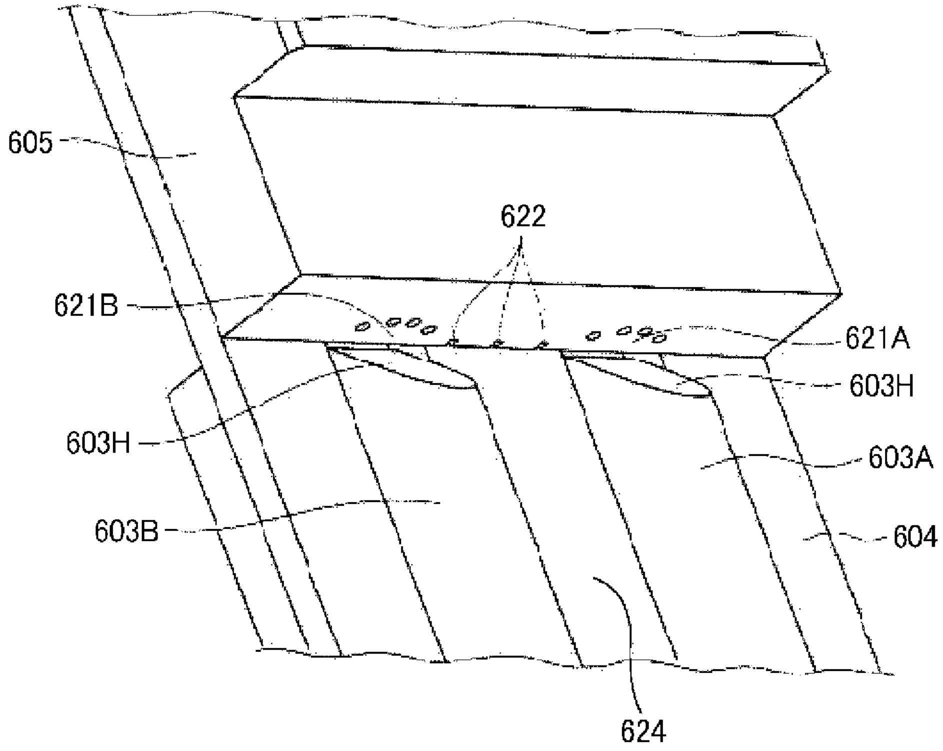

FIGS. 36A and 36B are perspective views of the wiper unit 604 according to a seventh embodiment (second variation) in the present disclosure.

In the embodiment as illustrated in FIGS. 32A to 32C, the wiper unit 604 includes the wiper 603, the convex part 623, and the ink receiving surface 624 arranged between the wiper 603 and the convex part 623 in the horizontal (lateral) direction. In the first variation illustrated in FIGS. 36A and 36B, the wiper unit 604 includes a first wiper 603A, a second wiper 603B, and the ink receiving surface 624 arranged between the first wiper 603A and the second wiper 603B in the horizontal (lateral) direction.

The ink receiving surface 624 is arranged between the first wiper 603A and the second wiper 603B in the moving direction of the wiper unit 604 (in the horizontal (lateral) direction). The first wiper 603A and the second wiper 603B are examples of a first protrusion and a second protrusion, respectively. The first wiper 603A and the second wiper 603B extend in a direction orthogonal to the moving direction of the wiper unit 604 (in the vertical direction). The first wiper 603A (first protrusion) and the second wiper 603B (second protrusion) may be formed as a single wiper 603 instead of formed as separate members like the first wiper 603A and the second wiper 603B in FIGS. 35A and 35B.

Each of the first wiper 603A and the second wiper 603B includes an upper end surface 603H that is inclined such that the ink receiving surface 624 side of the upper end surface 603H is above the nozzle surface 302*a* side of the upper end surface 603H. Thus, the upper end surface 603H is inclined such that the nozzle surface 302*a* side of the upper end surface 603H is lower than a surface orthogonal to the nozzle surface 302*a*. In other words, the upper end surface 603H of each of the first wiper 603A and the second wiper 603B is inclined downward toward the nozzle surface 302*a* of the heads 300 facing the first wiper 603A and the second wiper 603B.

The wiper-side supply port 621 includes a first supply port 621A facing the upper end surface 603H of the first wiper 603A and a second supply port 621B facing the upper end surface 603H of the second wiper 603B. Thus, the cleaning liquid 220 is easily flow toward the nozzle surface 302*a* side of the wiper 603.

The receiving-side supply port 622 is arranged between the first supply port 621A and the second supply port 621B in the moving direction of the wiper unit 604 (in the horizontal (lateral) direction).

As described above, the upper end surface 603H of each of the first wiper 603A and the second wiper 603B is inclined such that the nozzle surface 302*a* side of the upper end surface 603H is lower than the ink receiving surface 624 side of the upper end surface 603H. Thus, the cleaning liquid 220 received by the upper end surface 603H of each of the first wiper 603A and the second wiper 603B is reliably supplied to the nozzle surface 302*a* side of each of the first wiper 603A and the second wiper 603B, and the first wiper 603A and the second wiper 603B thus can reliably wipe and clean the nozzle surface 302*a* of the heads 300.

Figure 37:
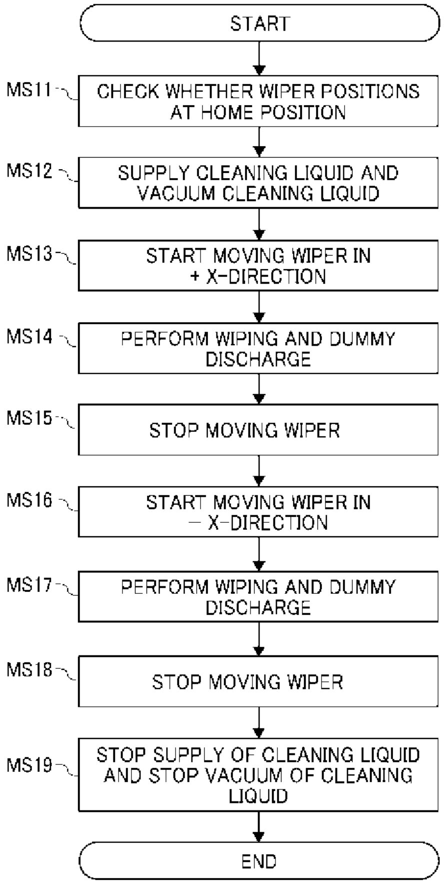
FIG. 37 is a flowchart illustrating a control of a maintenance operation of the liquid discharge apparatus in the seventh embodiment (second variation)
Figure 38:
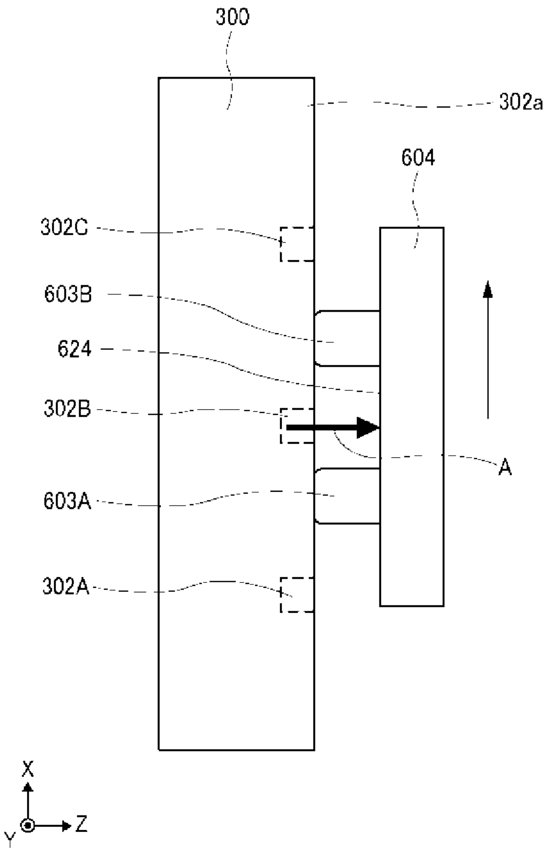
FIG. 38 is a top view of the wiper unit illustrating the maintenance operation in the seventh embodiment (second variation)

FIG. 37 is a flowchart illustrating a control of a maintenance operation of the liquid discharge apparatus 1000 in the seventh embodiment (second variation) of the present disclosure. FIG. 38 is a top view of the wiper unit 604 illustrating the maintenance operation in the seventh embodiment (second variation) of the present disclosure.

The controller 500 checks whether the wiper unit 604 is at the standby position (home position) based on the detection signal from the sensor 617*a* (MS11).

The controller 500 opens the openably closable valve 234 to supply the cleaning liquid 220 from the cleaning liquid supplier 605 and also opens the solenoid valve 245 to activate the vacuum generator 242 to bring the cleaning liquid collector 606 into the vacuum state (MS12).

The controller 500 drives the motor 613 to move the wiper unit 604 in the +X-axis direction and moves the wiper unit 604 to the facing position at which the wiper 603 faces the nozzle surface 302*a* of the heads 300 and the ink receiving surface 624 faces the nozzles 302 (MS13).

The controller 500 moves the wiper unit 604 further in the +X-axis direction while the wiper 603 facing the nozzle surface 302*a*, wipes the nozzle surface 302*a* with the wiper 603, and controls the heads 300 to discharge the ink toward the ink receiving surface 624 from the nozzles 302 (dummy discharge) after the wiper 603 passes (wipes) the nozzle surface 302*a* (MS14).

Specifically, as illustrated in FIG. 38, the controller 500 controls the heads 300 to discharge the ink toward the ink receiving surface 624 from the nozzle 302B as indicated by arrow "A" after the second wiper 603B passes the nozzle 302B and before the first wiper 603A passes the nozzle 302B. Thus, in FIG. 38, the first wiper 603A is disposed below the nozzle 302B, and the second wiper 603B is disposed above the nozzle 302B.

Conversely, in a state as illustrated in FIG. 38, the nozzle 302A is wiped by the first wiper 603A, the nozzle 302C is before wiping by the second wiper 603B, and neither the nozzle 302A nor the nozzle 302C faces the ink receiving surface 624. Thus, the controller 500 does not discharge the ink from the nozzles 302A and 302C.

When the controller 500 determines that the wiper unit 604 has reached the moving end position based on the detection signal from the sensor 617*b*, the controller 500 stops the motor 613 and stops the movement of the wiper unit 604 (MS15).

Next, the controller 500 drives the motor 613 in a reverse direction to move the wiper unit 604 in the reverse direction (−X-axis direction) so that the wiper unit 604 moves to the facing position at which the wiper 603 faces the nozzle surface 302*a* and the ink receiving surface 624 faces the nozzles 302 (MS16).

The controller 500 moves the wiper unit 604 further in the −X-axis direction while the wiper 603 facing the nozzle surface 302*a*, wipes the nozzle surface 302*a* with the wiper 603, and controls the heads 300 to discharge the ink toward the ink receiving surface 624 from the nozzles 302 (dummy discharge) after the wiper 603 passes (wipes) the nozzle surface 302*a* (MS17).

When the controller 500 determines that the wiper unit 604 has reached the standby position (home position) based on the detection signal from the sensor 617*b*, the controller 500 stops the motor 613 and stops the movement of the wiper unit 604 (MS18).

The controller 500 closes the openably closable valve 234 to stop supply of the cleaning liquid 220 to the first wiper 603A and the second wiper 603B from the cleaning liquid supplier 605 and closes the solenoid valve 245 to stop the vacuum state of the cleaning liquid collector 606 (MS19).

FIGS. 39A to 39D are front views of the heads 300 and the wiper unit 604 illustrating a maintenance operation in the seventh embodiment (second variation) of the present disclosure.

Figure 39A:
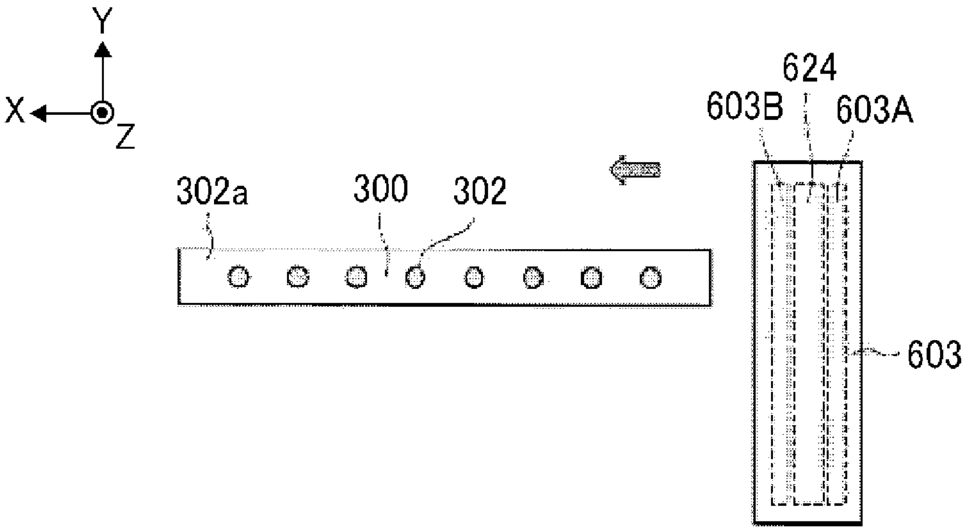
FIGS. 39A to 39D (FIG. 39) are front views of the heads and the wiper unit illustrating a maintenance operation in the seventh embodiment (second variation)

FIG. 39A corresponds to the step MS13 in the flowchart in FIG. 37. FIG. 39A illustrates a state in which the wiper unit 604 does not face the nozzle surface 302*a*.

Figure 39B:
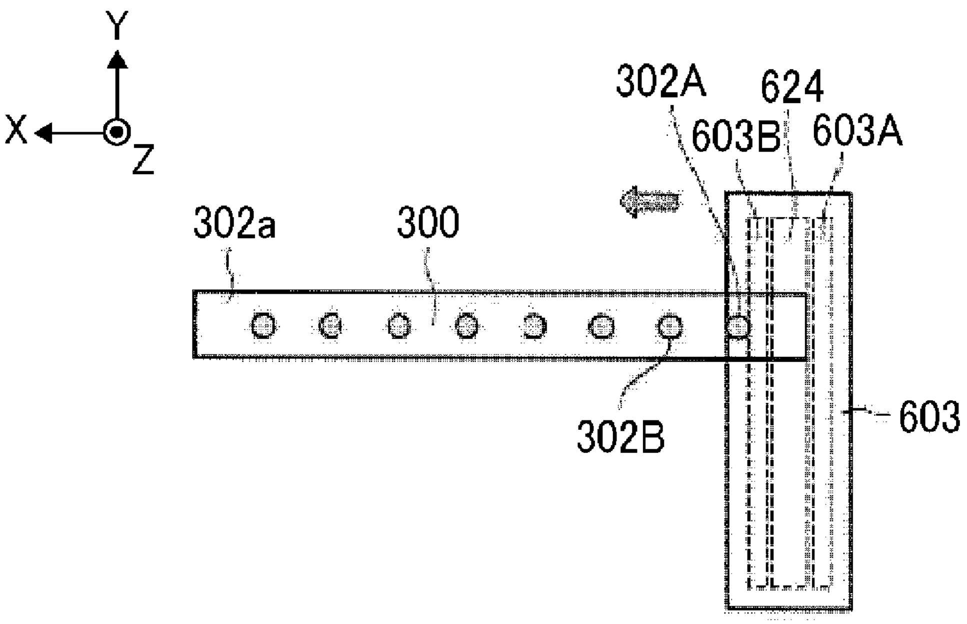
Figure 39C:
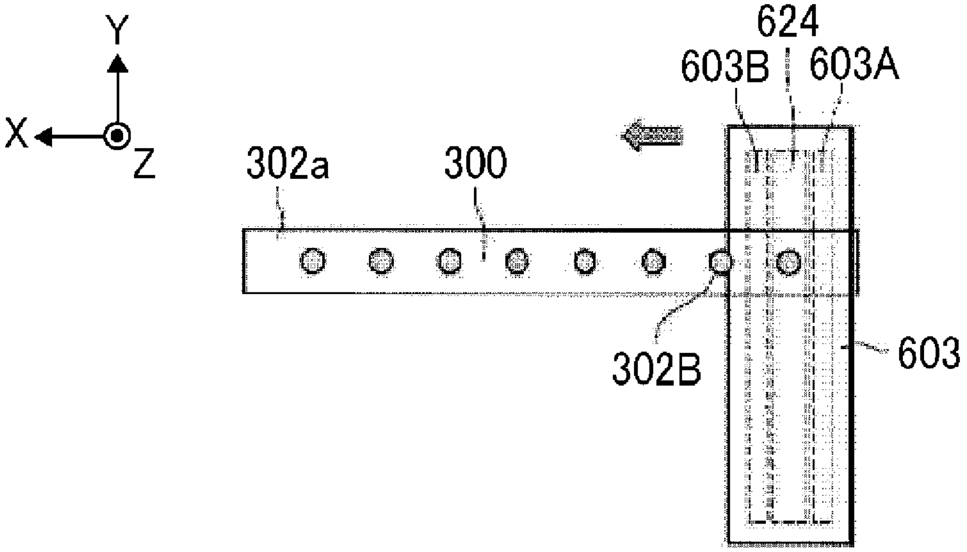
Figure 39D:
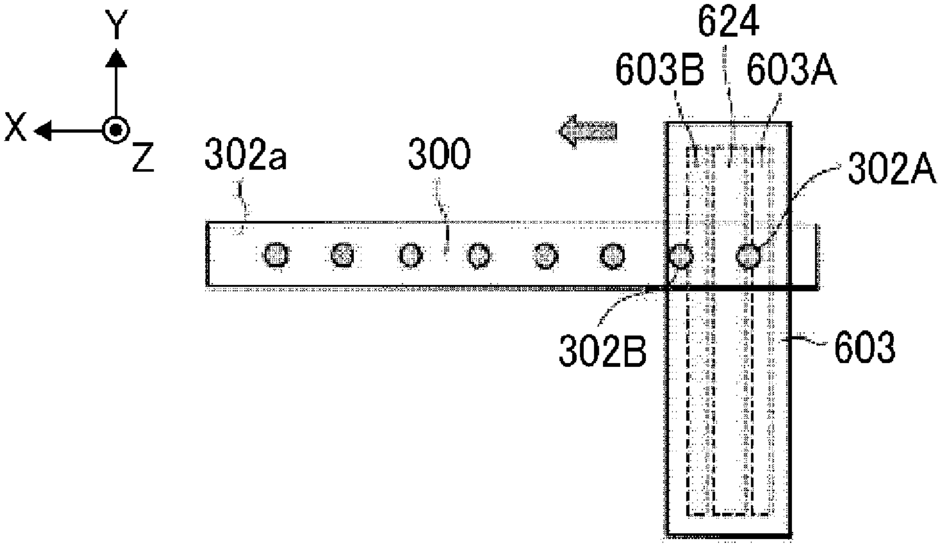

FIGS. 39B to 39D correspond to the step MS13 in the flowchart in FIG. 37. FIGS. 39B to 39D illustrate a state in which the wiper unit 604 faces the nozzle surface 302*a*.

In a state as illustrated in FIG. 39B, the second wiper 603B faces the nozzle surface 302*a* and the nozzle 302A, and the second wiper 603B wipes and cleans the nozzle surface 302*a* and the nozzle 302A while the second wiper 603B moves in the +X-axis direction (positive X-axis direction).

In a state as illustrated in FIG. 39B, the second wiper 603B passes (wipes) the nozzle 302A, the second wiper 603B is before passing (wiping) the nozzle 302B, and the controller 500 does not discharge the ink from the nozzles 302A and 302B since neither the nozzle 302A nor the nozzle 302C faces the ink receiving surface 624.

In a state as illustrated in FIG. 39C, the second wiper 603B and the first wiper 603A face the nozzle surface 302*a*, and the second wiper 603B and the first wiper 603A wipe and clean the nozzle surface 302*a* while moving in the +X-axis direction (positive X-axis direction). Further, the controller 500 drives the head 300 to discharge the ink from the nozzle 302A since the nozzle 302A faces the ink receiving surface 624.

Conversely, the controller 500 does not drive the head 300 to discharge the ink from the nozzle 302B since the second wiper 603B is before passing (wiping) the nozzle 302B and the ink receiving surface 624 does not face the nozzle 302B, In a state as illustrated in FIG. 39D, the second wiper 603B faces the nozzle surface 302*a* and the nozzle 302B, and the second wiper 603B wipes and cleans the nozzle surface 302*a* and the nozzle 302B while moving in the +X-axis direction (positive X-axis direction). Further, in FIG. 39D, the first wiper 603A faces the nozzle surface 302*a* and the nozzle 302A, and the first wiper 603A wipes and cleans the nozzle surface 302*a* and the nozzle 302A while the first wiper 603A moves in the +X-axis direction (positive X-axis direction).

Conversely, the controller 500 does not drive the head 300 to discharge the ink from the nozzle 302A and the nozzle 302B since the second wiper 603B passes (wipes) the nozzle 302B, the first wiper 603A passes (wipes) the nozzle 302A, and neither nozzles 302A nor nozzle 302B faces the ink receiving surface 624.

As described above, the controller 500 drives the head 300 to sequentially discharge the ink from the nozzles 302 that faces the ink receiving surface 624 in synchronized with the movement of the wiper unit 604.

Then, as illustrated in FIG. 39B, the second wiper 603B wipes the nozzle 302A before the ink is discharged onto the ink receiving surface 624 from the nozzle 302A to temporarily clean a surface environment of the nozzle 302A.

Subsequently, as illustrated in FIG. 39C, the controller 500 drives the head 300 to discharge the ink from the nozzle 302A onto the ink receiving surface 624 to discharge dried ink from the nozzle 302A.

Then, as illustrated in FIG. 39D, the first wiper 603A wipes the nozzle 302A after the ink is discharge onto the ink receiving surface 624 from the nozzle 302A to make removal of the discharged dried ink and finally cleaning of the nozzle 302A possible. Further, the cleaning operation as described above is performed twice in a forward path and a return path to further stably secure a normal state of the nozzles 302.

Figure 40:
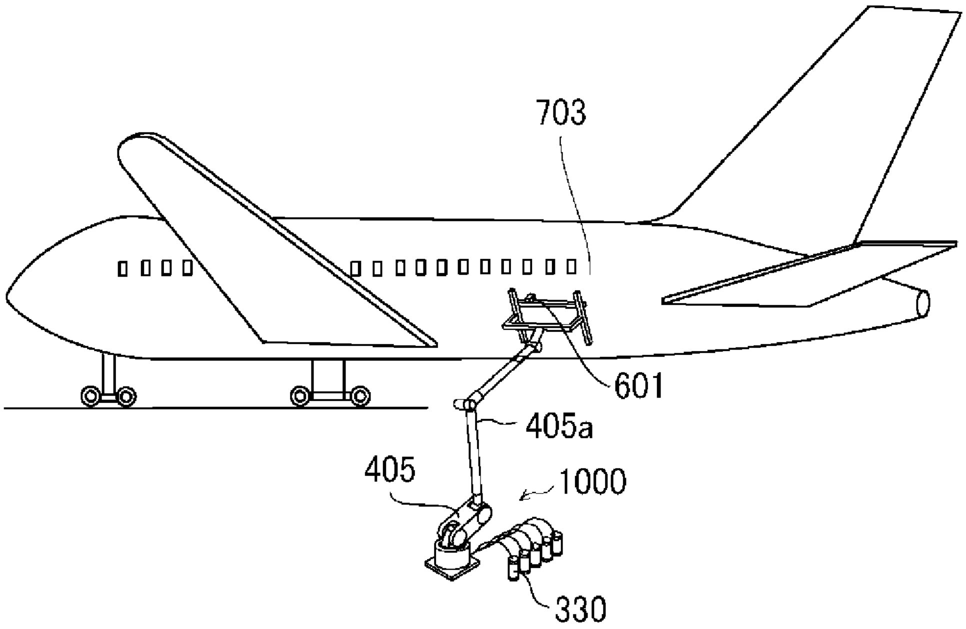
FIG. 40 is a schematic perspective view of the liquid discharge apparatus in an embodiment that draws an image on an aircraft as a drawing object according to an eighth embodiment (third variation) of the present disclosure.
Figure 41:
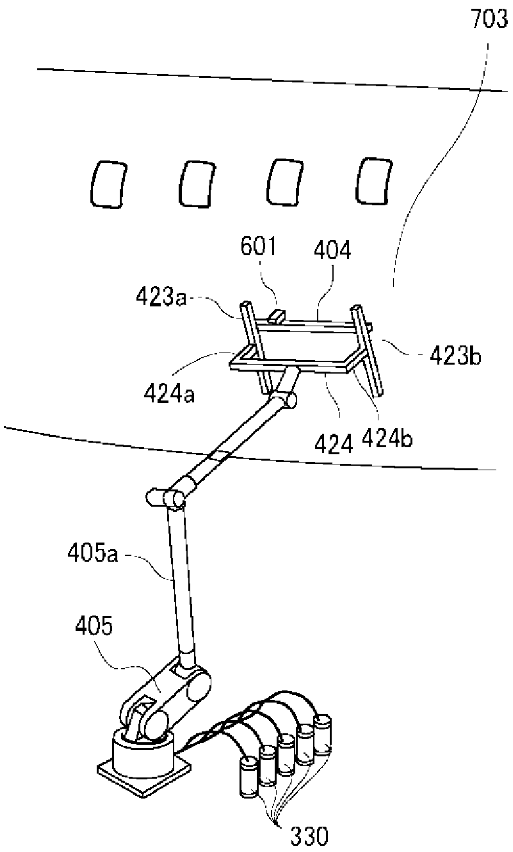
FIG. 41 is an enlarged perspective view of the liquid discharge apparatus according to the eighth embodiment (third variation)

FIG. 40 is a schematic perspective view of the liquid discharge apparatus 1000 according to an eighth embodiment (third variation) of the present disclosure. In FIG. 40, the liquid discharge apparatus 1000 draw an image on an aircraft as a drawing object. FIG. 41 is a perspective view of the liquid discharge apparatus 1000 according to the eighth embodiment (third variation) of the present disclosure.

The liquid discharge apparatus 1000 includes a linear rail 404 and a multi-articulated robot 405. The linear rail 404 guides a carriage 601 that reciprocally and linearly moves along the linear rail 404. The multi-articulated robot 405 appropriately moves the linear rail 404 to a predetermined position and holding the linear rail 404 at the predetermined position.

The multi-articulated robot 405 includes a robot arm 405*a* that is freely movable like a human arm by a plurality of joints. The multi-articulated robot 405 can freely move a leading end of the robot arm 405*a* and arrange the leading end of the robot arm 405*a* at an accurate position.

An industrial robot of a six-axis control-type having six axes (six joints) can be used as the multi-articulated robot 405, for example. According to the multi-articulated robot 405 of the six-axis control-type, it is possible to previously teaching information related to a movement of the multi-articulated robot 405 to accurately and quickly positions the linear rail 404 to face a predetermined position of a drawing object 703 (aircraft). A number of axes of the multi-articulated robot 405 is not limited to six, and a multi-articulated robot having an appropriate number of axes such as five axes or seven axes can be used.

The liquid discharge apparatus 1000 includes a fork-shaped support 424 bifurcated into two is provided on a robot arm 405*a* of the multi-articulated robot 405. The liquid discharge apparatus 1 further includes a vertical linear rail 423*a* attached to a leading end of a left branch 424*a* of the support 424, and a vertical linear rail 423*b* attached to a leading end of a right branch 424*b* of the support 424. The vertical linear rail 423*a* and the vertical linear rail 423*b* are parallel with each other.

Further, both ends of the linear rail 404 that movably holds the carriage 601 are supported by vertical linear rails 423*a* and 423*b* to span two of the vertical linear rails 423*a* and 423*b*.

The carriage 601 mounts, for example, a plurality of heads 300 to discharge liquids of respective colors of black, cyan, magenta, yellow, and white, or a head 300 having a plurality of nozzle arrays to discharge the liquids of respective colors as illustrated in FIG. 24, for example. The liquids of respective colors are respectively supplied under pressure from the liquid tanks 330 to the heads 300 or nozzle arrays of the heads 300 in the same manner as in the above-described liquid supply system as illustrated in FIG. 28.

In the liquid discharge apparatus 1000, the multi-articulated robot 405 moves the linear rail 404 to a facing position at which the linear rail 404 faces a desired drawing area of the drawing object 703, and moves the carriage 601 along the linear rail 404 according to print data while driving the head 300 to print an image on the drawing object 703.

When the liquid discharge apparatus 1000 ends drawing of one line, the liquid discharge apparatus 1000 drives the vertical linear rails 423*a* and 423*b* of the multi-articulated robot 405 to move the heads 300 of the carriage 601 from one line to a next line.

The liquid discharge apparatus 1000 repeats the above-described operation to draw an image on a desired print area of the drawing object 703.

During the drawing operation, the carriage 601 including the wiper 603 can wipe and clean the nozzle surfaces 302*a* of the heads 300 with the wiper 603 at any time although a moving distance of the carriage 601 (head 300) increases.

In the fourth variation in the present embodiment, the wiper 603 wipes the nozzles 302 before and after the drawing operation of one line. Thus, the liquid discharge apparatus 1000 can continuously draw high quality images with small downtime.

Figure 42:
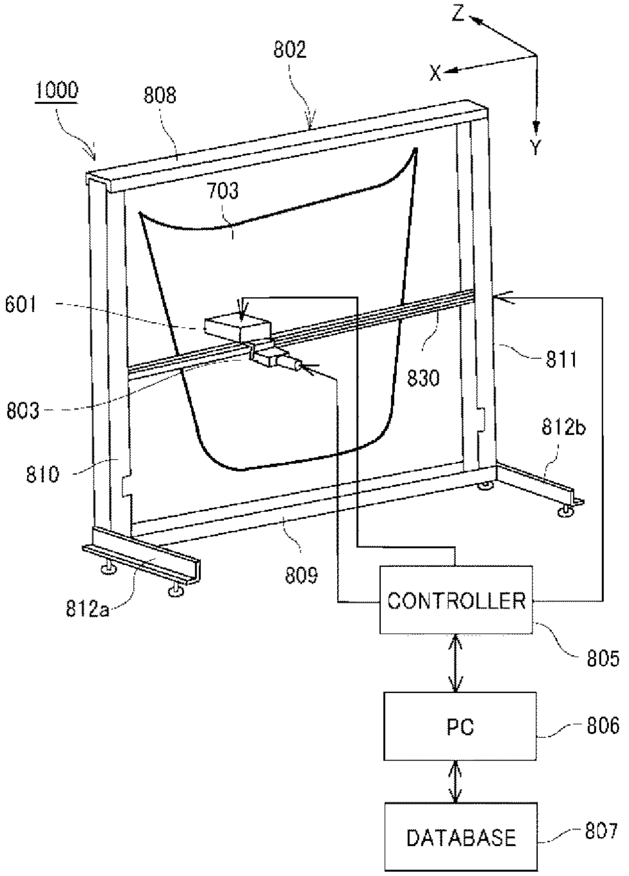
FIG. 42 is a perspective view of the liquid discharge apparatus according to a ninth embodiment (fourth variation) of the present disclosure.
Figure 43:
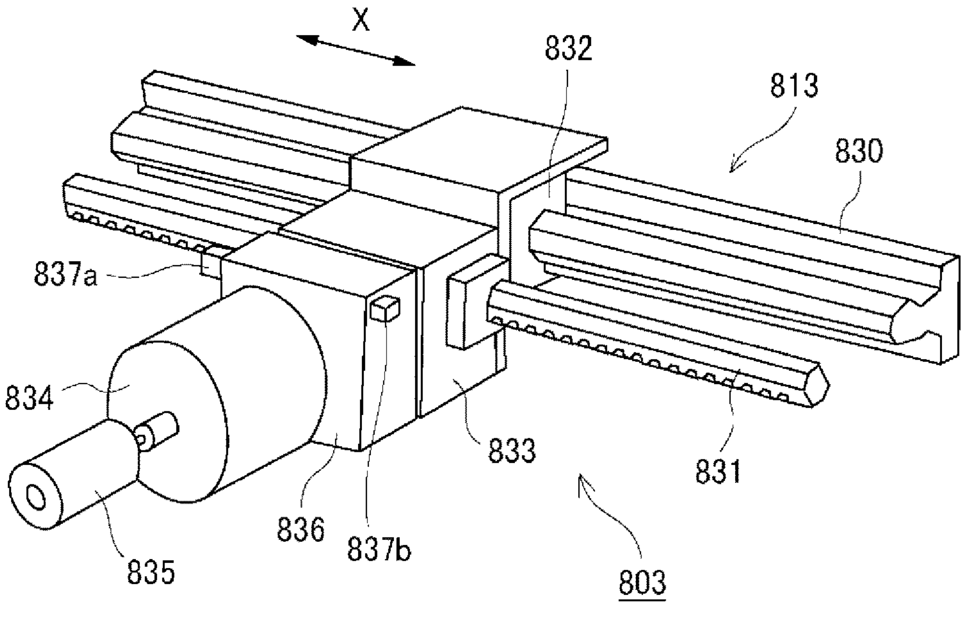
FIG. 43 is a perspective view of a driver of the liquid discharge apparatus according to the ninth embodiment (fourth variation)

FIG. 42 is a perspective view of the liquid discharge apparatus 1000 according to a ninth embodiment (fourth variation) of the present disclosure. FIG. 43 is a perspective view of a driver of the liquid discharge apparatus 1000 according to the ninth embodiment (fourth variation) of the present disclosure.

The liquid discharge apparatus 1000 includes a movable frame 802 that is installed to face the drawing object 703 having a curved surface such as a hood of a vehicle. The frame 802 includes a left frame 810, a right frame 811, and a movable part 813. The movable part 813 is attached to the left frame 810 and the right frame 811 so that the movable part 813 is bridged between the left frame 810 and the right frame 811. The movable part 813 is vertically movable in the Y direction.

The movable part 813 includes a driver 803 having a built-in motor and the carriage 601 attached to the driver 803. The driver 803 is reciprocally movable in the horizontal direction (X-axis direction or lateral direction) on the movable part 813. The carriage 601 discharges a liquid toward the drawing object 703.

Further, the liquid discharge apparatus 1000 includes a controller 805 and an information processing apparatus 806. The controller 805 controls a liquid discharge from the heads 300 mounted on the carriage 601, a reciprocal movement of the driver 803, and a vertical movement of the movable part 813. The information processing apparatus 806 such as a personal computer (PC) sends instructions to the controller 805. The information processing apparatus 806 (PC) is connected to a database 807 (DB) that records, and stores information related to the drawing object 703 such as a shape and a size of the drawing object 703.

The frame 802 further includes an upper frame 808 and a lower frame 809 in addition to the left frame 810 and the right frame 811 that form a vertical and horizontal outline of the frame 802. The upper frame 808, the lower frame 802, the left frame 810, and the right frame 811 are formed of metal pipes or the like. The frame 802 further includes a left leg 812*a* and a right leg 812*b* attached to both ends of the lower frame 809 to make the frame 802 to be free-standing. The left leg 812*a* and the right leg 812*b* are perpendicularly and horizontally attached to the both ends of the lower frame 809.

The movable part 813 bridged between the left frame 810 and the right frame 811 is vertically movable while supporting the driver 803.

A surface of the drawing object 703 is perpendicular to a direction of liquid discharge (Z-axis direction). Thus, the surface of the drawing object 703 faces a plane formed by the upper frame 808, the lower frame 809, the left frame 810, and the right frame 811 of the frame 802.

In the above-case, in order to arrange the drawing object 703 at a predetermined drawing position at which the drawing is to be performed, a back side of a drawing area of the drawing object 703 is suction-held by a chuck attached to the leading end of the robot arm 405*a* of the multi-articulated robot 405, for example. The multi-articulated robot 405 is used to accurately arrange the drawing object 703 at the print position and to appropriately change the posture of the drawing object 703.

As illustrated in FIG. 43, the driver 803 is reciprocally movable in the horizontal (lateral) direction (X-axis direction) along the movable part 813 as a guide rail. The movable part 813 includes a rail 830, a rack gear 831, a linear guide 832, a pinion gear 833, a motor 834, and a rotary encoder 835. The rail 830 is horizontally disposed to bridge between the left frame 810 and the right frame 811 of the frame 802. The rack gear 831 is parallel to the rail 830. The linear guide 832 is fitted on a part of the rail 830 and slidably moves along the rail 830. The pinion gear 833 is connected to the linear guide 832 and engages with the rack gear 831. The motor 834 includes a decelerator 836 and drives to rotate the pinion gear 833. The rotary encoder 835 detects a position of a drawing point.

The motor 834 is forwardly or reversely driven to move the carriage 601 rightward or leftward along the movable part 813. Further, the driver 803 functions as a drive mechanism of the carriage 601 to move the carriage 601 in the X-axis direction. The decelerator 836 includes limit switches 837*a* and 837*b* attached to both sides of a housing of the decelerator 836.

The carriage 601 mounts, for example, a plurality of heads 300 to discharge liquids of respective colors of black, cyan, magenta, yellow, and white, or a head 300 having a plurality of nozzle arrays to discharge the liquids of respective colors as illustrated in FIG. 24, for example. The liquids of respective colors are respectively supplied under pressure from the liquid tanks 330 to the heads 300 or nozzle arrays of the heads 300 in the same manner as in the above-described liquid supply system as illustrated in FIG. 28.

The liquid discharge apparatus 1000 moves the movable part 813 in the Y-axis direction and moves the carriage 601 in the X-axis direction so that a desired image is formed on the drawing object 703.

During the drawing operation, the carriage 601 including the wiper 603 can wipe and clean the nozzle surfaces 302*a* of the heads 300 with the wiper 603 at any time although a moving distance of the carriage 601 (head 300) increases.

Thus, the liquid discharge apparatus 1000 can continuously draw high quality images with small downtime.

Figure 44:
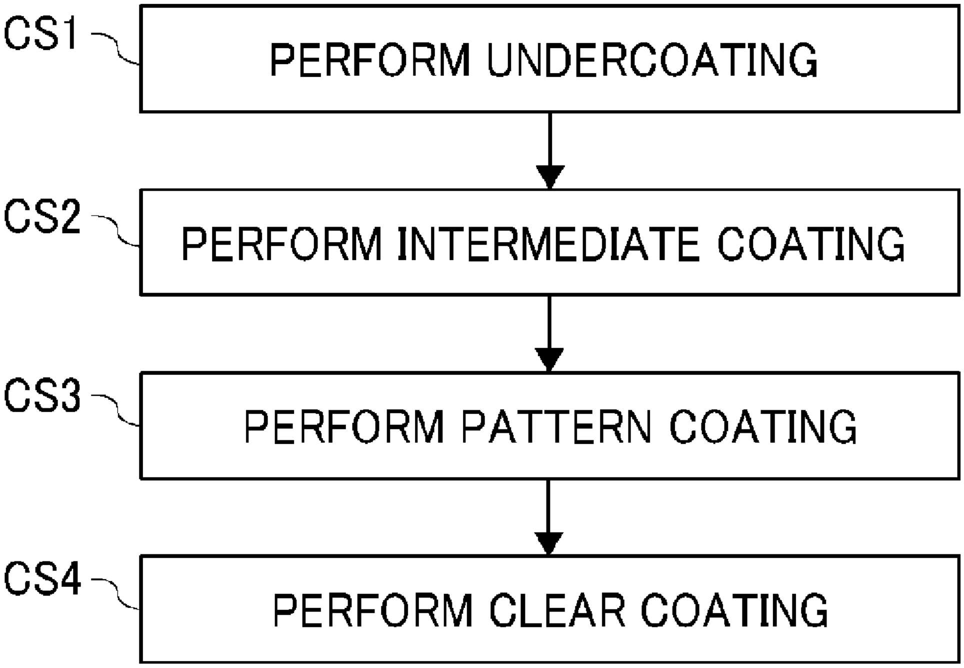
FIG. 44 is a flowchart of the drawing operation in the ninth embodiment (fourth variation).

FIG. 44 is a flowchart of the drawing operation in the ninth embodiment (fourth variation) in the present disclosure.

In the fourth variation, the liquid discharge apparatus 1000 forms pattern coating on the drawing object 703 such as an automobile body on which an undercoating and an intermediate coating are sequentially formed on a substrate.

The substrate used in the fourth variation may be any material without limitation as long as the base material can be used for the automobile bodies. As examples of the substrate, there are metal substrates such as steel plates, aluminum plates, galvanized steel plates, iron-zinc alloy-plated steel plates, and chemical conversion-treated metal substrates obtained by subjecting the above-described metal substrates to chemical conversion treatments such as chromate treatment, zinc phosphate treatment, and iron phosphate treatment, and plastic substrates such as a fiberglass reinforced plastic (FRP) and the like.

The undercoating is formed on the substrate by a known method such as spray coating, immersion coating, and brush coating, for example. When the substrate is a conductive substrate such as a metal substrate or a chemically treated metal substrate, it is preferable to form an electrodeposition coating using an electrodeposition painting as the undercoating (CS1).

To form an electrodeposition coating, the substrate may be immersed in an electrodeposition bath by a known method and then subjected to electrodeposition coating. As the electrodeposition bath, any of known anion-type electrodeposition baths and cation-type electrodeposition baths can be used.

Examples of a base resin component of the electrodeposition bath include one type or two or more types of epoxy resin, acrylic resin, polybutadiene resin, alkyd resin, polyester resin, and silicone resin. As an anion electrodeposition bath, a base resin component includes acid group such as a carboxyl group. As the cationic electrodeposition bath, the base resin component includes an amino group and a basic group such as an ammonium group, a sulfonium group, an onium base group such as a phosphonium group. The above-described groups can be neutralized and ionized to make the above-described groups aqueous.

The thickness of the undercoating is usually from 5 to 40 μm, preferably from about 15 to 30 μm, as a dry film thickness.

After undercoating, the undercoating is washed with water if necessary, and after the undercoating is air dried or cured by baking, an intermediate coating is applied on the undercoating (CS2). The intermediate coating may be in any form of a water-based coating, an organic solvent-based coating, or a powder coating. Examples of a resin coating include various types of resin coatings such as alkyd resin, polyester resin, acrylic resin, polyurethane resin, and vinyl resin. Among the materials for the intermediate coating, alkyd resin materials are generally used.

In the fourth variation, the liquid discharge apparatus 1000 applies a coating of a predetermined pattern (pattern coating) that is previously set in the information processing apparatus 806 onto an automobile body on which the undercoating and the intermediate coating as described above are sequentially formed (CS3).

A pattern coating is usually a thin film having a thickness of about 1 to 10 μm, and it is necessary to contain a large amount of pigment in order to conceal the undercoating and the intermediate coating with the thin film. In the fourth variation, a clear coating is further applied on the pattern coating to solve the problems caused by the large amount of pigment contained in the pattern coating such as reduced gloss that cause deterioration in appearance of coated surface and liability to deterioration in weather resistance and chemical resistance (CS4).

Examples of the clear coating include an organic solvent-based coating, an aqueous coating, a powder coating, or the like can be used without limitation as long as the clear paint has good weather resistance. Examples of the resin coating include various resin coatings such as an acrylic resin, a polyester resin, an alkyd resin, a silicone resin, and a fluororesin can be used. The resin coating may be a thermosetting resin coating or resin coating cured by actinic rays such as ultraviolet rays and electron beams. Examples of the clear coating include the clear coatings used as a top clear coating for automobiles are preferably used, and an acrylic resin-based thermosetting clear coating is particularly suitable.

As described above, the carriage 601 (an example of a liquid discharge device) according to an embodiment of the present disclosure includes a head 300 including a nozzle surface 302*a* (an example of liquid discharge surface), a wiper 603 (an example of a contact part) in contact with the nozzle surface 302*a*, a cleaning liquid collector 606 (an example of a cleaning liquid holder) that holds the cleaning liquid 220 supplied to the wiper 603, and a wiper unit 604 (wiper mover) that holds the wiper 603 and the cleaning liquid collector 606. The wiper unit 604 is movable between a facing position at which the wiper 603 faces the nozzle surface 302*a* and a standby position (home position) at which the wiper 603 does not face the nozzle surface 302*a* so that an inclination of the cleaning liquid collector 606 with respect to a horizontal plane is kept constant. The head 300 includes nozzles 302 (an example of discharge ports) in the nozzle surface 302*a* and the head 300 discharges ink (an example of a liquid) toward a drawing object 100 (an example of a drawing object) from the nozzles 302. The wiper 603 preferably extends in a direction parallel to the nozzle surface 302*a*.

Thus, the wiper 603 moves to the facing position facing the nozzle surface 302*a* to contact, wipe, and clean the nozzle surface 302*a* with the wiper 603 to which the cleaning liquid 220 is supplied without moving the nozzle surface 302*a* to the wiper 603. Further, the carriage 601 can reduce a possibility in which the cleaning liquid 220 in the cleaning liquid collector 606 is shaken and overflown from the cleaning liquid collector 606 when the wiper 603 moves to the standby position at which the wiper 603 does not face the nozzle surface 302*a*.

The wiper unit 604 is movable without changing the height of the cleaning liquid collector 606 in a facing region in which the wiper 603 faces the nozzle surface 302*a*. Further, the wiper unit 604 is horizontally (laterally) movable 606 in a facing region in which the wiper 603 faces the nozzle surface 302*a*. Thus, when the wiper unit 604 moves, the cleaning liquid 220 held by the cleaning liquid collector 606 does not receive a force in the height direction (gravity direction). Thus, the cleaning liquid 220 held by the cleaning liquid collector 606 is less likely to be shaken and overflown from the cleaning liquid collector 606.

The carriage 601 includes a head fixing plate 607 that holds the nozzle surface 302*a* and movably supports the wiper unit 604, and guide plates 608H and 608L (an example of a housing).

The wiper unit 604 includes a cleaning liquid supplier 605 that supplies a cleaning liquid 220 to the wiper 603. Thus, the cleaning liquid supplier 605 reliably supplies the cleaning liquid 220 to the wiper 603 so that the wiper 603 can reliably wipe and clean the nozzle surface 302*a*.

The nozzle surface 302*a* is arranged in a direction intersecting with the horizontal plane, the wiper 603 extends downward, and the cleaning liquid supplier 605 supplies the cleaning liquid 220 from above the wiper 603. Thus, the cleaning liquid supplier 605 reliably supplies the cleaning liquid 220 to a lower part of the wiper 603 so that the wiper 603 can reliably wipe and clean a lower part of the nozzle surface 302*a*.

Thus, the upper end surface 603H is inclined such that the nozzle surface 302*a* side of the upper end surface 603H is lower than a plane orthogonal to the nozzle surface 302*a*. In other words, the upper end surface 603H of the wiper 603 is inclined downward toward the nozzle surface 302*a* of the heads 300 that faces the wiper 603. Thus, the cleaning liquid 220 received by the upper end surface 603H of the wiper 603 is reliably supplied to the nozzle surface 302*a* side of the wiper 603, and the wiper 603 thus can reliably wipe and clean the nozzle surface 302*a* of the heads 300.

Further, the wiper unit 604 is horizontally (laterally) movable in the facing position at which the wiper 603 faces the nozzle surface 302*a*. The wiper 603 extends in a direction orthogonal to the moving direction of the wiper unit 604 (in the vertical direction).

Further, the liquid discharge apparatus 1000 according to the embodiment in the present disclosure includes the carriage 601, the X-axis rail 101, the Y-axis rail 102, and the Z-axis rail 103 (see FIGS. 23A and 23B), or rail 830 (an example of a guide, see FIG. 42) that movably hold the carriage 601 as described above.

Thus, the carriage 601 can discharge ink toward the drawing object 100 while moving in the X-axis, Y-axis, and Z-axis directions. Irrespective of the position of the carriage 601 with respect to the drawing object 100, the carriage 601 moves the wiper 603 to the facing position at which the wiper 603 faces the nozzle surface 302*a* when necessary. Thus, the wiper 603 supplied with the cleaning liquid 220 can contact the nozzle surface 302*a* of the head 300 and wipe and clean the nozzle surface 302*a* without moving the nozzle surface 302*a* to the wiper 603.

Thus, the liquid discharge apparatus 1000 can continuously draw high quality images with smaller downtime since the liquid discharge apparatus 1000 can reduce a time needed for the carriage 601 to move to the wiper 603 compared with the configuration in which the carriage 601 moves toward the wiper 603, a position of which is fixed.

The liquid discharge apparatus 1000 includes the waste liquid tank 240 (an example of a cleaning liquid collection part) connected to the cleaning liquid collector 606 via the cleaning-liquid collection tube 612 (an example of flexible tube). Thus, the cleaning liquid 220 held by the cleaning liquid collector 606 can be collected by the waste liquid tank 240 irrespective of a position of the carriage 601 with respect to the drawing object 100.

The liquid discharge apparatus 1000 includes a vacuum generator 242 that generates a negative pressure between the cleaning-liquid collection tube 612 and the waste liquid tank 240. Thus, the cleaning liquid 220 held by the cleaning liquid collector 606 can be reliably collected by the waste liquid tank 240.

The liquid discharge apparatus 1000 includes the compressor 230 that supplies the pressurized air (an example of pressurized air supplier), and a liquid tank 330 (an example of liquid holder) that receives the pressurized air supplied from the compressor 230 and supplies pressurized ink to the nozzles 302. The vacuum generator 242 generates a negative pressure using the pressurized air received from the compressor 230. Thus, the cleaning liquid 220 held by the cleaning liquid collector 606 can be reliably collected by the waste liquid tank 240 using the compressor 230 that supplies ink to the heads 300. The liquid tank 330 supplies a pressurized liquid to the heads 300 with receipt of the pressurized air supplied from the pressurized air supplier (compressor 230).

This patent application is based on and claims priority pursuant to 35 U.S.C. § 119(a) to Japanese Patent Application Nos. 2019-071041, filed on Apr. 3, 2019 and 2020-051424, filed on Mar. 23, 2020 in the Japan Patent Office, the entire disclosure of each of which is hereby incorporated by reference herein.

REFERENCE SIGNS LIST

1 Liquid discharge apparatus
2 Cylinder (columnar member)
10 Base
11 Mounting table
12 Fixing part

13 Liquid discharge device
14 Carriage
15 Frame
16 Slider
300 Head
200 Cleaning mechanism
201 Wiper
202 Cleaning liquid discharger
302 Nozzle
305 Piezoelectric element
307 Valve
500 Controller
702 Object to be printed

The invention claimed is:

1. A liquid discharge apparatus comprising:

a liquid discharge device including:

a liquid discharge head including nozzles configured to discharge a liquid, a carriage mounting the liquid discharge head, wherein the carriage is movable, a wiper to wipe a nozzle surface of the liquid discharge head, a wiper mover to hold and move the wiper between a facing position at which the wiper faces the nozzle surface and a standby position at which the wiper does not face the nozzle surface, and a cleaning liquid applier to apply a cleaning liquid to the wiper, wherein the wiper mover holds the cleaning liquid applier, wherein the carriage movably holds the liquid discharge head and the wiper mover as a single unit;

a carriage mover to move the carriage; and a mounting table to mount a columnar member as an object to which the liquid is discharged from the liquid discharge head, wherein the carriage is reciprocally movable in a vertical direction as a first direction, and the carriage mover reciprocally moves the carriage in a second direction along a tangent line of the columnar member in a plane defined by the first direction and a direction orthogonal to the first direction.

2. The liquid discharge apparatus according to claim 1, further comprising a driver to drive and move the wiper mover.

3. The liquid discharge apparatus according to claim 1, further comprising a cleaning liquid collector below the wiper, wherein the cleaning liquid collector is to receive the cleaning liquid applied to the wiper.

4. The liquid discharge apparatus according to claim 1, further comprising a retractor to move the liquid discharge device toward or away from the mounting table, wherein the retractor moves the liquid discharge device away from the mounting table before the wiper wipes the nozzle surface.

5. The liquid discharge device according to claim 1, further comprising a driver to drive and move the wiper mover in a vertical direction between the facing position and the standby position.

6. A liquid discharge apparatus comprising:

a liquid discharge device including:

a liquid discharge head including a nozzle surface in which nozzles are formed, the liquid discharge head to discharge a liquid from the nozzles in a lateral direction, a wiper extending in a direction intersecting a horizontal plane, the wiper to contact and wipe the nozzle surface of the liquid discharge head, a cleaning liquid applier to apply a cleaning liquid to the wiper, a cleaning liquid collector to receive the cleaning liquid applied to the wiper, and a wiper mover to laterally move the wiper, the cleaning liquid applier, and the cleaning liquid collector in a facing region in which the wiper faces the nozzle surface, wherein the wiper mover holds the cleaning liquid applier, wherein the wiper mover is to move the wiper in a horizontal direction when the wiper is at a facing position at which the wiper faces the nozzle surface, and the wiper extends in a direction orthogonal to a moving direction of the wiper mover;

a cleaning liquid tank connected to the cleaning liquid collector with a flexible tube;

a negative pressure generator to generate a negative pressure between the flexible tube and the cleaning liquid tank;

a pressurized air supplier to generate pressurized air; and a liquid tank to supply a pressurized liquid to the liquid discharge head with receipt of the pressurized air supplied from the pressurized air supplier, wherein the negative pressure generator is to generate the negative pressure using the pressurized air received from the pressurized air supplier.

7. The liquid discharge apparatus according to claim 6, wherein the wiper mover moves the wiper in the horizontal direction between the facing position and a standby position at which the wiper does not face the nozzle surface.

8. The liquid discharge apparatus according to claim 6, further comprising a carriage to movably hold the liquid discharge head and the wiper mover.

9. The liquid discharge apparatus according to claim 6, wherein the nozzle surface intersects a horizontal surface, and the cleaning liquid applier is to apply the cleaning liquid to the wiper from above the wiper.

10. The liquid discharge apparatus according to claim 9, wherein an upper end surface of the wiper is inclined downward toward the nozzle surface of the liquid discharge head facing the wiper.

11. The liquid discharge apparatus according to claim 6, wherein the wiper extends in a vertical direction.

12. A liquid discharge device comprising:

a liquid discharge head including a nozzle surface in which nozzles are formed, the liquid discharge head to discharge a liquid from the nozzles;

a wiper to contact the nozzle surface of the liquid discharge head;

a cleaning liquid applier to apply a cleaning liquid to the wiper;

a cleaning liquid collector below the wiper, the cleaning liquid collector to receive the cleaning liquid applied to the wiper;

a wiper mover to:

move the wiper, the cleaning liquid applier, and the cleaning liquid collector between a facing position at which the wiper faces the nozzle surface and a standby position at which the wiper does not face the nozzle surface, wherein the wiper mover holds the cleaning liquid applier; and keep an inclination between a horizontal plane and the cleaning liquid collector to be constant during a movement of the wiper between the facing position and the standby position.

13. The liquid discharge device according to claim 12, wherein the wiper mover is to be movable between the facing position and the standby position while keeping a height of the cleaning liquid collector to be constant.

* * * * *